(12) United States Patent
Chapman et al.

(10) Patent No.: US 8,266,571 B2
(45) Date of Patent: *Sep. 11, 2012

(54) METHODS AND DEVICES FOR INDEPENDENT EVALUATION OF CELL INTEGRITY, CHANGES AND ORIGIN IN CHIP DESIGN FOR PRODUCTION WORKFLOW

(75) Inventors: David Chapman, San Jose, CA (US); Thomas Grebinski, Alamo, CA (US)

(73) Assignee: Oasis Tooling, Inc., Alamo, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 12/482,296

(22) Filed: Jun. 10, 2009

(65) Prior Publication Data

US 2009/0307639 A1 Dec. 10, 2009

Related U.S. Application Data

(60) Provisional application No. 61/131,601, filed on Jun. 10, 2008.

(51) Int. Cl.
*G06F 17/50* (2006.01)
(52) U.S. Cl. ........................... 716/136; 716/107
(58) Field of Classification Search .................. 716/106, 716/111, 136, 107, 138; 704/7–10
See application file for complete search history.

(56) References Cited

U.S. PATENT DOCUMENTS

| | | | |
|---|---|---|---|
| 5,937,190 A | 8/1999 | Gregory et al. | |
| 5,949,993 A * | 9/1999 | Fritz | 703/22 |
| 6,530,072 B1 | 3/2003 | Hagerman et al. | |
| 6,564,364 B1 | 5/2003 | Dahl et al. | |
| 6,961,918 B2 | 11/2005 | Garner et al. | |
| 7,096,441 B2 | 8/2006 | Lo et al. | |
| 7,246,339 B2 | 7/2007 | Yuan et al. | |

(Continued)

FOREIGN PATENT DOCUMENTS

JP 2008250903 10/2008

(Continued)

OTHER PUBLICATIONS

International Search Report, Appln. No. PCT/US2009/046913, mailed Jan. 29, 2010.

(Continued)

*Primary Examiner* — Vuthe Siek
(74) *Attorney, Agent, or Firm* — Haynes Beffel & Wolfeld; Ernest J. Beffel, Jr.

(57) ABSTRACT

The technology disclosed relates to granular analysis of design data used to prepare chip designs for manufacturing and to identification of similarities and differences among parts of design data files. In particular, it relates to parsing data and organizing into canonical forms, digesting the canonical forms, and comparing digests of design data from different sources, such as designs and libraries of design templates. Organizing the design data into canonical forms generally reduces the sensitivity of data analysis to variations in data that have no functional impact on the design. The details of the granular analysis vary among design languages used to represent aspects of a design. For various design languages, granular analysis includes partitioning design files by header/cell portions, by separate handling of comments, by functionally significant/non-significant data, by whitespace/non-whitespace, and by layer within a unit of design data. The similarities and differences of interest depend on the purpose of the granular analysis. The comparisons are useful in many ways.

20 Claims, 20 Drawing Sheets

U.S. PATENT DOCUMENTS

| | | | |
|---|---|---|---|
| 7,386,819 | B1 | 6/2008 | Yuan et al. |
| 7,469,376 | B2 | 12/2008 | Chia et al. |
| 7,536,289 | B2 | 5/2009 | Okabayashi et al. |
| 2003/0149703 | A1 | 8/2003 | Corr |
| 2003/0154061 | A1 | 8/2003 | Willis |
| 2004/0153469 | A1 | 8/2004 | Keith-Hill |
| 2004/0225983 | A1 | 11/2004 | Jacques et al. |
| 2005/0060643 | A1 | 3/2005 | Glass et al. |
| 2006/0075371 | A1 | 4/2006 | Kamat |
| 2006/0101428 | A1 | 5/2006 | Adke et al. |
| 2007/0005596 | A1 | 1/2007 | Brown et al. |
| 2008/0104554 | A1 | 5/2008 | Kobayashi et al. |
| 2008/0155482 | A1 | 6/2008 | Chidambarrao et al. |
| 2008/0165192 | A1 | 7/2008 | Finkler et al. |
| 2008/0172645 | A1* | 7/2008 | Finkler et al. .......... 716/9 |
| 2008/0244482 | A1 | 10/2008 | Chang et al. |
| 2008/0244483 | A1 | 10/2008 | Chang et al. |
| 2008/0244493 | A1 | 10/2008 | Finkler |

FOREIGN PATENT DOCUMENTS

| | | |
|---|---|---|
| WO | 9308524 | 4/1993 |
| WO | 02095576 | 11/2002 |
| WO | 2007080184 | 7/2007 |

OTHER PUBLICATIONS

Office Action, U.S. Appl. No. 12/536,413, mailed Nov. 24, 2009.

Notice of Allowance, U.S. Appl. No. 12/536,413, mailed Dec. 31, 2009.

Hans-Jorg Happel, et al., "Report describing state-of-the art in Search Mechanism and Context Similarity", Mar. 2007, http://www.team-project.eu/documentsITEAM_deliverable_D6.pdf, accessed May 18, 2009.

Arnoldo Molina and Takeshi Shinohara, "Fast Approximate Matching of Programs for Protecting Libre/Open Source Software by Using Spatial Indexes", Seventh IEEE International Working Conference on Source Code Analysis and Manipulation,,2007, pp. 111-122.

Tommi Elo and Tero Hasu, "Detecting Co-Derivative Source Code—An Overview", Nov. 2003, pp. 1-48.

Randy D. Smith, "Copy Dectection Systems for Digital Documents", Aug. 1999, thesis submitted to Brigham Young University, Dept of Computer Science, pp. 1-186.

Brenda S. Baker, "Deducing Similarities in Java Sources from Bytecodes", Proceedings of the USENIX Annual Technical Conference (No. 98), 1998, pp. 179-190.

Wiebe Hordijk et ai, "Review of code clone articles", University of Twente, The Netherlands, http://eprints.eemcs.utwente.nl112257/01ITR-CTIT-08-33.pdf, accessed on May 18, 2009.

Matthias Rieger, "Effective Clone Detection Without Language Barriers", Ph.D. thesis, University of Bern, Jun. 2005.

Lutz Prechelt et al., "Finding Plagiarisms among a Set of Programs with JPlag", Journal of Universal Computer Science, vol. 8, No. 11,Nov. 28, 2002. pp. 1016-1038.

Abdur Chowdury et al., "Collection Statistics for Fast Duplicate Document Detection", ACM Transactions on Information Systems, vol. 20, No. 2, Apr. 2002, pp. 171-191.

Ben Bonsall, "The Automatic Detection of Plagiarism", 2003/2004 3rd Year Research Project Dept. of Computer Science.

Chanchal Kumar Roy and Jame R Cordy, "A Survey on Softare Clone Detection Research", Technoca; Report No. 2007-541, School of Computing, Queen's University at Kingston, Ontario, Canada.

Ranier Koschke, "Survey of Research on Software Clones", Dagstuhl Seminar Proceedings, Apr. 19, 2007, http://drops.dagstuhl.delopus/volltexte/2007/962, accessed May 21, 2009.

"Black Duck Software Customer Success Story", 2007, accessed @ http://www.nohau.se/products/blackduck/ InteLCS-I NTC-0806-AD. pdf.

VSI Alliance, Virtual Component Identification, Soft IP Tagging Standard, Version 2.0 (IPP 4 2.0, )Intellectual Property Protection, Development Working Group, Released Sep. 2006.

Oasis Tooling Report from Black Duck Demo.

Martin Theobald et al., "SpotSigs: Robust and Efficient Near Duplicate Detection in Large Web Collections", Porceedings of SIGIR'08, Jul. 20-24, 2008, Singapore.

Amelie Marian et al., "Change-Centric Management of Versions in an XML Warehouse" In Proceedings of VLDB 2001, pp. 581-590, accessed at http://citeseerx.ist.psu.edu/viewdoc/summary?doi=1 0.1.1.1 01.229.

Gregory Cobena et al., "Detecting Changes in XML Documents" In ICDE, 2001, pp. 41-52, accessed at http://citeseerx.ist.psu.edu/viewdoc/summary?doi=10.1.1.2.5474.

Schindler, P. et al., "IP repository, a Web based IP reuse infrastructure" Custom Integrated Circuits, 1999. Proceedings of the IEEE May 16, 1999-May 19, 1999, San Diego, CA, USA, 415-418, accessed at http://ieeexplore.ieee.org/xpl/freeabs_all.jsp?arnumber=777316.

Katz, R. H. 1990. Toward a unified framework for version modeling in engineering databases. ACM Comput. Surv. 22, 4 (Dec. 1990), 375-409, accessed at http://www.inf.ufrgs.br/-c1esio/cmp151/cmp15120031/Katz90.pdf.

Bernd Schurmann et al., "On Modeling Top-Down VLSI Design" Proc. Int. Conference of Computer Aided Design, 1994, accessed at http://citeseerx.ist.psu.edu/viewdoc/summary?doi=1 0.1.1.1 02.449.

Sinha, S.; Mehendale, M. "Integrated IC design approach based on software engineering paradigm" Custom Integrated Circuits, 1999. Proceedings of the IEEE San Diego, CA, May 16, 1999-May 19, 1999, pp. 53-56, accessed at http://ieeexplore.ieee.org/search/freesrchabstract.jsp? arnumber=777242&isnumber= 16877 &punumber=631 0&k2dockey=777242@ieeecnfs.

Prechelt, Lutz et al., "JPlag: Finding plagiarisms among a set of programs," Technical Report 2000-2001, Mar. 28, 2000, pp. 1-44.

Manber, Udi, "Finding Similar Files in a Large File System," 1994 Winter USENIX Technical Conference, Oct. 1993, pp. 1-10.

Physical IP Products Overview—ARM Physical IP accessed at http://www.artisan.com on Apr. 17, 2009, pp. 1-3.

* cited by examiner

*Annotated Sample Liberty File*

FIG. 8A

```
library (name) {                    ← File Header Text
/* file comment */
date : string;
revision : string;
comment : string;
time_unit : unit_number;
leakage_power_unit : unit_number;
voltage_unit : unit_number;         File Header Text
current_unit : unit_number;
pulling_resistance_unit : unit_number;
capacitive_load_unit (number,unit);
operating_conditions (name) {
   ...
}
lu_table_template (name) {
   variable_1 : enum;
   variable_2 : enum;
   index_1 (string)
   index_2 (string)
}
...
```

LEGEND:

File header text
/*file comment text */

Cell body text
Cell interface text
/*cell comment text */

FIG. 8B

```
cell (name) {                       ←Cell Body Text
   /* cell comment */
   area : expression;
   auxiliary_pad_cell : enum;
   cell_footprint : string;
   clock_gating_integrated_cell : string;
   dont_use : enum;
   dont_touch : enum;
   interface_timing : enum;
   is_clock_gating_cell : enum;
   is_isolation_cell : enum;
   is_level_shifter : enum;
   level_shifter_type : enum;
   map_only : enum;
   pad_cell : enum;
   pad_type : enum;                     Cell Interface Text
   power_cell_type : enum;
   preferred : enum;
   retention_cell : name;
   timing_model_type : string;
   use_for_size_only : enum;
   pin_equal (string,string);
   pin_opposite (string,string);
   rail_connection (name,name);
   resource_usage (name,number);
   ff (name,name) { ... }
   ff_bank (name,name,number) { ... }
   generated_clock (name) { ... }
   latch (name,name) { ... }
   latch_bank (name,name,number) { ... }
   lut (name) { ... }
   cell_leakage_power : expression;  ←Cell Body Text
   ...
```

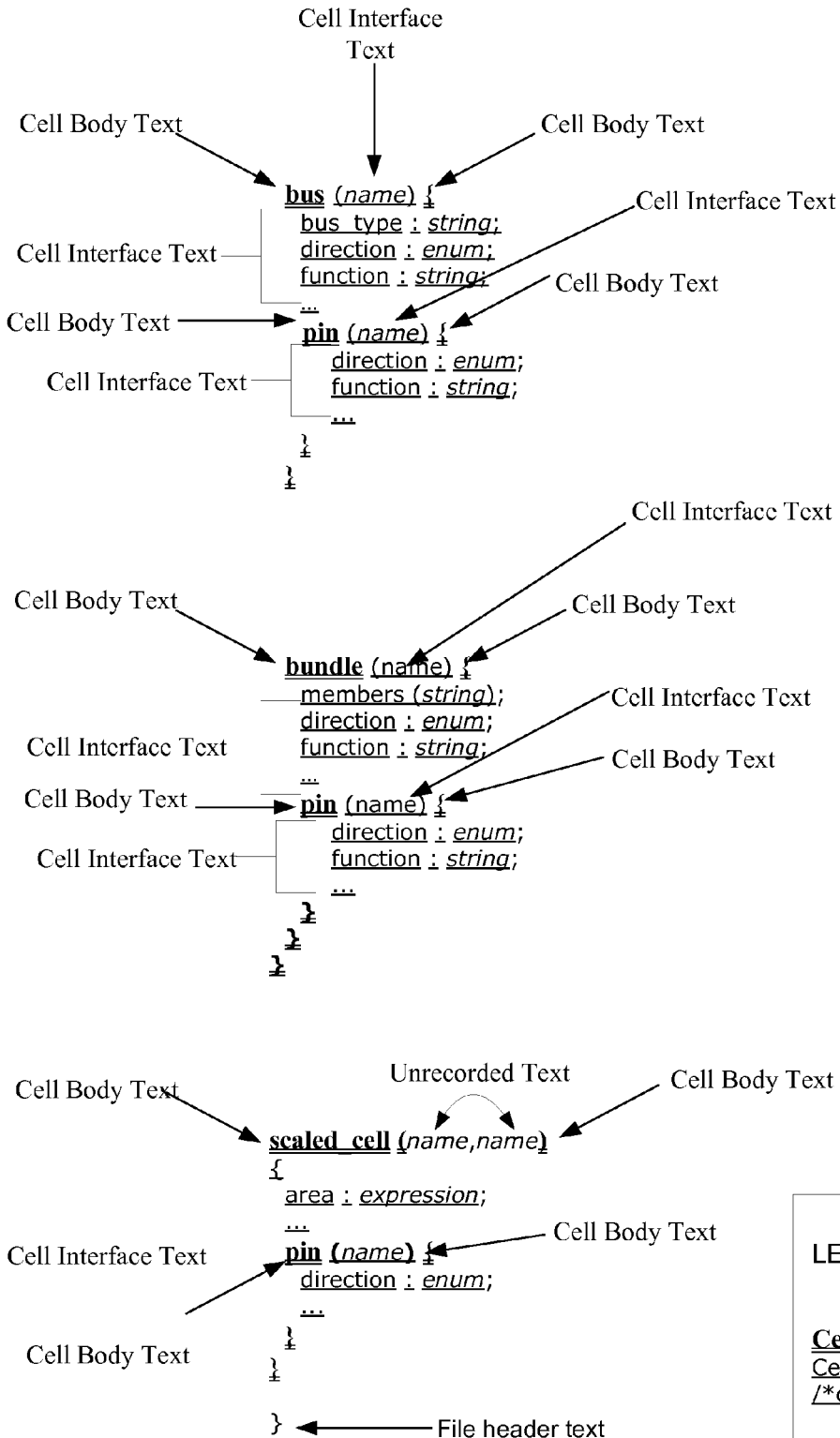

*Annotated Sample Verilog File*

```
// file comment
primitive seq0(IQ,SN,nextstate,CK,NOTIFIER);
  output IQ;
  input SN,nextstate,CK,NOTIFIER;
  reg IQ;

table
    1 0 r ? : ? : 0;
    ? 1 r ? : ? : 1;
  endtable
endprimitive (* an attribute // comment in attribute
*) (* another attribute *)
module XNOR2_X1
   #(parameter MSB=3, LSB=0)
   (A, B, ZN);
   (* 1 *) (*2*) input A;
   input B;
   output ZN;

not(ZN, i_0);
   xor(i_0, A, B);
     // a comment in a module
     specify
     (A => ZN) = (0.1, 0.1);
     (B => ZN) = (0.1, 0.1);
     endspecify
endmodule
```

FIG. 9

LEGEND:

File header text
// Comment text

Cell body text
Cell interface text

`Unrecorded text`

*Annotated Sample VHDL File*

```
-- Title : Standard VITAL TIMING Package
--      : $Revision: 1.3 $
PACKAGE VITAL_Timing IS
  CONSTANT VitalZeroDelay : VitalDelayType := 0 ns;
  ATTRIBUTE VITAL Level0 : BOOLEAN;
    TYPE VitalTimingDataType IS RECORD
      NotFirstFlag : BOOLEAN;
      RefLast : X01;
    END RECORD;

-- comment recorded with function "minimum"
  FUNCTION Minimum ( CONSTANT t1,t2 : IN TIME ) RETURN TIME IS
  BEGIN
  IF ( t1 ≤ t2 ) THEN RETURN (t1); ELSE RETURN (t2); END IF;
  END Minimum;

PROCEDURE VitalWireDelay (
        SIGNAL OutSig : OUT std_ulogic;
      SIGNAL InSig : IN std_ulogic;
      CONSTANT twire : IN VitalDelayType01 ) IS
  VARIABLE Delay : TIME;
  BEGIN
    -- comment inside procedure "vitalwiredelay"
    Delay := VitalCalcDelay( InSig, InSig'LAST_VALUE, twire );
    OutSig <= TRANSPORT InSig AFTER Delay;
  END VitalWireDelay;
END VITAL_Timing;
```

FIG. 10A

LEGEND:

File header text
-- Comment text

Cell body text
Cell interface text

Unrecorded text

*Annotated Sample VHDL File*

```
ENTITY Latch IS
  GENERIC ( N : Natural := 2 );
  PORT ( Din : IN Word; Dout : OUT Word; Load, Clk : IN Bit );
  CONSTANT Setup : Time := 12 ns;
  CONSTANT PulseWidth : Time := 50 ns;
  USE Work.TimingMonitors.ALL;
BEGIN
  -- even the body of the entity is recorded as interface text
  ASSERT Clk='1' OR Clk'Delayed'Stable ( PulseWidth );
  CheckTiming ( Setup, Din, Load, Clk );
END ENTITY Latch;

ARCHITECTURE MC68000 OF MC68000 IS
  PROCEDURE bclr_d IS
    PROCEDURE nested( SIGNAL output : OUT std_ulogic ) IS
    BEGIN
      output := '0';
    END nested;
  BEGIN
    NULL;
  END bclr_d;
BEGIN   --main loop
  var.m(0) := x"00";
END ARCHITECTURE MC68000;
```

FIG. 10B

LEGEND:

File header text
-- Comment text

Cell body text
Cell interface text

Unrecorded text

*Annotated Sample OASIS File*

```
magic-bytes START
```
PROPERTY ...
```
PAD
CELLNAME string
CELLNAME string number
TEXTSTRING string
TEXTSTRING string number
PROPNAME string
PROPNAME string number
PROPSTRING string
PROPSTRING string number
LAYERNAME string number number ...
XNAME number string
CELL string
```
POLYGON *byte* <u>layer-number datatype-number number number
    number number ...</u> PROPERTY ...
PLACEMENT *byte* <u>string number number number number</u> PROPERTY ...
<u>TEXT</u> *byte* <u>string layer-number texttype-number number number</u>
    <u>PROPERTY ...</u>
```
XYABSOLUTE
XYRELATIVE
PAD
```
<u>XGEOMETRY *byte* number layer-number datatype-number string
    number number PROPERTY ...</u>
<u>XELEMENT number string</u>
```
...
END
```

FIG. 11

LEGEND:

<u>File header text</u>
Cell body text
<u>Non-geometry cell body text</u>
`Unrecorded text`

*Annotated Sample GDSII File*

```
HEADER version
BGNLIB mod_time access_time
LIBDIRSIZE number
SRFNAME filename
LIBSECUR numbers...
LIBNAME name
REFLIBS filenames
FONTS filenames
ATTRTABLE filename
GENERATIONS number
FORMAT number
MASK string ... ENDMASKS
UNITS number number
BGNSTR mod_time access_time
STRNAME cell
STRCLASS number
```
— Comments

BOUNDARY ELFLAGS *number* PLEX *number* LAYER *number* DATATYPE *number*
    XY *number number number number* ...
    PROPATTR *number* PROPVALUE *string* ... ENDEL
BOX ELFLAGS number PLEX number LAYER *number* BOXTYPE *number*
    XY *number number number number* ...
    PROPATTR *number* PROPVALUE *string* ... ENDEL
TEXT ELFLAGS *number* PLEX *number* LAYER *number* TEXTTYPE *number*
    PRESENTATION *number* PATHTYPE *number* WIDTH *number*
    STRANS *number* MAG *number* ANGLE *number*
    XY *number number* STRING *string*
    PROPATTR *number* PROPVALUE *string* ... ENDEL
NODE ELFLAGS *number* PLEX *number* LAYER *number* NODETYPE *number*
    XY *number number number number* ... STRING *string*
    PROPATTR *number* PROPVALUE *string* ... ENDEL
SREF ELFLAGS *number* PLEX *number* SNAME *string* STRANS *number*
    MAG *number* ANGLE *number* XY *number number*
    PROPATTR *number* PROPVALUE *string* ... ENDEL
ENDSTR
...
ENDLIB

FIG. 12

LEGEND:

File header text
Cell body text
Non-geometry cell body text
`Unrecorded text`

*Annotated Sample SPICE Netlist File*

```
* a simple inverter
.global vdd gnd
.param lp=0.35 ln=0.3 wp=0.7 wn=0.7
.options scale=1u .subckt inverter i zn
*       drain gate source bulk
mpullup    zn    i    vdd    vdd    pmos   w=10.0   l=lp
mpulldown  zn    i    gnd    gnd    nmos   w=4.0    l=ln
.ends .end
* this .options command is not processed:
.options scale=1u
```

FIG. 13

LEGEND:

File header text
Cell body text
Cell interface text
Unrecorded text
* Comment text

*Annotated Sample LEF File*

```
# a sample LEF file fragment
VERSION 5.6 ;
NAMESCASESENSITIVE ON ;
BUSBITCHARS "[]" ;
DIVIDERCHAR "/" ;
UNITS
  DATABASE MICRONS 2000 ;
  ...
END UNITS
MANUFACTURINGGRID 0.001 ;

LAYER M1
  TYPE ROUTING ;
  WIDTH 0.065 ;
  SPACING 0.065 ;
  PITCH 0.14 ;
  ...
END M1
...
SITE site1
  SYMMETRY y ;
  CLASS core ;
  SIZE 0.19 BY 1.4 ;
END site1
...
```

LEGEND:

File header text
Cell body text
Cell interface text
`Unrecorded text`
Comment text

```
MACRO INV_X1
# a fragment of a simple inverter description
CLASS core ;
ORIGIN 0 0 ;
SYMMETRY X Y ;
SITE site1 ;
SIZE 0.38 BY 1.4 ;
FOREIGN cell2 204.6 302.1 FE ;
EEQ cell3 ;
PIN A
  DIRECTION INPUT ;
  PORT LAYER M1 ;
    POLYGON 0.04 0.465 0.14 0.465 0.14 0.6 0.04 0.6 ;
  END
  ...
END A
OBS
  LAYER M1 ;
    POLYGON 0.05 1.015 0.115 1.015 0.115 1.09 0.43 1.09 ;
END
DENSITY
  LAYER M1 ;
    RECT 0.06 0.10 0.12 1.22 75.0 ;
  LAYER M2 ;
    RECT 0.06 0.10 0.12 1.22 25.0 ;
END
PROPERTY prop1 "abc" ;
END INV_X1
...
END LIBRARY
```

FIG. 14

*Annotated Sample DEF File*

LEGEND:

File header text
Cell body text
Cell interface text
`Unrecorded text`
Comment text \# a small test DEF file, based in part on the sample
\# in the LEF/DEF manual
DESIGN DEMO4CHIP ;
TECHNOLOGY DEMO4CHIP ;
UNITS DISTANCE MICRONS 100 ;
DIEAREA ( 0 0 ) ( 4286200 81362000 ) ;
ROW row_0 CORE 400 900 FS DO 85 BY 1 STEP 300 1200 ;
ROW row_1 CORE 400 2100 N DO 85 BY 1 STEP 300 1200 ;
COMPONENTS 5 ;
  - CORNER1 CORNER ;
  - CORNER2 CORNER ;
  - C01 IN1X ;
  - C02 IN1Y ;
  - Z38A05 DFF3 ;
END COMPONENTS
NETS 2 ;
- VDD ( Z38A05 SN ) ( Z3805 CN ) ;
- Z38A05 ( Z38A05 QN ) ( C01 B ) ;
END NETS
BLOCKAGES 2 ;
- LAYER M2
  + COMPONENT c1
    POLYGON ( 25 20 ) ( * 300 ) ( 50 * ) ( * 200 ) ( 75 * ) ( * 20 ) ;
- PLACEMENT
  RECT ( 60 120 ) ( 100 320 )
  RECT ( 90 440 ) ( 220 600 ) ;
END BLOCKAGES
SLOTS 1 ;
- LAYER m1
  POLYGON ( 40 30 ) ( 90 * ) ( * 120 ) ( 40 * ) ;
END SLOTS

FIG. 15

*Annotated Sample Structured Text File*

```
#!/bin/sh -f
# dummy.sh - dummy shell script for testing structured file parser \
(with a continuation inside a comment)
# line with a trailing '\' but with white space following it: \
if ($i == "some \" text")    # a comment in the middle of a line
   multi_space_indent  twice in the line
fi completely blank lines are ignored:

'a string  inside single quotes - should not reduce the spaces'
```

FIG. 16

LEGEND:

File header text
Cell body text
Cell interface text
Unrecorded text
Comment text
⊔   Space character

*Annotated Sample User-parsed File*

```
HEADERTEXT(lay1)   first line of header
COMMENT  first file comment line
HEADERTEXT   second line of header
CELL cell2
INTERFACE(lay2)  i1  first interface
HIERCELL
CELLNONGEOM(lay3)  non-geometry line 1
INTERFACE(lay1)  i3  third interface
CELLTEXT  first line of cell2
CELLNONGEOM(lay2)  non-geometry line 2
INTERFACE(lay1)  h3  fourth interface - should be first when sorting
COMMENT  comment in cell2
CELLTEXT  second line of cell2
CELLTEXT  early line of cell2 for sorting
INTERFACE(lay3)  i2  second interface
HEADERTEXT  third line of header - cell ended
HEADERTEXT  fourth line of header - will be before third when sorted
COMMENT  second file comment line
CELL cell1
CELLTEXT(lay4)  first line of cell1
INTERFACE  j1  first interface of cell1
INTERFACE  j2  second interface of cell1
CELLNONGEOM  non-geometry line 3, no layer number
```

FIG. 17A

LEGEND:

File header text
Cell body text
Cell interface text
Unrecorded text
Non-geometry cell body text
*Comment text*

*Annotated Sample User-parsed File*

```
COMMENT  first file comment line
CELL cell2
COMMENT  comment in cell2
INTERFACE(lay1)  h3  fourth interface - should be first when sorting
INTERFACE(lay1)  i3  third interface
INTERFACE(lay2)  i1  first interface
INTERFACE(lay3)  i2  second interface
CELLTEXT  early line of cell2 for sorting
CELLTEXT  first line of cell2
CELLTEXT  second line of cell2
CELLNONGEOM(lay2)  non-geometry line 2
CELLNONGEOM(lay3)  non-geometry line 1
COMMENT  second file comment line
CELL cell1
INTERFACE  j1  first interface of cell1
INTERFACE  j2  second interface of cell1
CELLTEXT(lay4)  first line of cell1
CELLNONGEOM  non-geometry line 3, no layer number
HEADERTEXT  fourth line of header - will be before third when sorted
HEADERTEXT  second line of header
HEADERTEXT  third line of header - cell ended
HEADERTEXT(lay1)  first line of header
```

FIG. 17B

LEGEND:

File header text
Cell body text
Cell interface text
Unrecorded text
Non-geometry cell body text
*Comment text*

METHODS AND DEVICES FOR INDEPENDENT EVALUATION OF CELL INTEGRITY, CHANGES AND ORIGIN IN CHIP DESIGN FOR PRODUCTION WORKFLOW

RELATED APPLICATIONS

This application claims the benefit of U.S. Patent Provisional Application No. 61/131,601. The priority application is incorporated by reference. This application is related to the PCT Application No. PCT/US09/46913 of the same title, filed contemporaneously in English and designating the United States. The related PCT Application is incorporated by reference. This application is further related to its subsequently filed continuation, which issued first, due to accelerated examination. U.S. Pat. No. 7,685,545 issued Mar. 23, 2010.

BACKGROUND OF THE INVENTION

The technology disclosed relates to the granular analysis of design data used to prepare chip designs for manufacturing and to identify similarities and differences among parts of design data files. In particular, it relates to parsing data and organizing it into canonical forms, digesting the canonical forms, and comparing digests of design data from different sources, such as chip-level designs and design template libraries. Organizing the design data into canonical forms generally reduces the sensitivity of data analysis to variations in the data that have no functional impact on the design. The details of the granular analysis vary among design languages and data file formats used to represent aspects of a design. Depending on the desired analysis and the design languages, granular analysis may include partitioning and reporting design files by header/cell portions, by separate handling of comments, by functionally significant/non-significant data, by whitespace/non-whitespace, and by layer within a unit of design data. The similarities and differences of interest depend on the purpose of the granular analysis. The comparisons are useful in many ways.

The design of an integrated circuit is an iterative process involving hundreds of thousands of cell and block views, artifacts, and their dependencies. The views, artifacts, and their dependencies represent the developing functional, electrical and physical state of an integrated circuit.

Cells and blocks proceed through the design process at different rates, starting with internal cell-level development and release from a design template vendor and cycling through multiple releases or iterations. Keeping track of the most recent version of blocks, libraries, cells, and artifacts is difficult, at best. For example, when someone discovers a yield problem in a product that uses a particular design template, the company will have difficulty determining what other projects use that design template.

The potential for use of an obsolete cell or library is everywhere. Design tools have their own configuration files, and machines have their own search paths and disk mount points. A design or tapeout team may not find an out-of-date file or link until a problematic design comes back from manufacturing.

Complex multi-level designs bring new problems. A frozen block, which was tentatively completed by the design team, might be using an out-of-date version of a library cell. Moreover, a designer might avoid a name conflict with another designer's cell by simply renaming a cell, without verifying whether the two cells are equivalent. Renaming the cell decouples it from future library updates and cell tracking mechanisms.

Designers have made unauthorized modifications to design templates provided by vendors, which resulted in failure during production and potentially voided a warranty otherwise available from the design template vendor. Designers might, for example, think that modifications would improve the performance or functionality of the template, only to find out that they produce the opposite outcome, such as failure in production. Furthermore, third party vendors do not warrant modifications to their design templates. If something does occur like this, it becomes difficult to determine the cause and to identify who is responsible.

When a design is ready for release to production, there can be as many as 40,000 unique cells. With designs as complex as they are today, there is a greater chance that some library cells used to prepare the design are not up to date. The tapeout team cannot determine with certainty whether the cells in the design it is about to send to the mask shop represent the most recent available versions. There is no way today to ensure that a tapeout candidate uses all of the most recent data or ensure that no one made unauthorized modifications to certified layouts.

The known approaches to tracking cell data during the design of an integrated circuit track data files that contain collections of cells. To find cell changes within a file, designers resort to a manual analysis of millions of lines of data typically using a differencing tool. Running a difference check is not effective across design languages or data file formats, because differencing tools typically perform text matches that do not consider the design language or the data type used to represent the design. A differencing program typically subtracts the differences between files, without analysis of whether the changes have a functional impact on the chip being produced or whether they are significant. Differencing tools have a particularly difficult time with two binary data files.

Examples of design tools that apparently include differencing tools include ClearCase, DesignSync and IC Manage, which are described by their respective sellers at http://www-01.ibm.com/software/rational/, http://www.icmanage.com and http://www.3ds.com. Because such tools operate at a file level, rather than a cell level, a designer using a differencing tool would practically need to extract the two sections of code to be compared into new files and compare the files directly. Or, the designer might rely on file metadata, in which another designer has kept notes about the course of design efforts. Neither of these approaches is very robust or efficient.

Some design template suppliers add tags to their templates. The tags identify the templates as theirs with respect to other design templates that may be part of an integrated circuit design that are not their. The tags are used to count the instances of design templates used in a design and then the users of the templates pay royalties based on the number of instances. The standard for the industry approach to the use of this tagging method is maintained by the by the VSI Alliance™. Version 2.0 of the standard, entitled "Virtual Component Identification Physical Tagging Standard," accessed on May 21, 2009 at http://www.vsi.org/docs/IPP_Tagging_Std%201_30.pdf, describes the way to use the tagging methods. This standard describes text tags to be embedded in GDSII text or comment lines. The VSI Alliance includes IBM, Intel, ARM, Freescale Semiconductor, TSMC and others. Third party IP suppliers have developed a scanner that can detect and report design templates if the tags remain part of the design template data. If the tags are removed or obfuscated in some way, the owners of the design templates will not be compensated in terms of royalties.

An opportunity arises to develop new tools for analysis of design data, which facilitate granular evaluation of design data at various junctures in the design work flow. Better, more error free, more resilient and transparent work flows and resulting product designs may result.

SUMMARY/OVERVIEW

The technology disclosed relates to granular analysis of design data used to prepare chip designs for manufacturing and to identification of similarities and differences among parts of design data files. In particular, it relates to parsing data and organizing it into canonical forms, digesting the canonical forms, and comparing digests of design data from different sources, such as chip-level designs and design template libraries. Organizing the design data into canonical forms generally reduces the sensitivity of data analysis to variations in the data that have no functional impact on the design. The details of the granular analysis vary among design languages used to represent aspects of a design. Depending on the desired analysis and the design languages, granular partitioning may include partitioning design files by header/cell portions, by separate handling of comments, by functionally significant/non-significant data, by whitespace/non-whitespace, and by layer within a unit of design data. The similarities and differences of interest depend on the purpose of the granular analysis. The comparisons are useful in many ways. Particular aspects of the present invention are described in the claims, specification and drawings.

Figure 5:
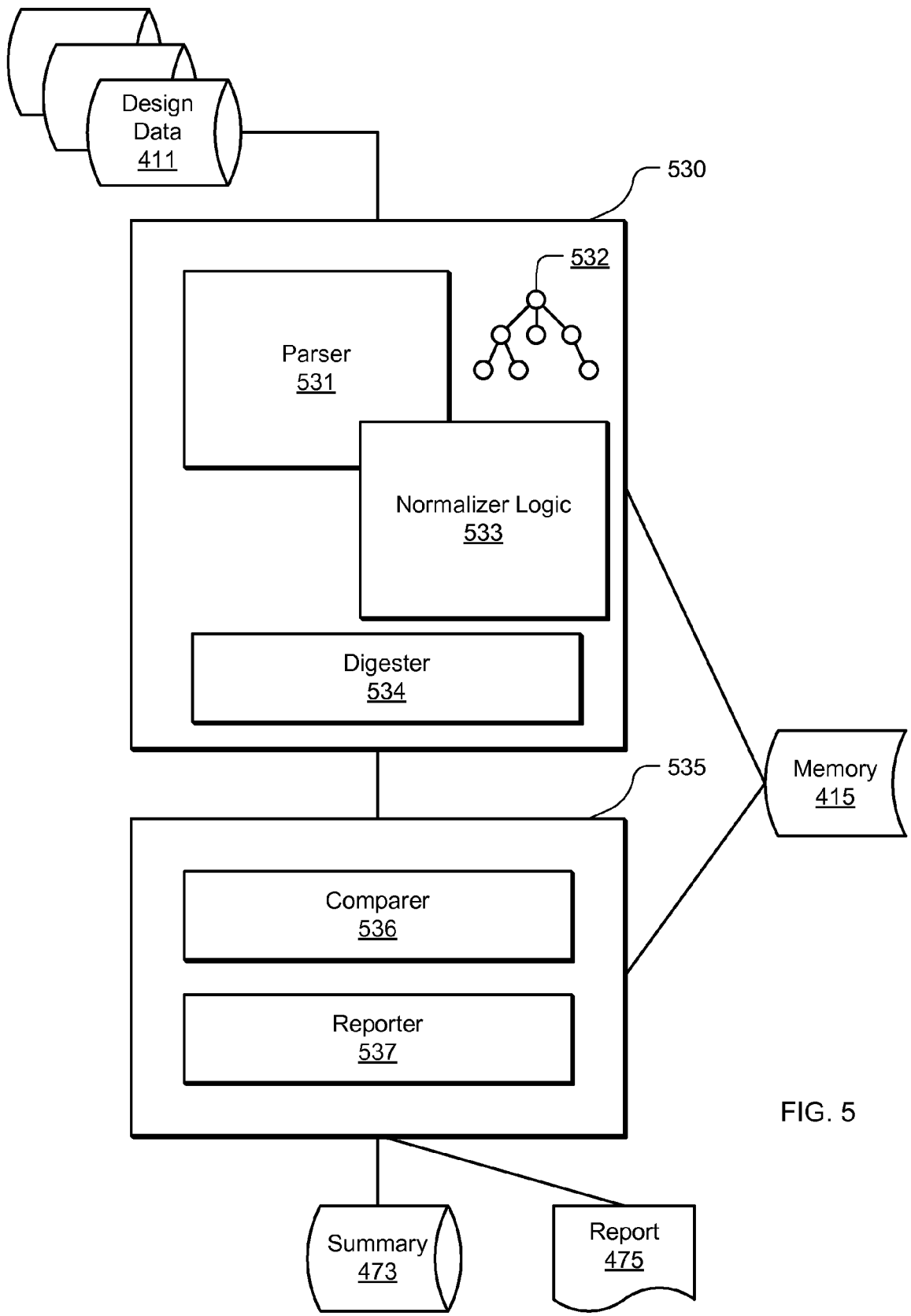

A canonical cell digest or design unit digest is generated by processing a file that contains design data, as illustrated in FIG. 5.

Figures 6, 7:
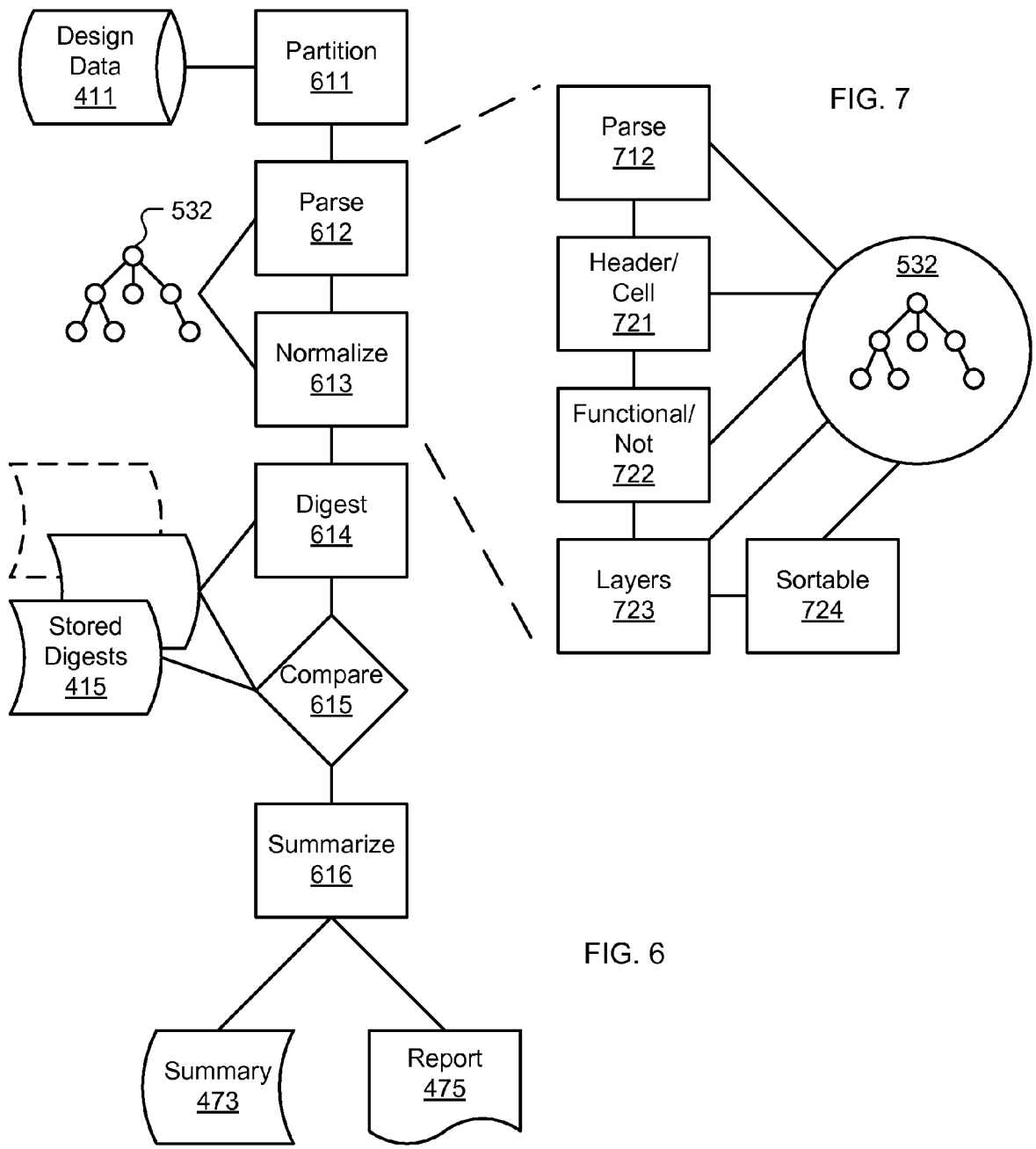
Figure 8C:
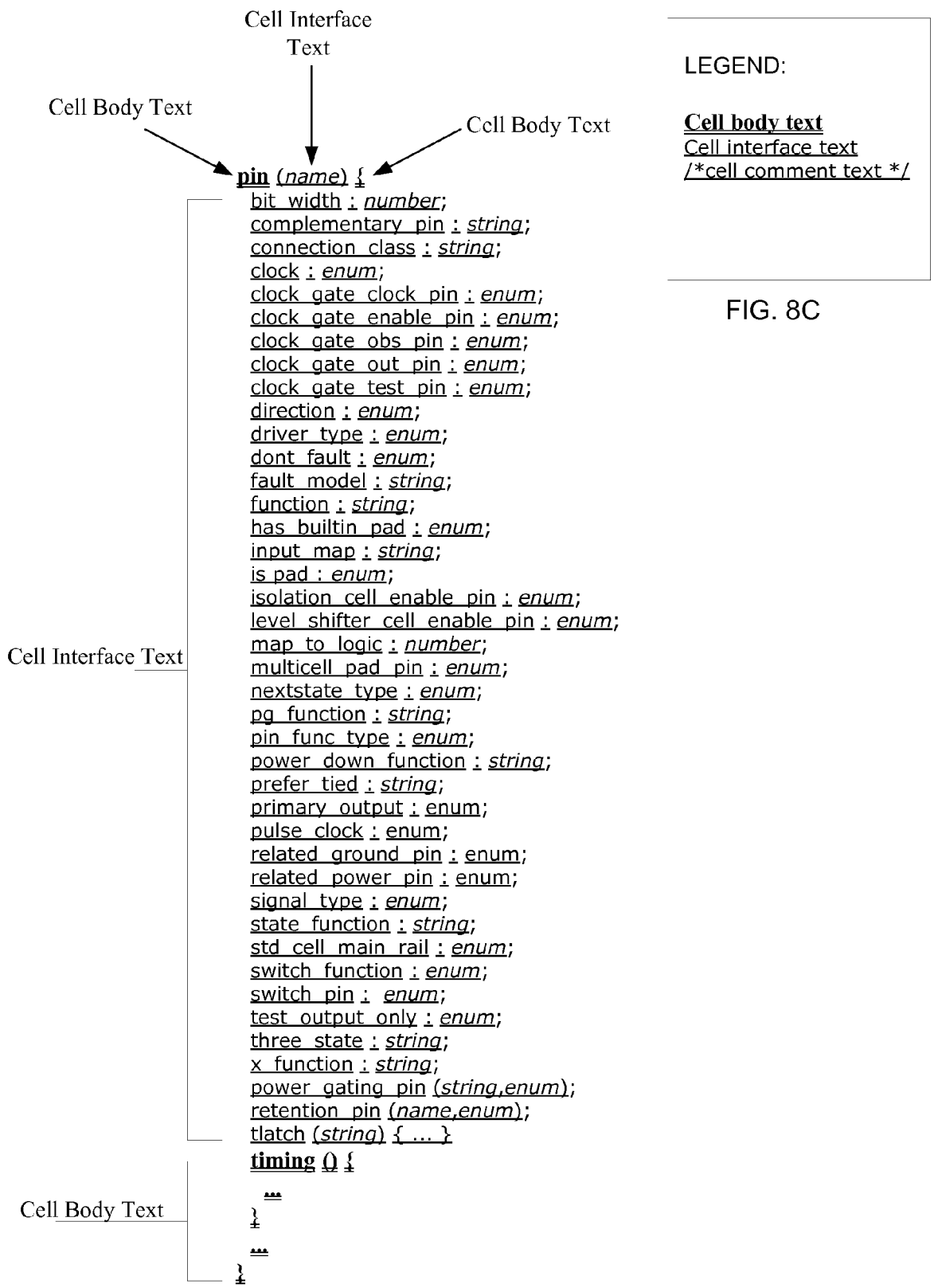

FIGS. 6 and 7 provide a high-level flowchart of some aspects of these methods.

FIGS. 8A-8D illustrate a sampling of the possible header and cell statements in a Liberty file.

FIG. 9 is an annotated example of a Verilog.

FIG. 10A-10B illustrate an annotated sample VHDL file.

FIG. 11 is an annotated sample OASIS® file.

FIG. 12 is an annotated sample GDSII file.

FIG. 13 is an annotated version of a SPICE file.

FIG. 14 is an annotated sample LEF.

FIG. 15 is an annotated version of DEF.

FIG. 16 is an annotated version of a structured text file.

FIGS. 17A-17B are annotated examples of user parsed files.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Overview

Environment of Integrated Circuit Design

The environment of circuit design presents even more challenges and opportunities for improvements than described in the Background section, above. A successful Integrated Circuit (IC) tapeout requires that cells and blocks of the IC design are correct. Using the wrong version of a circuit, whether a leaf cell with a few transistors or a large hierarchical design block, can cost millions of dollars and months of delay.

Chip-level design template management systems, post logic synthesis, track file-based collections of design data: cells, versions of cells, blocks, and chip-level design blocks. It appears that design data management systems cannot effectively determine or summarize what has changed within a given collection of cell and block data, found inside a file. Chip-level design data management systems cannot track at this level of granularity, because cells and blocks and chip-level design blocks are created by different design tools and different versions of design tools, and are represented using different design languages and data file formats. In a complicated SOC design, design blocks may come from different design groups using different design tools and versions of tools. The deficiencies perceived in current design management tools leave them unable to evaluate cell equivalence at the cell level or to report what has changed within individual cells.

Existing design data management tools appear not to distinguish between text data and object data and not to sort the data or otherwise produce a canonical representation of the design data. In turn, they lack an auditing capability that would be useful to project managers who are interested in verifying that the cells in an IC design are of the latest approved version, in ensuring that the cells have not been improperly copied or imported, or in determining whether a proposed cell design update will be usable in a design approaching tapeout.

In addition, design data management systems do not provide a way to validate the final GDSII or OASIS® file released to the mask shop. They all assume that with strict enough controls, no "stray" layouts will get into the final design.

Cells and Blocks as Units of Design

Chip design makes heavy use of cells, which are grouped into blocks. A cell is associated with a set of data files that are sometimes called cell "views." Cell views contain functional or physical representations of the cell. Typically, there are two or more views of a cell that present design data in design languages such as SPICE, Extracted Netlist, GDSII, Liberty, Vital and/or LEF. Different views specify different types of information about a cell. Different electronic design automation (EDA) tools operate on different views and the data they contain. Some tools manipulate detailed polygon data, while others work only with simplified polygon representations. Performance estimation tools do not work with polygons at all—they use timing information. If the versions for the views of a cell used by the various tools are not consistent, there is a substantial risk that a design using that cell will fail.

A chip-level design block may contain several cell blocks of cells. Cell blocks may contain references to cells and to sub-blocks that contain other cells and so on. References may be nested. References to cells are eventually expanded when the chip is fabricated. During the design process, use of references greatly reduces the amount of memory and disk space required to represent the design. A memory area on a chip, for example, will contain the definition of one or more core bit cells, row and column cells that read and write bit cells, and a top-level cell that references the core bit cell, the row cells, and the column cells. A 65,536 bit memory (a "64 K bit memory") will typically have one bit cell definition, referenced 65,536 times; two column driver or sensing cell definitions (top and bottom) referenced 256 times; two row driver or sensing cell definitions referenced 256 times; and assorted decoding circuits. Hierarchical design can further reduce the number of references; a row of the memory could be defined to contain references to left and right row cells plus 256 references to the core bit cell, and then this row could be referenced 256 times. Fewer than 1,000 nested references could be used, instead of 65,536 cell references.

When masks (tooling for fabricating cells on chips) are made or direct writing is used, cell references are expanded. In the memory example above, no matter how the cell hierarchy is specified, there will be 65,536 core bit cells printed on the wafer, copied from the single original cell. Before expansion, a design data file may be tens of gigabytes in size; after expansion, the file can be many times larger. Only a few tools need to work with the fully expanded data, including the mask data preparation software workstation and possibly the rule checking system that checks for design rule violations in the chip design.

Some views use file formats that provide for multiple "cells" within a single file. This adds another dimension of complexity: the version of a file in one of these formats depends on the versions of all of the cells inside it.

Complex design templates such as processor cores tend to have many associated artifacts. Typically, artifacts are stored in a separate file. These may be performance constraint files for logic synthesis, behavioral description files for simulation, or log files from the tools that constructed of the cells. All of these files are supposed to be synchronized with the major layout and timing views of the cell.

More subtly, some views of cells can change even when the representation of or physical layout of those cells (e.g. layout) has not changed. For example, timing models may change if a change is made to the fabrication process at the foundry or simply because more information becomes available about average performance of products from the foundry.

Figure 4:
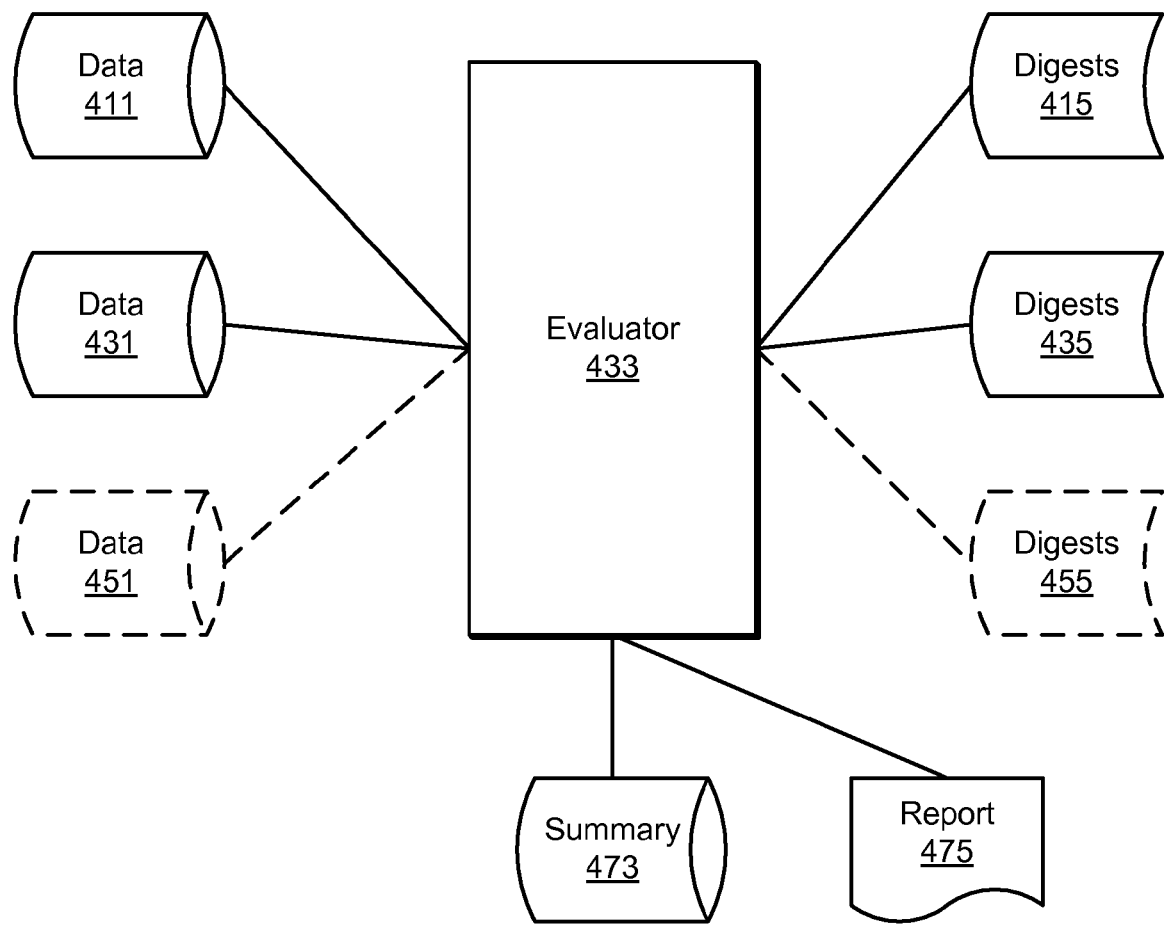
FIG. 4 depicts an evaluator that digests canonical representations of parts of multiple data files.

How Canonical Cell Digests ("CCDs") and Canonical Design Unit Digests ("CDUDs") Work Canonical cell digests and, more generally, canonical design unit digests, are outputs of a new tool that will be useful in the IC design process. The canonical digest tools disclosed in this document generate file-wide, cell-by-cell, and layer-by-layer digests for common EDA file formats and can be extended to other file formats. These tools can distinguish between trivial changes such as whitespace or comment modifications and major changes such as new interfaces to cells. It allows matching of cells to a repository of versioned cell digests to detect unauthorized use of untested cells, obsolete cells, changes to cells, or copies of cells under different names. At a high level, FIG. 4 depicts an evaluator 433 that digests 415, 435, 455 canonical representations of parts of multiple data files 411, 431, 451. Digests representing two or more files are compared. In this context, for patent purposes, the term "file" is used generically, as two files of data might be stored in a single database. Within the design industry, design files are typically stored in a file hierarchy, such as a Windows or Linux file system. The evaluator 433 compares the digests and generates a summary 473 or report 475 of similarities and/or differences in digests that are of interest for a particular purpose.

A canonical cell digest or design unit digest is generated by processing a file 411 that contains design data, as illustrated in FIG. 5. This design data ultimately contributes to production of a physical circuit, also called an integrated circuit or a chip. In one embodiment, a parser 531 running on a processor 530, normalizer logic 533 running cooperatively with the parser, and a digester 534 running on the processor generated syntax trees 532 and canonical cell digests that are stored in memory 415. The canonical organization of a cell digest depends on the design language being parsed. These processors generate at least one digest per cell. The digests, for instance, may be 32 or 64 bit codes generated from canonical output of the parser and normalizer logic. A variety of hash functions can be used to create the digests, such as CRC, MD5 and others. The digester can generate separate digests for header and body parts of a cell and generate digests by layer within a cell. Comments, whitespace and functionally significant data can be separately digested. Digests can be stored persistently for later use. For instance, digests of an approved library can be generated and stored for repeated comparison to digests of design projects.

Comparison of canonical digests is a powerful tool that allows a user to understand small differences between design elements in large files. As indicated above, design files, especially files containing binary polygon data, can be enormous. Thousands or hundreds of thousands of cells (or more, with large memories, for instance) are contained in the design file. With this much data, false alarms are a real problem. One use of canonical cell digests is to identify and allow filtering of detected changes based on their functional significance and, sometimes, their source in the design process.

A comparer 536 running on a processor 535 and a reporter 537 running on the processor operate on digests stored in memory 415 by the digester 534. Typically, either two or three groups of files 411 are compared. For the sake of simplicity we refer to a group of files as a "file" and expect that the reader will understand that the actual number of files compared is arbitrary. "Two files" means two or more files. Two files may represent an old library of cells and a new library of cells. Three files may be a design file, an approved library of cells and a collection of rejected cell designs that will cause failure if the rejected designs are used in a product. The comparer checks digests for one file against digests for one or more other files. The reporter, responsive to filtering criteria, reports matches between cells in the respective files, near-matches, or cells in one file that are not found in the other files. These reports may be summaries to memory 473, such as a database or other intermediate format that another program can process, or to a report 475 that is viewable by a human operator, either on a display or on paper. There are a wide variety of use cases for comparing files to produce useful reports.

Some of the use cases for this technology are:
Understanding an updated cell design library
Evaluating the impact of an updated cell library on designs in process
Finding unapproved and/or bad cells in design data before place and route, before tapeout and at other design milestones
Identifying renamed cells in design data and verifying that they match approved cell templates
Detecting cell modifications that jeopardize warranties of the vendors who provide the templates Counting the number of cells in a production design for which royalties are owed From these use cases, one should be able to see how powerful the disclosed canonical digests will be as a tool for circuit designers.

A prototype canonical digest tool processes the following major published EDA design data formats, and can readily be extended to other formats:

- Open Artwork System Interchange Standard (OASIS®) geometric layout files
- Calma GDSII geometric layout files
- Synopsys Liberty library circuit timing model files
- Verilog Register Transfer Level description files
- VHSIC Hardware Description Language (VHDL) Register Transfer Level description files
- Simulation Program with Integrated Circuit Emphasis (SPICE) sub-circuit netlist files
- Cadence Library Exchange Format (LEF) layout description files
- Cadence Design Exchange Format (DEF) design description files
- "Structured Text" scripting and control files
- Unstructured (arbitrary or unknown format) text files
- Unstructured (unknown format) binary files The tool also provides an application programming interface (API) for computing canonical cell digests for proprietary data formats ("User-parsed" files). A parser running on a processor identifies significant design objects within the files and generates digests for cells, interfaces to cells, cell bodies, and file header data outside of any cell.

Comments within cells or in the file header are marked separately so that changes in only the comments can be identified. The data within file headers, cell interfaces, and cell bodies is furthermore separated by layer when appropriate so that changes to individual layers are obvious. When data within a file format is order-independent and sorting is requested, the canonical cell digest tool sorts only the data that is order-independent, leaving order-dependent data in its original order.

Digest Calculation Basics

Three general classes of objects within a design data file to which canonical cell digests can be applied are files, file headers, and cells. File-level digests can be calculated from all of the data in the file. Canonical cell digests are digests of canonically reorganized data for the cells or modules of a file. Canonical file header digests are digests of canonically reorganized data that are not in any cell or module. Depending on the design language or data file format and on user selected options, more or less reorganization is applied before digests are generated. In this disclosure, "canonical design unit digests" collectively refers to digests applied to file header and cell data. In the many examples provided, one will see that the design data in files can generally be treated as header or cell data, even in formats that have only one or the other category of data.

Canonical cell digests can refer to multiple digests calculated for parts of a cell: comment data, layer data, and non-layer data. Comment data is non-functional data (usually text) as determined by the specification for a given file format. For most formats, changes in comment digests can be ignored. Layer data has a distinct layer name or number that is meaningful to tools reading the file, such as first layer metal or polysilicon. Non-layer data represents objects that do not have a layer number, such as cell placements (instantiations) in GDSII or OASIS®, or objects in files that are not divided by layer number.

Layer data is further separated into geometry data and non-geometry data. GDSII and OASIS® files have text and node name records that are not geometric data but still have layer numbers. Changes to node and text information are not necessarily as significant as changes to geometric data such as paths or polygons, so node and text digests are recorded separately. A user may choose to treat node and text data with the same importance as geometric data, but it is not necessary to do so.

Organization of Files and Digests

For digest computation purposes, a file most generally includes an optional header and zero or more cells. Within the file header (which may include text between cells if that text does not clearly belong to a cell, such as when a cell has a distinct end record) there are comments plus header data, either on specified layers or explicitly reported as "non-layer data" such as when a file format does not have layer names or numbers.

Cells have an optional interface, an optional body, and optional comments. At least one of these three classes will be present in a cell. Cell interface data is either on named layers or numbers, or it is explicitly reported as "non-layer data".

Cell body data is either on named or numbered layers, or it is explicitly reported as "non-layer data". The cell body (but not, in the present implementation, the cell interface or file header) may have "non-geometric data", which for a geometric data format is information that does not specify polygons, rectangles, wires, etc. Typically non-geometric data would be properties and text records (e.g. in a GDSII or OASIS® file). If the data format is not geometric (e.g. Liberty timing models), then all data is non-geometric even though it is not recorded in this class—callers are expected to know. Usually this is obvious because all data will be "non-layer". This is an implementation decision and is not critical to the invention.

As examples, the reports may have general or detailed categories. An example of general categories follows:

File:
file header comments
file header non-layer
file header layer . . .
cell . . .
Cell:
cell comments
cell interface non-layer
cell interface layer . . .
cell body non-layer
cell body layer . . .
cell body non-geometric non-layer
cell body non-geometric layer . . .

An example of more detailed categories follows:
File:
File
File non-whitespace
File whitespace
File Header (not sorted: insufficient memory)
File Header (no Sort requested)
File Header Comments
File Header non-layer data ((−1)
File Header layer-by-layer
Cell
Cell (Sorted)
Cell (not sorted: insufficient memory)
Cell (no Sort requested)
Cell without Comments
Cell Comments
Cell Interface
Cell Interface including File Header Cell Interface excluding File Header
Cell Interface non-layer data (−1)
Cell Interface layer-by-layer
Cell Body non-layer data (−1)
Cell Body layer-by-layer Geometry
Cell Body layer-by-layer non-Geometry.
  GDSII Example
  As an example, consider the digest report generated by the command-line canonical digest tool for a small GDSII file:

```
File "testfiles/sigtest.gds": GDS format
Arguments: -grid 1e-9 -mem 64 -nosort
  db7be73c   File
  (none)     File non-Whitespace
  (none)     File Whitespace
File Header (not sorted)
  8f078078   File Header with Comments
  3289c53f   File Header without Comments
  bd8e4547   File Header Comments
  3289c53f   File Header non-Layer
Cell "Structure_1" (not sorted)
  a7100492   Cell with Comments
  3d4d7fbf   Cell without Comments
  9a5d7b2d   Cell Comments
  7b78aab4   Cell Body non-Layer
  15546763   Cell Body Layer 3
  fda35715   Cell Body Layer 42
  aec2e57d   Cell Body non-Geometric Data Layer 3
Cell "Structure_2" (not sorted)
  cd2b135d   Cell with Comments
  d2c6c150   Cell without Comments
  1fedd20d   Cell Comments
  0f4c0817   Cell Body Layer 1
  d4133b6c   Cell Body Layer 19
  0999f22b   Cell Body non-Geometric Data Layer 5
Cell "Structure_3" (not sorted; hierarchical)
  a7100492   Cell with Comments
  3d4d7fbf   Cell without Comments
  9a5d7b2d   Cell Comments
  7b78aab4   Cell Body non-Layer
  15546763   Cell Body Layer 3
  fda35715   Cell Body Layer 42
  aec2e57d   Cell Body non-Geometric Data Layer 3
Cell "Structure_4" (not sorted; hierarchical)
  70262033   Cell with Comments
  5242eac1   Cell without Comments
  2264caf2   Cell Comments
  7b78aab4   Cell Body non-Layer
  7a5bf21d   Cell Body Layer 3
  fda35715   Cell Body Layer 42
  aec2e57d   Cell Body non-Geometric Data Layer 3
```

Processing of a reference file testfiles/sigtest.gds generates a 32-bit file-level digest of db7be73c (hexadecimal). When the digest for the entire file is stored in a digest repository, one can use this digest to determine quickly whether any changes had been made to the file since digests were last processed and stored in a digest repository.

GDSII is a binary file format. A file containing binary data does not contain whitespace, therefore the digests of whitespace and non-whitespace digests are not reported. Where applicable, non-whitespace digests can be reported as a means to determine whether a change to a data file originated from a change in whitespace only. Symbolic (text) data within a file is often separated by whitespace (space characters, tabs, or newlines), and typically the amount of whitespace is not significant. To help determine whether changes to symbolic data have been made, the prototype canonical digest tool computes digests for all whitespace characters in the file and for all non-whitespace characters in the file. Note that a whitespace digest captures the amount of whitespace byte-by-byte irrespective of its location. For instance, the same whitespace (using a single space character) and non-whitespace digests will be reported for the two strings "abc def" and "abcd ef."

Most data within a GDSII file is within the cells ("structures" in GDSII nomenclature), but there are some records outside of any cell. This data is digested in file header digests. This header data can be partitioned by type, either as file header comments or file header non-layer data; there are no layer numbers assigned to the data within a GDSII file header. Details of the interpretation and recording of GDSII data are described below.

For consistency, a common reporting format can be used or digests can be saved in a database. In this sample, the word "(none)" is printed in place of a digest when no data has been recorded for that digest type. Two examples of this are seen in the file digest block within the report.

A composite file header digest is recorded along with the individual file header digests. This is computed by the command-line utility for the user's convenience; in one embodiment, it is simply the exclusive-OR (XOR) of the individual file header canonical cell digests. It is also possible to compute the composite file header digest at the same time that cell digests are being computed. The composite file header digest can be used to help detect changes in file header data.

Below the file header digest block appear individual cell digest blocks. The cell digests, as shown, include a comment digest, geometry digests for layer and non-layer data, non-geometry digests for layer and non-layer data, and composite cell digests for the cell with and without comments. As with the composite file header digest, the composite cell digest is generated in one embodiment by exclusive ORing together the other cell digests. They can be used to help detect changes in cell data.

The digests for the above GSDII file were generated without sorting the data. This is reported in the program argument list printed right below the file name and along with blocks of digests.

Cells Structure_3 and Structure_4 are hierarchical, meaning they have SREF or AREF references to other cells in them. Generally speaking, digests for place and route cells and other cells high in a design database hierarchy will change much more often than digests for the leaf cells they reference. Knowledge of whether a changed cell is a leaf cell can help one determine the significance of digest changes.

Looking at the canonical cell digests for cells Structure_1 and Structure_3, one sees that all of the digests for these cells are identical. This indicates a match in the polygon and structure (cell) reference data for these two cells. The digests for Cells Structure_2 and Structure_4 do not match those for any other cells.

If sorting is requested, different digests are generated for some parts of the cells:

```
File "testfiles/sigtest.gds": GDS format
Arguments: -grid 1e-9 -mem 64 -sort
  db7be73c   File
  (none)     File non-Whitespace
  (none)     File Whitespace
File Header (sorted)
  8f078078   File Header with Comments
  3289c53f   File Header without Comments
  bd8e4547   File Header Comments
  3289c53f   File Header non-Layer
Cell "Structure_1" (sorted)
  a7100492   Cell with Comments
  3d4d7fbf   Cell without Comments
  9a5d7b2d   Cell Comments
  7b78aab4   Cell Body non-Layer
```

-continued

```
    15546763    Cell Body Layer 3
    fda35715    Cell Body Layer 42
    aec2e57d    Cell Body non-Geometric Data Layer 3
Cell "Structure_2" (sorted)
    cd2b135d    Cell with Comments
    d2c6c150    Cell without Comments
    1fedd20d    Cell Comments
    0f4c0817    Cell Body Layer 1
    d4133b6c    Cell Body Layer 19
    0999f22b    Cell Body non-Geometric Data Layer 5
Cell "Structure_3" (sorted; hierarchical)
    a7100492    Cell with Comments
    3d4d7fbf    Cell without Comments
    9a5d7b2d    Cell Comments
    7b78aab4    Cell Body non-Layer
    15546763    Cell Body Layer 3
    fda35715    Cell Body Layer 42
    aec2e57d    Cell Body non-Geometric Data Layer 3
Cell "Structure_4" (sorted; hierarchical)
    1f29b54d    Cell with Comments
    3d4d7fbf    Cell without Comments
    2264caf2    Cell Comments
    7b78aab4    Cell Body non-Layer
    15546763    Cell Body Layer 3
    fda35715    Cell Body Layer 42
    aec2e57d    Cell Body non-Geometric Data Layer 3
```

The file-level digest produced from file data before parsing is not affected by sorting. The file header digest block did not change either, because GDSII file header data is order-dependent and, therefore, is not sorted. Many cell element digests are changed because the data was reordered by a sort. The canonical cell digests for cell Body Layers 3 and 42 in cell Structure_4 now match those of Structure_1 and Structure_3. This shows that Structure_4 is the layer equivalent of Structure_1 and Structure_3.

For some formats (e.g. GDSII and OASIS®), sorting is so useful for digest matching that it should be the default behavior. Most cells in IC design files are small, so there is only a limited runtime impact.

If 64-bit digests are requested, an excerpt of the report, without sorting, would be:

```
File "testfiles/sigtest.gds": GDS format
Arguments: -grid 1e-9 -mem 64 -nosort
    3670d1e4a8c8c74b      File
    (none)                File non-Whitespace
    (none)                File Whitespace
File Header (not sorted)
    026a2a5b01e0f6ec      File Header with Comments
    fd352337a1644620      File Header without Comments
    ff5f096ca084b0cc      File Header Comments
    fd352337a1644620      File Header non-Layer
Cell "Structure_1" (not sorted)
    41a9962cc923db00      Cell with Comments
    a9a2d1241367de40      Cell without Comments
    e80b4708da440540      Cell Comments
    bb89d94bb8544e78      Cell Body non-Layer
    b9ef42b48f65e40d      Cell Body Layer 3
    e16d5f5cf714adc4      Cell Body Layer 42
    4aa91587d342d9f1      Cell Body non-Geometric Data Layer 3
Cell "Structure_2" (not sorted)
    30f8dca7d40bb330      Cell with Comments
    1db29288b51ebd16      Cell without Comments
    2d4a4e2f61150e26      Cell Comments
    a80b7d0fa1a83fe1      Cell Body Layer 1
    4bb6333790890817      Cell Body Layer 19
    fe0fdcb0843f8ae0      Cell Body non-Geometric Data Layer 5
```

Sequentially Using Canonical Digests and DIFF Tools

Difference tools and algorithms are mentioned above. Difference tools require a pair of files, which are being compared to calculate differences, to be present at the time of analysis. In contrast, canonical digests can be compared without having either file present.

One application of canonical digests in combination with differencing tools would be to use the canonical digests to identify cells that differ for further inquiry. A differencing tool can be used to identify the details of what had changed within the cells that differ. This well focused use of differencing tools is much more efficient than trying to compare whole design files using differencing algorithms.

Typical difference algorithms require that data be in more or less the same order for comparison because they do not know of a valid reordering. After all, they are looking for common subsequences. The run time of differencing algorithms is in the worst case exponential. To improve their run times, most difference algorithms have a maximum window beyond which they assume completely different data (i.e., if there are no matches within the window.) Paul Heckel's differencing algorithm is an exception to these limitations. See, "A Technique for Isolating Differences Between Files", Communications of the ACM 21 (April 1978): pp. 264-268.

Difference algorithms assume no structure (or very little structure—text lines only) in the data files they are comparing. They do not in themselves understand cells, headers, layers, non-layer data, or comments.

DesignSync and IC Manage are tools for the IC design industry that appear to be based on standard file differencing algorithms. These programs do not appear to have a deep comprehension of the functional significance of the data that they manage. IC Manage (http://www.icmanage.com) uses the Perforce source code management system underneath. Perforce is a general purpose data management and differencing tool that does not attempt to comprehend EDA data file formats. DesignSync (http://www.3ds.com) literature talks of linking together multiple related files to represent a cell (i.e. the multiple views). More information about DesignSync can be found (as of May 2009) at:

http://www.3ds.com/products/enovia/industries/high-tech/semiconductor/
http://www.3ds.com/fileadmin/PRODUCTS/ENOVIA/PDF/SynchDesignSync-0805_PRESS_.pdf
http://www.3ds.com/fileadmin/PRODUCTS/ENOVIA/PDF/SemiAccIPmgmt-0805_PRESS_.pdf Differencing tools are useful for a detailed comparison of cells that are identified by canonical cell digests as being near-matches. They cannot reasonably be used to analyze huge design files or cell libraries because of run time, lack of understanding of EDA file syntaxes, noisy reports and limitations on matching. They cannot report which cells have changed and may report false differences when order-independent data is reordered.

With this overview of canonical cell digests and their usefulness in mind, we turn to an in-depth disclosure, with many examples of how canonical representations of chip design data are constructed.

Expanded Background and Vocabulary

Typically a chip design proceeds through three major phases: 1) development or acquisition of standard cell and other design template libraries (not all fabless design houses will develop their own design template libraries); 2) front end design—the creation of RTL, then logic synthesis; and 3) back end design—floor planning, placement and routing, and in-place optimization (IPO).

In front end design, higher level design template blocks are incorporated ("instantiated") by designers directly, not selected by the logic synthesis tool. Logic synthesis generally selects only standard cells, which have simpler functionality, as it converts the designers' RTL to a structural netlist for back end design. In back end design, the logic is adapted to production of masks that are used, in turn, to manufacture chips.

An advanced integrated circuit (sometimes called a "system on chip" or "SoC") contains high-level functional blocks of circuitry, which may be complex design templates or completed placed-and-routed portions of the design. The latter typically comprises standard cells selected by a logic synthesis system.

Fabless chip design companies and third-party design template suppliers create sophisticated cell blocks that contain more than one standard cell and can perform some operation commonly used in the design of an integrated circuit. An ARM processor, for instance, is available as a design template that can be incorporated in a chip.

A larger cell block that contains one or more references to smaller cells or cell blocks is said to be hierarchical. The cell block contained within the larger block can itself be hierarchical, so that there can be several levels of hierarchy within a cell block. Because the smaller cells and cell blocks are incorporated by reference, their views and dependencies remain the same.

A set of cells and cell blocks together represent a design template block library. A block library may have been provided by a third-party supplier or created by an internal library development team. The design templates within such a library range from relatively simple blocks such as adders and multipliers to communications components such as USB ports and on to complex components such as digital signal processors (DSPs) or general purpose processors such as those provided by ARM. All of these can be used in multiple places within an integrated circuit design.

The views and artifacts used by the design team to design and manufacture chips reside within a read-only block library. There can be hundreds to thousands of design templates within dozens of libraries which together form a larger library that serves the integrated design groups. Logic and physical design teams use the library to create the functionality and the physical layout, respectively, of the integrated circuit.

Not every design template from a library will be used in an integrated circuit design. Logic synthesis tools often select from a subset of standard cell types, choosing only the cells that work well with their optimization algorithms. Design template libraries may include a class of related function blocks or preconfigured variants, such as memory blocks, and a design team may choose to use only a subset of those variants.

For the reader who notices differences between how we describe things in this disclosure and the nomenclature more typically used, we point out that our "design templates" are often referred to in the industry as "IP." We consider design templates to better remind the reader of the physical relationship between design data and integrated circuits.

Views and Artifacts

Cells have views and artifacts. A view is one of the physical, functional or electrical representations of a cell. The views together specify how the cell works within a design, and thus how a designer can use it to create an integrated circuit.

An artifact is typically a file that results from the creation of a cell view, such as the log file or datasheet for a compiled RAM block, or a constraint file to be used when a design template is incorporated into a large block. Artifacts are often unstructured text files that might not be used directly in a tool but convey meaning to a designer. It is useful to keep them synchronized with the other views for the cell.

GDSII and OASIS® (polygon level) views represent the physical layout of leaf cells, cell blocks, functional blocks and the entire integrated circuit. A Liberty view represents the timing model for a leaf cell or a complex design template.

RTL views, either created by designers or provided in lieu of physical layout for design templates, describe the behavior of a design and logical connections to any design templates such as processor cores. An RTL view is usually in Verilog or VHDL format. Logic synthesis uses RTL views plus constraint and simulation control files to generate a structural netlist (usually Verilog or VHDL).

Designers use structural netlists to create a floor plan for the integrated circuit. A view in the Design Exchange Format (DEF) represents the floor plan to a place and route program. The structural netlist, Liberty, LEF, and DEF views are used as inputs to the place and route program. Placement is typically performed within one functional block at a time; routing is performed both within a functional block (intrablock) and between functional blocks and design templates (interblock). Some views are used to create other views. For example, the GDSII polygon data for a leaf cell or standard cell is sent to a circuit extractor to determine the transistor connections and parasitic elements. These derived views are called dependent views. When the source view changes, it may be useful to regenerate some or all of the dependent views.

Cells, Cell Interfaces, and Cell Bodies

Canonical digests for a file are computed by analyzing the file and categorizing sections by type. Many files have a header which may include global information about the file. There may also be cells or modules, individual design units which are combined to form a design. A cell may be broken down further into the cell name, the cell interface, and the cell body. Nearly all file formats also have a method for specifying comments, officially non-functional text that can still convey some meaning to readers or certain tools.

The interface of a cell is the specification of the cell to the outside world. Changes to the interface are presumed to be significant and so they are flagged separately for review and approval. As a design moves towards completion, the standards for approval of interface changes will increase because significant rework would be required to make use of the new cell. For example, if the placement of a pin in a layout cell changes, the new version cannot be used as a drop-in replacement without rerouting the design. This is not an issue during logic design, but in the latter stages of physical design it could cause major schedule delays.

Components that are not part of the cell interface are part of the cell body. These aspects of the cell can change without automatically invalidating existing instantiations of the cell. For example, changes to implant layers in the middle of a layout cell will not require rerouting.

GDSII and OASIS® files have two classes of data within the body of a cell. The second class of data is non-geometric data such as text points and node points, so this is called cell non-geometric body data. The distinction is arbitrary; this class of data is simply recorded separately. It is also available for user-parsed text files.

Some file formats can specify hierarchical data: cells that contain references to other cells. Where this information is available, it is returned with the digest data as a flag in the cell.

Layers

Many design files are split into layers. Different layers have different functions, and changes to some layers are "cheaper" than others. For example, if a logic error is found after a design has been fabricated, a fix that requires modifications only to one or more metal masks is cheaper than one that requires changes to transistor layers. Digests for file headers, cell interfaces, and cell bodies may be defined on a layer-by-layer basis.

Internally, the digest module records digests on layers indexed by integer, typically from −1 to a small positive number. A layer number of −1 normally represents data not on any layer, such as cell references in a layout file such as GDSII or OASIS®, or all data for a format that does not have layers.

Parsers with text-based layer names return a mapping of layer numbers to layer names, so that digests may be reported by name. Parsers may assign layer numbers themselves, so it is useful to retrieve this list and record or print numbers with the digests.

Sorting

Some portions of data in some formats are order-independent, meaning that the interpretation of the file does not depend on the order of appearance of objects (e.g. polygons) within a header or cell. An option to sort these portions of files is provided. For example, a VHDL module may be instantiated using an association list in which wires are associated by name with ports. These may be listed in any order. Sequential statements within the module, however, should not be reordered and so they are not sorted even if a sort option is selected.

If file data is held in memory until all of it can be sorted, a significant amount of memory may be required. If the memory usage limit passed to the program is exceeded, the stored data (usually the cell data) may be sent immediately to the digest module in the same order in which it was read from the file, or a file-based sort may be used. Details of the sort routines are disclosed in the descriptions of the individual file formats.

File header and cell digests may change when memory usage limits are changed or if program memory usage improves. A flag denoting whether a cell was sorted is available through the Applications Programming Interface (API) and may be saved in a digest database along with the digests for the file header or cell. Using this flag a program can determine whether a digest change is due to an actual change in the data or is caused only by a change in sorting.

Comments

For most formats, comments are sent immediately to the digest module without sorting or further interpretation. Comments within a cell are added to the comment digest for that cell; comments outside of any cell are added to the file header comment digest. In VHDL, comments may contain synthesis directives, so they are associated with specific token sequences and thus may be sorted.

Comments do not have layer names or numbers.

Design Data File Formats Reviewed

Many views of chip design data use specialized file formats. Some of these are binary and some are text (symbolic). The files tend to be large, however, and hard to view even when they are human-readable. They are created by library and design template vendors and used by Electronic Design Automation (EDA) tools, but a typical design house has not had the ability to interpret the files and make judgments about those files on its own.

GDSII and OASIS® views contain the physical layout of leaf cells and hierarchical cells. Leaf cells contain only geometry (polygons, wires, rectangles, circles, etc.). Hierarchical cells contain references to other cells and may also contain geometry. There may also be design template blocks, cells of possibly complex function such as a processor core that are imported from vendors. Designers are supposed to use leaf cells and design template blocks without modification.

A GDSII or OASIS® view is contained in a single file and contains geometric data for a number of cells. Such a view may define a library of geometric data to be referenced within a chip or it may define the geometric data for a chip.

A Library Exchange Format (LEF) view contains a simplified version of the physical layout of one or more leaf cells or design template blocks for presentation to a place and route tool.

A Liberty view contains timing information for one or more cells, which may be leaf cells, complex design templates, or a mix of each.

Register Transfer Level (RTL) views contain behavioral descriptions of cells. Typically RTL views are specified in the Verilog or VHDL language formats. Logic synthesis converts RTL views to structural netlists, which are views that contain references to leaf cells, design template blocks, or other structural netlists. Structural netlists are often in a very restricted version of the Verilog or VHDL language formats, containing only lists of referenced cells and not any behavioral descriptions. A structural netlist is suitable for entry to a place and route tool. Once the structural netlist is placed and routed, its performance can be evaluated and if suitable can be released to fabrication.

A Design Exchange Format (DEF) view contains a description of a floor plan, a coarse representation of a chip. It defines the placement of large design template blocks and blank areas, into which the place and route tool puts standard cells. It is possible to create a DEF file for a block within a chip, run placement and routing for that block, and then use the block within a higher-level DEF view. The placed and routed block is then treated the same as a design template block.

When creating a library of standard cells, circuit extraction is performed on the physical layout. An electrical representation of the devices and interconnections in the physical layout, including any parasitic components such as capacitances and resistors, is created and put into a format usable by a circuit simulator such as SPICE. A SPICE view may represent data for a leaf cell or a hierarchical cell.

The SPICE view is used as input to a circuit characterization program, which typically uses SPICE or another electrical simulator to evaluate the circuit under a particular stimulus or set of stimuli, then estimate the delays within the circuit. These delays are then stored within the Liberty view. The logic synthesis and place and route tools use the Liberty views to estimate the performance of a design or portion of a design.

As can be seen from the descriptions above, certain views contain data that is used to generate other views. For example, the GDSII or OASIS® layout view is used to create the LEF and extracted netlist views, and the extracted netlist view is used to generate the Liberty view. The created views are known as dependent views, and there may be a complex relationship between the independent views, such as layout, and the dependent views.

Standard cells typically implement relatively simple functions, from an inverter (two transistors) to a flip-flop (20-40 transistors) or adder (10-100 transistors). Their functions are simple enough for a logic synthesis tool to manipulate directly. There may be several thousand standard cells in a single standard cell library, and three to perhaps several dozen standard cell libraries available for a single design.

Design template blocks typically implement more complex functions such as processor cores, read-write memory (RAM), read-only memory (ROM), or input/output subsystems. Their functions are too complex for a logic synthesis tool to manipulate directly. Instead designers explicitly ask for instances of design template blocks to be inserted into their design, then specify the connections to the design template blocks. For convenience, the instances are usually placed into the RTL views. There may be hundreds of individual design template blocks placed in a single SoC design.

Memories are typically created using compilers written by the design template providers. These allow designers to generate custom memory configurations (e.g. word width, number of words) that are warranted by the design template providers as long as they are not modified once the compilers complete. To this end, designers are supposed to treat the output of a memory compiler as a design template block.

A memory block may be contained in a hierarchical GDSII or OASIS® view. This view is incorporated into the design during final assembly. The compiler also generates timing views (typically Liberty) and physical abstractions (typically LEF) so that automated tools can analyze designs which use the memories.

When all standard cell libraries and design template blocks available to a design team are considered, there may be tens of thousands of distinct cells. Not all of these cells may be used in a given design. For example, a design team might have had bad experiences with a logic synthesis tool using exclusive-OR (XOR) gates, and so they may tell the logic synthesis tool not to use any XOR gates. Some cell functions may be present in multiple drive strengths—current capacities for handling varying amounts of attached circuitry and parasitic components—and the design tools might not use all of the drive strengths in a given design.

Working Examples of Canonical Digests for Cell Views

In this section, we describe and analyze many of the design languages and file formats used for IC design. We provide more than a dozen examples of preparing canonical versions of design data used in an IC design flow.

Figure 1:
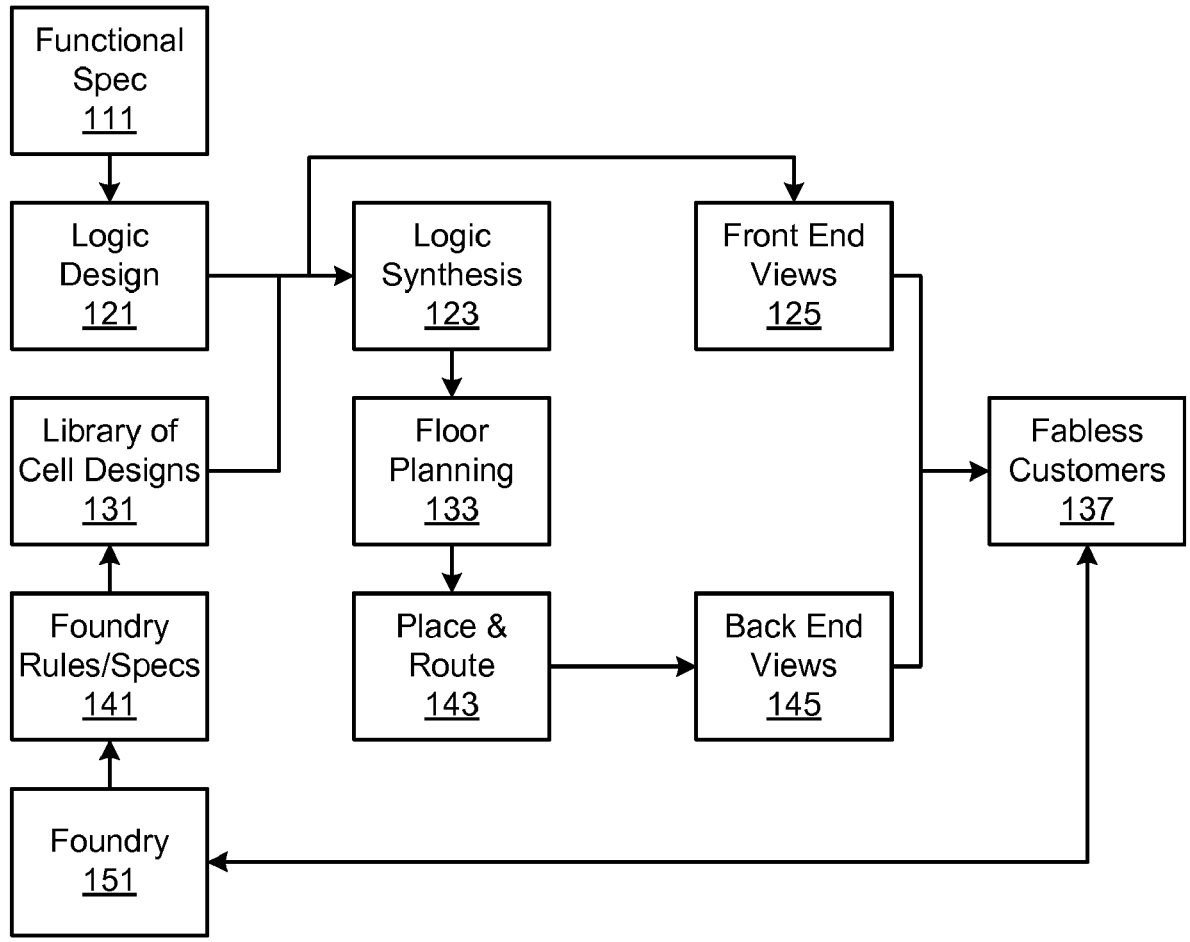
FIG. 1 illustrates, at a high-level, an integrated circuit design environment.

FIG. 1 illustrates, at a high-level, an integrated circuit design environment. Of course, there are many variations on this environment and many details that are not shown. In this variation, most of the blocks illustrate the process that a developer of cell design templates might follow to provide the templates to fabless customers 137 who rely on a foundry 151 to produce chips and act on feedback from the foundries. From this diagram, one should understand that the fabless customer's release of a design for manufacture by the foundry includes the so-called "tapeout" for mask production. At the beginning of the design process, the designer develops a functional specification 111 and performs logic design to produce RTL 121, which may provide new functionality not found in competitors' devices or at a lower price. The designer has available information from the foundry that includes foundry rules and electrical information 141. The foundry information is reflected in a library of cell design templates 131 that are combined with the RTL during logic synthesis 123. RTL is sometimes offered to the fabless customers as front-end views 125. The output of logic synthesis is used in floor planning 133; the output of floor planning is used in place and route operations 143 that produce back-end views 145. Not shown, but readily understood, the place and route operations are subject to physical contraints. Back-end views are released to fabless customers 137. Back-end and front-end views may be compiled into libraries by or for the fabless customers. These back-end views are in the form of fixed blocks that customers should not modify.

Figure 2:
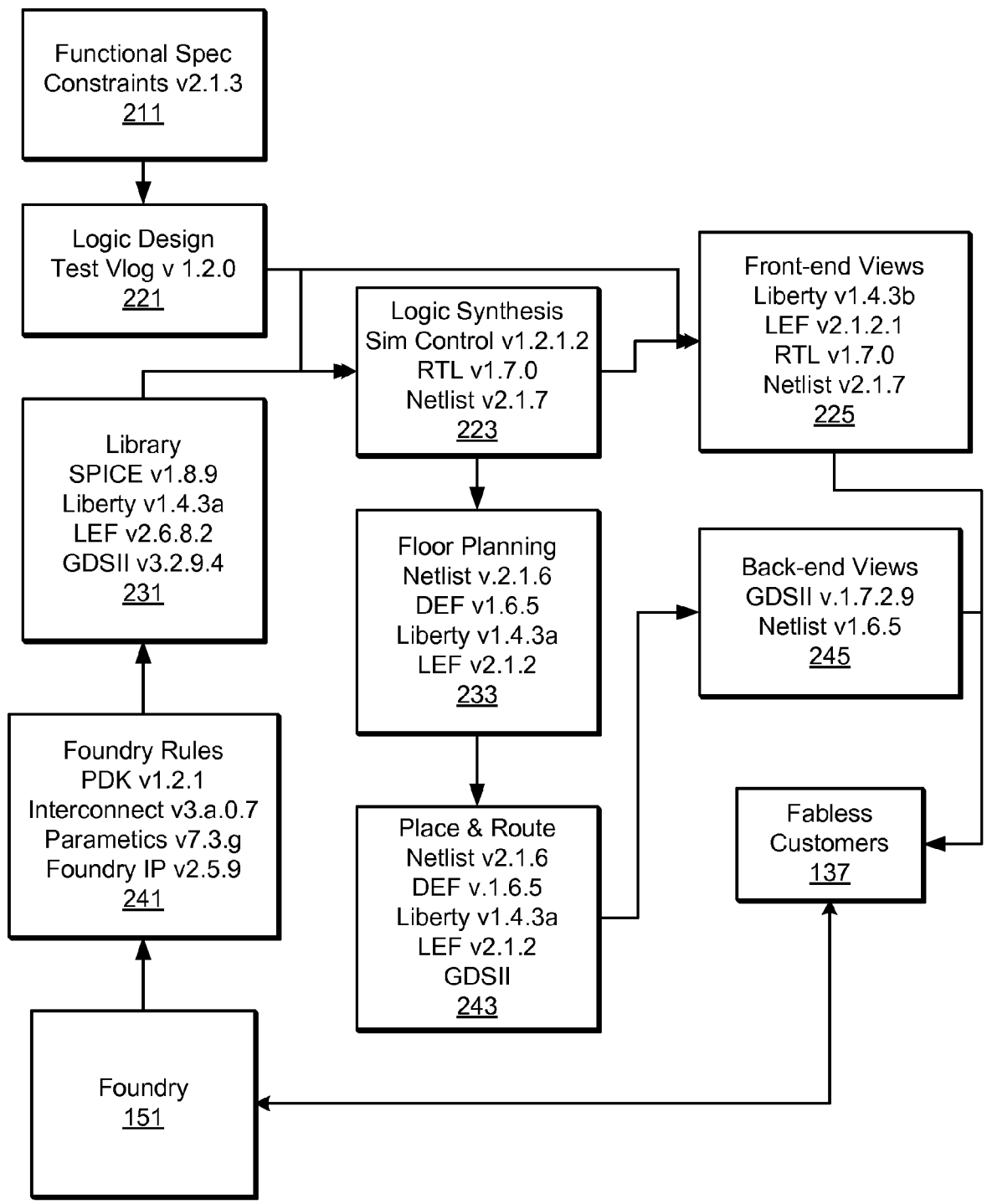
FIG. 2 illustrates the proliferation of versions and some of the file formats associated with the blocks in FIG. 1.

FIG. 2 illustrates the proliferation of versions and some of the file formats associated with the blocks in FIG. 1. Parallel numbering between the figures associates the blocks in the two figures. Functional specifications may be expressed in a design language. The functional specification constraints will have a version. The RTL created in logic design 221 may be expressed in Verilog or VHDL, which will have its own version. The foundry rules 241 may be expressed in languages such as PDK, Interconnect, Parametrics or a foundry proprietary language. A reference cell library may include a number of views for design data. Languages for expressing these views include SPICE, Liberty, LEF and GDSII. During logic design 221, outputs may include simulation control and RTL (Verilog or VHDL). Results of logic design may be published directly as front-end views 225 expressed using Liberty, LEF, and RTL; or they may be sent to logic synthesis 223. The results of logic synthesis 223 are combined with physical specifications 253 and used as input to floor planning 233 and to place and route 243. These processes utilize views such as structural netlist, DEF, Liberty, LEF and GDSII. Results of these processes may be published as backend views 245. Fabless customers 137 may use front end and/or back end views of design data. Note that the version numbers included in FIG. 2 are merely illustrative and should not be taken as references to past, current or future versions of languages or libraries. The file formats referenced in FIG. 2 are explained in the following section.

Classification of File Types

For this discussion, files are classified as unstructured text, structured text, unstructured binary, or structured binary. Unstructured files have no particular format; they are either auxiliary files such as documentation or else they do not have cells and layers. The digests computed for these files are very limited. Structured files have a defined syntax which may include comments, layer names or numbers, and cells. These require parsers to distinguish the sections of the file and mark them by type.

Except for GDSII and OASIS® files, digests generated for files in one format are generally not compatible with digests generated for files in any other format. That is, comparison of digests across file types is usually meaningless. If no object properties are present, it is possible to compare GDSII and OASIS® data because it is first translated to an internal representation that supports comparison across these file types. Generally speaking, object properties in OASIS® are incompatible with object properties in GDSII, except that S_GDS_PROPERTY properties in an OASIS® file are converted to the equivalent GDSII properties.

Detailed descriptions of the file types and their interpretations follow. Details for file interpretation, digest calculation, and sorting behavior are described below. Sections are self-contained so that they may serve as an independent reference. Thus some information may be repeated.

In the descriptions that follow, language keywords appear in Courier font, e.g. HEADERTEXT or scaled_cell.

File-Level Digests

Parsers compute at least one file-level digest, for all of the bytes in the file in order with no interpretation or sorting. Parsers for text-based formats also compute file-level digests for all whitespace characters (spaces and horizontal tabs) and for all non-whitespace characters. These are not canonical cell digests; they are not format-specific and can be used only to determine quickly whether a file has been changed at all.

Canonical Digests

When recording canonical digests, files are broken down into file units, coupled with a recording type. A file unit is a portion of the file as defined by the language specification, typically one or more tokens (words or punctuation), and a recording type is one of file header, comment, cell name, cell interface, cell body, or cell non-geometry body. Cell non-geometry body data is simply a separate class of cell body data. Currently this class is used only in the GDSII and OASIS® parsers to denote non-geometric data that has layer numbers, such as NODE and TEXT records.

The definition of how digests are computed for a file format can be complex, as illustrated by FIGS. 8-17. The description of various formats includes an overview, detailed specifications for the processing of file units, and the examples.

EXAMPLE 1

Liberty Formatted Files

The Liberty library file format provides a way to describe the function and timing of circuits to logic synthesis tools. It is defined by Synopsys and is widely used because Synopsys has published a specification. It is a text-based format that can be viewed easily, but due to the volume of data in Liberty files, they are normally created by software.

In this first example, we walk through the digesting of a Liberty design language file. Some parts of a Liberty file are unrecorded. "Unrecorded" refers to canonical digesting. Generally speaking, cell names are not digested because doing so would prevent matching of otherwise equivalent cells with different names. Some parsers also skip tokens that are required and provide no additional information, such as fixed-place keywords or layer names (since digests are separated by layer anyway).

In some formats, the "text" being recorded is actually non-printable binary data, and the descriptions use keywords from the language specifications.

Canonical cell digests typically have 32 or 64 bits. Both types are computed using Cyclic Redundancy Checks (CRCs). Thirty-two-bit digests are computed using the ISO 3309 CRC polynomial and method specified for OASIS® files in SEMI Standard P0039-1105:

$$x^{32}+x^{26}+x^{23}+x^{22}+x^{16}+x^{12}+x^{11}+x^{10}+x^8+x^7+x^5+x^4+x^2+x+1$$

Sixty-four-bit digests are computed using the CRC polynomial specified for Ecma International's Standard ECMA-182:

$$x^{64}+x^{62}+x^{57}+x^{55}+x^{54}+x^{53}+x^{52}+x^{47}+x^{46}+x^{45}+x^{40}+x^{39}+x^{38}+x^{37}+x^{35}+x^{33}+x^{32}+x^{31}+x^{29}+x^{27}+x^{24}+x^{23}+x^{22}+x^{21}+x^{19}+x^{17}+x^{13}+x^{12}+x^{10}+x^9+x^7+x^4+x+1$$

File Content Digests for Liberty (.lib) Files

The details of this example, applied to Liberty (.lib) files, depend on whether scaled_cell records are in the same file as cell records. The first part of the discussion that follows assumes that the two kinds of records are in the same file. The later part allows for the two to be found in different files.

Liberty files have content digests for some or all of the following file elements:

File
File Header
Comment Text Inside the Header (Optional)
Header of the Cell
Body of the Cell exclusive of file header information (Optional)
Body of the Cell with file header information merged into the Cell (Optional)
Comment Text Inside of Cells (Optional)

The file is scanned to find the cell names inside. For cell in the file, the tool returns a digest for the header of the cell (input and output specifications) and a digest for the body of the cell.

As an option, separate digests are computed for comment text in the header and inside the cells, and differences in whitespace (number of spaces, tabs vs. spaces, blank lines) are ignored.

Digests are computed and returned for the header of the file (information before any cell definitions) and for the file as a whole. By default, the digest for the header of the file (excluding comment text, the file date, and the revision) is merged with the digest for a cell to avoid problems resulting from (for example) changes in unit definitions or logic thresholds that would affect all cells in the library. As an option, the file header may be excluded from cell body digest calculation when it is known that the file header has changed but cell comparisons are still desired.

All cell and scaled_cell group statements are put in order before recording any digests, regardless of whether sorting of the file is requested. The digest for the cell includes all scaled_cell timing definitions as well. The cell group is first, and the scaled_cell groups follow in sorted order based on the operating conditions group name.

Because scaled_cell records may appear anywhere in the file, even before the unscaled cell, no "all text including whitespace" digests are computed for the cells. This digest is computed only at the file level.

Because sorting is required to group scaled_cell records with cell records, the entire file is loaded into memory regardless of the memory limit specified on the command line. Note, however, that cell and scaled_cell group statements may appear in separate files, in which case they are handled as described below instead of being put in order, as they can be if they appear in the same file.

Only the pin names are recorded in the cell header digest. This means, for example, that if the direction of a pin changes the header digest will not change.

Because of the run time that would be required, sorting of group statements in one embodiment is shallow: only one child level of a group statement is considered when sorting a list of group statements. Alternatively, multiple child levels could be sorted. Note that the statements inside a group are sorted (again, using one child level). All sorts are stable, so when the limits of the comparisons are exceeded, statements that were previously in a specific relative order will remain in that relative order. For example, sorting the following yields the results shown in Table 1 below:

TABLE 1

Sorting of File Group Statements

| Before Sort | After Sort |
|---|---|
| g1 (B) { | G1 (B) { |
|   gb (A) { |   ga (C) { |
|     p: Z; |     p: E; |
|     p: X; |     p: F; |
|   } |   } |
|   ga (c) { |   ga (C) { |
|     p: E; |     p: D; |
|     p: F; |     p: E; |
|   } |   } |
|   ga (G) { |   ga (G) { |
|     p: D; |     p: D; |
|     p: E; |     p: E; |
|   } |   } |
|   ga (c) { |   gb (A) { |
|     p: E; |     p: X; |
|     p: D; |     p: Z; |
|   } |   } |
| } | } |

The group statement gb is moved after all of the ga groups because keyword gb comes after ga, even though the parameter A would come before C. Also note that the two ga statements with the parameter C remain in the same relative order because their low-level p statements are not considered during the sort. The p records themselves are sorted within the ga records, and the G parameter for one of the ga records causes it to be moved to the end of the set of ga records.

Liberty Library Description Files

Layout designers often use the same cell name for cells in different libraries (e.g. high performance vs. high density), so to help distinguish cells in different libraries, the library name in the Liberty file is prepended to all cell names. For example:

```
library (demo) {
    cell (INV_X1) {
        area : 0.032;
        ...
    }
}
```

The cell name associated with this cell would be demo.INV_X1.

The Liberty format specifies a number of scaling parameters designed to help extrapolate timing and power coefficients to all expected process corners. This may not be sufficient for some cells, so additional scaled cell records can be defined for those cells using the scaled_cell statement instead of the normal cell statement. The cell names for the scaled cell records are additionally marked with the scaled cell name, which is particularly useful to distinguish between the cell types when both types appear in the same file. For example:

```
library (demo) {
    scaled_cell (AND2_X2, slow_slow) {
        area : 1.064000;
        ...
    }
}
```

The cell name associated with this cell would be demo.AND2_X2.slow_slow.

A Liberty file also contains an extensive header specifying parameters that apply to cells. Inadvertent changes to the header can thus have significant consequences, so by default the digest for the at least some of the parameters in the header to be merged into the digest for cells in the file. When a header will not be changed accidentally (such as converting to a smaller voltage or time unit) without corresponding changes to all of the cells, one can disable header merging using the -noheader command-line option.

The statements in a Liberty file are order-independent, so by default the statements are sorted unless the user specifies the -nosort flag.

There are no layers in a Liberty file, so all of the digests for a cell are reported as non-Layer data, as in the following sample report:

```
File "testfiles/tstlibpar2.lib": Liberty format
Arguments: -mem 64 -sort
    728fb5e7    File
    451c31ec    File non-Whitespace
    00a03577    File Whitespace
```

-continued

```
    File Header (sorted)
        164c9eaf    File Header with Comments
        1cc03fe0    File Header without Comments
        0a8ca14f    File Header Comments
        1cc03fe0    File Header non-Layer
    Cell "demo.AND2_X1" (sorted)
        be7930d6    Cell with Comments
        be7930d6    Cell without Comments
        (none)      Cell Comments
        fe7aeb77    Cell Interface non-Layer
        4003dba1    Cell Body non-Layer
```

Here header merging is enabled; otherwise the argument line below the file name would have reported -noheader.

Details of Handling Liberty Format Files: Definitions

The prototype Liberty parser follows the definition of the Liberty format found in Synopsys' Liberty Reference Manual (Version 2007.03).

Syntax Interpretation

The Liberty reference describes three statement types, which can be summarized as follows:

```
keyword : value ;
keyword = value ;
keyword ( value ... );
keyword ( value ... ) { statement ... }
```

The first two forms are known as simple attributes. The third form is known as a complex attribute, and the fourth is known as a group statement. The group statement may in turn contain any combination of simple attributes, complex attributes, or group statements. Note that the semicolon at the end of the second form of a simple attribute and the parenthesized list of a group statement are optional.

Although the first token of a statement is supposed to be a keyword (i.e. a reserved word), the Liberty format allows library vendors to define new simple attributes and so only limited checking of keywords is performed. The parser ensures that a Liberty file contains one or more library group statements and that any cell or scaled_cell statements are within the library. It also looks for cell-level statements that can be considered part of the cell's interface. Otherwise any statement that follows the above general syntax is allowed.

There are no layer names in Liberty format files, so all digests are recorded with a default layer number of −1 for non-layer data.

The reference specifies C-style comments, beginning with the token /* and ending with the token */. Comments are assumed not to nest. Comments inside cells are recorded as part of the digests of the cells. Comments that appear outside of any library or that appear within a library statement but outside of any cell are recorded as file header comments.

The Liberty format provides a means to specify scaled versions of cells that are characterized at differing operating points. In one embodiment, these scaled_cell statements are treated as independent cells because they may appear in different Liberty files than the unscaled versions of the cells.

Because the same cell names may appear in multiple libraries, one parser embodiment qualifies a cell name with its library name and scaled_cell name if any, e.g. cmos_90nm.andx2 for a cell or cmos_90nm.andx2.slow_slow for a scaled_cell. If any component of the name includes '.' characters, that component is quoted: "cmos_90nm.v2".andx2."slow.slow".

The top-level statements in a library include many parameters that affect the interpretation of all cells within the library. For example, the delay or power values within the cells may be measured in units of nanoseconds or picowatts. A Liberty file that was hand-edited, or assembled from file fragments by a script, might have a header that does not correspond with the cells. To help detect this kind of error, most of the library-level attributes are collected into a header block that can then be merged into the cells for digest recording. Attributes that are very likely to change from version to version, e.g. date or version, are excluded from this header block.

Many of the attributes and group statements within a cell or scaled_cell statement specify the interface of the cell, meaning that any changes to these statements imply that the function of the cell has changed in a meaningful way. See the section "Annotated Sample Liberty File" for a complete list.

Some of the attributes within pin, bus, and bundle group statements also specify the interface of the cell. Some of the data within these statements, however, can reasonably be expected to change from one version of a library to the next. For example, timing group statements will change whenever process parameters are updated or some portion of the layout is changed, even if the cell is still functionally the same.

Sorting of Liberty Files

Liberty files are not order-dependent; statements within a cell or a group statement within a cell may appear in any order. To allow comparisons between libraries which may have had statements reordered, the statements within cells may be sorted. The primary sort key is the keyword which begins the statement. If both keywords are user-defined attributes (vs. predefined Liberty keywords,) a string comparison is performed and the statement with the keyword which comes first alphabetically is first in the statement list. If the keywords of the two statements are identical then the secondary sort key is the list of parameters in a statement. Parameters are compared as a string, and if there is a difference the statement with the parameter that comes first in alphabetical order is first in the statement list. If all parameters are equal except that one parameter list is shorter, the statement with the shorter parameter list comes first.

If the parameter lists are identical then the statements are considered to be identical. To limit runtime during sorting, some embodiments do not compare the statements inside of group statements. A stable sort is used, so that statement ordering is changed only if there are obvious differences.

Limitations of the Prototype Liberty Parser

Most tokens in Liberty files, including library, cell, and scaled_cell names, are assumed to be case sensitive. The exceptions are true and false, which are case-insensitive in the reference Synopsys parser implementation.

The parser assumes that the memory usage limit will be high enough to store all of the statements of a single cell or scaled_cell plus all of the file header statements.

Only limited syntax checking is done beyond verification of statement structure. For example, multiple top-level library statements are allowed. If the structure of the library does not follow the Liberty statement syntax, or if there are no library statements at the top level, an error is reported and no digests are computed.

Header statements that appear between cells are merged into only the digests that follow them in the file. For the most complete digest recording, all library header statements should appear before any cell or scaled_cell statements.

Because the search path for include files is not available (and may change over time), include file directives are not processed.

Values inside strings are not interpreted. It is assumed that the same tools will be creating Liberty files and that these tools will not, for example, reformat numbers unless the numbers have actually changed.

The lists of keywords to be excluded from the library header or included in the cell interface should be fixed and changed after careful deliberation, as many digests may need to be recalculated when key word lists change.

Unit numbers in the file header are supported either as explicit tokens, e.g. 1 ns, or as strings, e.g. "1 mV" . It is assumed that new versions of a file will not switch between the two representations.

Annotated Sample Liberty File

FIGS. 8A-8D illustrate a sampling of the possible header and cell statements in a Liberty file. Most header and cell statements are processed in the manner illustrated. In particular, when an entire group statement is recorded as the same digest type, only the keyword, parameters (if any), and curly braces are shown in FIG. 8. Attributes and statements outside of cells are added to the file header digest. Within a cell, only the attributes and group statements identified are recorded as part of the cell interface. Some attributes and group statements highlighted, as indicated, are recorded as part of the cell body.

By default, most file header statements (excluding comment tokens) are recorded as part of the interface of cells; this is not shown here. The date, revision, and comment attributes are not recorded as part of the interface of cells because they are likely to change when a Liberty file is modified.

Many simple cell and pin attributes are considered to be part of the cell interface; they are listed in the example above. Anything that is double underlined or not shown here is considered to be part of the cell body.

Note that bus and bundle group statements may include any of the simple attributes of a pin statement as well as nested pin statements. The attributes of bus and bundle statements are recorded as if they were in a pin statement; the contents of the nested pin statements are recorded as if they were standalone pins.

In the Synopsys reference parser, simple attributes may use either ':' or '=' to separate the variable name from the expression which follows, so the following are equivalent:

area=5;

area: 5;

The documentation uses ':', so all '=' are converted to ':' before being sent to the digest engine.

Semicolons for simple and complex attributes are not recorded because the Synopsys reference parser does not always require them, effectively making them optional.

EXAMPLE 2

Verilog File Type

Verilog is a simulation and Register Transfer Logic (RTL) language widely used in integrated circuit design. It is a text-based format commonly created by designers and compiled by logic synthesis tools. It allows designers to specify designs as interconnected modules. Circuit functionality is specified in modules recorded as cells, with input and output ports recorded as cell interfaces. Hints to the logic synthesis tools are put into attributes associated with module headers or statements.

In this example, Verilog files have content digests for the following file elements:

File
File Header
Cell Module Port Definitions
Body of the Cell Module

The file is scanned to find the module names inside. Separate digests are computed for the port definitions and the body of the module. These are based on the individual Verilog tokens excluding any whitespace.

Digests are computed and returned for the header of the file (information outside of any module definitions) and for the file as a whole. These include any whitespace.

Verilog 2005 syntax is presumed, even if a 'begin_keywords is present. Because only the module structure of the file is being parsed, this should not impact digest calculation for the file (keywords are not interpreted differently than symbols, for example). The file is assumed to be syntactically correct.

Compiler directives, including macro substitutions, are not interpreted. It is assumed that the file is valid Verilog without macro substitution. Generally speaking, it is assumed that macros are used only for constant definitions and that they do not create syntactic structures such as module headers or Verilog statements.

Include file directives are not interpreted, since the include path at the time of digest calculation may be different than the include path at compilation time.

In one embodiment, synthesis directives are assumed to be within Verilog attributes ("(*" and "*)"), not comments. If there is an attribute immediately before a module or macro-module declaration, its digest is added to that of the module. Comments outside of module declarations are considered part of the "header" (non-module text) of the source file, not part of the modules themselves. Because the characters of a preceding attribute are scanned before the parser knows about the module declaration, they are added to the "all text" digest for the header, not the module itself. Comments outside of modules are added to the file header digest. Modules and macromodules are treated as equivalent objects. In one embodiment, functions, UDPs, and generate blocks are considered part of the "header" of the source file, not as modules themselves. It is also possible to treat these as special forms of modules, recording them as cells in a manner similar to the handling of VHDL constructs such as procedure and function declarations. Port names in a list_of_ports will not be sorted properly if any of the ports use "." or "{ }" notation.

Digests are not computed for whitespace within cells. Only file-level whitespace digests are computed. Within cells, the digests are based only on the tokens of the file (including comments when appropriate).

Verilog RTL Files

Much of the body of a Verilog module is order-dependent, so only the module parameters can be sorted. Even then, modules are not always instantiated using order-independent argument specifications, so digest matches found after sorting might not represent true equivalence between module definitions. Thus sorting of Verilog files should be done with caution. By default Verilog files are not sorted unless the user specifies the -sort flag.

There are no layers in a Verilog file, so all of the digests for a cell are reported as non-Layer data:

```
File "testfiles/verilog_test.v": Verilog format
Arguments: -mem 64 -nosort
    5404c699    File
    7c2a352d    File non-Whitespace
    219b1881    File Whitespace
```

```
File Header (not sorted)
    b290d605    File Header with Comments
    (none)      File Header without Comments
    b290d605    File Header Comments
Cell "DFF_X1" (not sorted)
    ca436d2f    Cell with Comments
    ca436d2f    Cell without Comments
    (none)      Cell Comments
    c102a525    Cell Interface non-Layer
    0b41c80a    Cell Body non-Layer
```

Verilog Format Files: Definitions

The Verilog language specification is an IEEE standard; the prototype Verilog parser follows the definition of the language in IEEE Standard 1364-2005. This does not yet include Verilog-A (analog) extensions, but it can readily be extended to do so.

Although Verilog RTL descriptions are used in logic synthesis, the language itself is not sufficient to determine the intent of a designer. Logic synthesis tools provide means for guiding optimization through the use of attributes. These are comment-like token sequences which precede or are embedded within Verilog modules and statements. The text within the attributes forms synthesis directives. The prototype Verilog parser parses Verilog attributes, assigns them to the appropriate language constructs, and sends them to the digest engine, but it does not interpret the text inside.

Prior to the addition of attributes to the Verilog language, synthesis directives were specified using Verilog comments. The parser does not currently support the use of comments for synthesis directives, but it can be readily extended to do so.

Syntax Interpretation

A Verilog file is a sequence of declarations and modules. A module is a cell in the canonical cell digest tool; everything else is recorded as part of the file header.

A module may have an interface specified by parameters. There are two styles of parameter definition: a list of ports and a list of port declarations. A list of ports has only the port names present in the module statement, while a list of port declarations also has the port types.

```
module a(b,c,d);    // list of ports
module a(input [7:0] b,output [8:0] c,reg d);    // port declarations
```

When the interface to a module is specified using a list of ports, the declarations are embedded in the module body. The parser looks for them and sends them to the digest engine as cell interface data. Everything else in the module body is sent to the digest engine as cell body data.

When the interface to a module is specified using a list of port declarations, everything in the module body is sent to the digest engine as cell body data.

The parser assumes that module and macromodule are equivalent. macromodule is converted to module before being sent to the digest engine.

Macro definitions are not interpreted. Because macro definitions may be in included files which are not available to the parser or may change over time, no attempt is made to expand macro references. It is assumed that macros do not contain syntax constructs, so that it is possible to parse a Verilog file by assuming that a macro reference is equivalent to an identifier or number.

Library declarations and include statements are recorded as file header data. Include files are not read; the include file search path is not available to the canonical cell digest program. It may also change over time, invalidating any file digests already computed.

Functions, User-Defined Primitive (UDP) definitions, generate blocks, and configuration declarations may be added to the file header digest without further interpretation, or may be treated as in VHDL files.

Attributes immediately preceding a module keyword or within a module body are recorded as cell body text. All other attributes are recorded as file header text.

Sorting of Verilog Files

Many of the statements in Verilog are order-dependent and thus cannot be sorted. The parser does not attempt to determine which portions of module bodies are order-independent—it sorts only the parameters of module definitions. Because module instantiations might not use order-independent argument specifications, digest matches found after sorting might not represent true equivalence between module definitions. Thus sorting of Verilog files should be done with caution.

Module input and output declarations may be specified one by one or, if the types are the same, in lists. For example, the following sets of declarations are equivalent:

```
input signed [4:0] RN,CK,D,SE;
and
input signed [4:0] RN;
input signed [4:0] CK;
input signed [4:0] D;
input signed [4:0] SE;
```

The parser expands input and output parameter declarations from the first form to the second form. They can then be sorted according to the name of the parameter.

The parser assumes that the memory usage limit will be high enough to store all of the port definitions for a module, since there will be only a few hundred at most.

Limitations of the Prototype Verilog Parser

The parser does not attempt to sort argument lists in module instantiations, even when all of the ports are connected by name (e.g. .Out(topB) ).

Variable declarations within the body of a module can be used to modify the meaning of a port declaration when it is specified in a list of ports. The parser does not attempt to locate these additional declarations. For example:

```
module a(b);
    input b;
    wire signed [7:0] b;
endmodule
```

Here the type of input port b is modified by the wire declaration but the wire declaration is not added to the cell interface digest.

The parser does not attempt to assign a "port name" when a port declaration uses external names with a '.' or concatenations with "{ }". Normally the port name is located within the declaration and used as the interface record name when recording the digest for the port. When there are external names or concatenations, the first token of the declaration is used as the "name" for sorting the port.

Parameter declarations in module port lists (specified using '#') are added to the cell body digest.

Macro definitions are sent to the digest engine when they are found in the file. This may be within the file header or within a cell. Macro references are not expanded because the macro definition might be in another file which is either not available to the canonical cell digest tool or may change over time.

Compiler directives are not interpreted either.

Numeric literals are sent to the digest engine without interpretation. In particular they are not converted to a canonical form first. For example, a plus sign in an exponent is optional, so 1e10 will be different than 1e+10. The numbers are not reprinted, so 1e10 will also differ from 1.0e10.

The parser does not attempt to determine when a Verilog module can be considered hierarchical.

Annotated Sample Verilog File

FIG. 9 is an annotated example of a Verilog file that illustrates application of the parsing rules described above.

EXAMPLE 3

Structured Binary File Type

In this example, structured binary file types, without a custom parser, are treated as Unstructured Binary Files.

Generally, without knowing the structure of the binary file, a digest is assigned for all bytes. To assign digests to specific content within a structured binary file, the data structure needs to be known and a parser written for it.

EXAMPLE 4

VHDL File Type

VHDL is a simulation and Register Transfer Logic (RTL) language widely used in integrated circuit design. It is a text-based format commonly created by designers and compiled by logic synthesis tools.

In this example, VHDL Files have content digests for at least the following file elements:
File
File Header
Entity Block
Architecture Block This file is scanned to find the entity and architecture blocks for modules. For the modules, separate digests are computed for the entity and the architecture. Alternatively, more (or less) granular digests can be computed, as described in the explanation of VHDL "cells," below. These digests may be based on the individual VHDL tokens (including comments, since synthesis directives may be included in comments) excluding any whitespace.

Digests are computed and returned for the header of the file (information outside of any module definitions) and for the file as a whole. These include any whitespace. Included files from USE directives are not examined or added to the digests.

VHDL RTL Files

Many VHDL language constructs can be considered to meet the definition of a "cell", including entities, configurations, architectures, procedures, functions, components, types, and subtypes. A change to any one of these could have far-reaching impacts to a design. From a parsing standpoint, these and other VHDL declaration types are also first-class objects within a library. Thus the parser creates cells for the following VHDL language constructs (using production names from Annex A of IEEE Standard 1076-2002):
    subprogram_declaration (a procedure or a function)
    subprogram_body (a procedure or a function)

type_declaration
subtype_declaration
constant_declaration
signal_declaration
shared variable_declaration
file_declaration
alias_declaration
component_declaration
attribute_declaration
attribute_specification
disconnection_specification
use_clause
group template_declaration
group_declaration Hints to the logic synthesis tools are put into comments associated with object headers or statements. Thus the combined "Cell with Comments" digests are probably more useful than the "Cell without Comments" digests.

Many of the statements VHDL are order-dependent, so only the parameters in declarations can be sorted. Even then, architectures and components are not always instantiated using order-independent argument specifications, so digest matches found after sorting might not represent true equivalence. Thus sorting of VHDL files should be done with caution. By default VHDL files are not sorted unless the user specifies the -sort flag.

There are no layers in a VHDL file, so all of the digests for a cell are reported as non-Layer data:

```
File "testfiles/timing_b.vhd": VHDL format
Arguments: -mem 64 -nosort
    b116b16a    File
    0cafc41a    File non-Whitespace
    704d8ab4    File Whitespace
File Header (not sorted)
    9f21a1ef    File Header with Comments
    d279ff8a    File Header without Comments
    4d585e65    File Header Comments
    d279ff8a    File Header non-Layer
Cell "vital_timing.constant.edgesymbolmatch" (not sorted)
    63c5ce8d    Cell with Comments
    63c5ce8d    Cell without Comments
    (none)      Cell Comments
    63c5ce8d    Cell Interface non-Layer
Cell "vital_timing.function.vitalcalcdelay.1" (not sorted)
    cd370359    Cell with Comments
    cd370359    Cell without Comments
    (none)      Cell Comments
    be204681    Cell Interface non-Layer
    731745d8    Cell Body non-Layer
```

As seen above, the reported cell names include the library in which the object is defined (if any); the type of the object (constant, function, entity, architecture, etc.), the object name, and a disambiguating number used for overload resolution. Functions, for example, may be overloaded, meaning that the same name is used for a set of functions with The canonical cell digest tool does not implement a full VHDL parser. In particular, it does not maintain symbol tables, so it simply records the digests in cells with names based only on the object name. Because the disambiguating numbers could change if overloaded objects are added to or removed from a file, the user's matching software will have to select the proper cell based on digests.

VHDL Format Files: Definitions

The VHSIC Hardware Description Language (VHDL) was defined for the Department of Defense in the 1980s as a hardware system definition language. It is now also used as a Register Transfer Language for logic synthesis.

VHDL is a text-based language that allows designers to specify designs as interconnected entities implemented with architectures. It is a very complex language with many language constructs that impact the specification of a design. All of these are recorded as distinct cells whose names are qualified with their type, e.g. entity.full_adder.

The VHDL language specification is an IEEE standard; the prototype VHDL parser follows the definition of the language in IEEE Standard 1076-2002. This does not include VHDL-AMS (analog) extensions.

Although VHDL RTL descriptions are used in logic synthesis, the language itself is not sufficient to determine the intent of a designer. Synthesis directives embedded in comments are often added to the VHDL text to guide optimization. These are recorded with the language constructs that follow them. There is no equivalent to Verilog attributes.

Comments outside of a package are added to the file header digest.

Syntax Interpretation

As described above, many VHDL language constructs can be considered to meet the definition of a "cell", including entities, configurations, architectures, procedures, functions, components, types, and subtypes.

VHDL supports name overloading, meaning that a given name may map to multiple objects. The compiler selects the proper object using context and type information.

The language definition relies very heavily on these two concepts, to the point that it is error prone to parse a VHDL file fully without having its included files available. Because the prototype canonical cell digest parser is not designed for logic synthesis and because the context in which it works (e.g. the include files) may change over time, it uses a slightly simplified language specification that allows context-free parsing.

VHDL also supports operator overloading, meaning that there may be multiple versions of the same object with different types and parameters. For example, there may be several multiply operators.

Finally, for a given design entity there may be multiple architectures. These are meant to be interchangeable; the designer specifies which architecture to use when instantiating a module.

Generating canonical cell digests for all aspects of a VHDL design thus requires disambiguation. An encoded name with two to four parts is assigned to objects recorded as cells:
a package name, for objects stored in packages
the object type, e.g. architecture or function
the object's name as specified by the designer
a number suffix, for objects overloaded by name For example, vital_timing.constant.edgesymbolmatch represents the constant edgesymbolmatch in the package vital_timing and vital_timing.procedure.vitalerror.1 represents the second procedure named vitalerror in this package. Because canonical cell digests are computed on a file-by-file basis, the user's software may have to disambiguate the names further when storing the digests into a database. This is especially true for procedures and functions that have separate specifications and bodies—the parser does not know until very late (after the parameter list) whether it has a specification or a body, and by that time the cell name has been passed to the digest engine.

The VHDL specification also provides for nested object definitions, e.g. a function inside a procedure. Because these may be nested infinitely and because their scope is limited to the containing object (making them invisible to the outside), separate cells are not created for these objects. They are recorded as part of the cell body of the containing object.

The VHDL specification uses the eight-bit character set defined in the ISO/IEC 8859-1 standard. The parser has full support for all valid eight-bit characters.

VHDL is case-insensitive except for extended identifiers; the parser converts all tokens except extended identifiers to lower case before sending them to the digest engine.

Sorting of VHDL Files

Many of the statements in VHDL are order-dependent and thus cannot be sorted. The parser does not attempt to determine which portions of architecture or subprogram bodies are order-independent—it sorts only the parameters in their declarations. Because instantiations might not use order-independent argument specifications, digest matches found after sorting might not represent actual matches. Thus sorting of VHDL files should be done with caution.

Parameter declarations may be specified one by one or, if the types are the same, in lists. For example, the following sets of declarations are equivalent:

```
X,Y,Cin: in Bit;
Cout,Sum: out Bit;
and
    X: in Bit;
    Y: in Bit;
    Cin: in Bit;
    Cout: out Bit;
    Sum: out Bit;
```

The parser expands parameter declarations from the first form to the second form. They can then be sorted according to the name of the parameter.

Because an entity is the specification of an interface to one or more architectures, everything in an entity is considered part of the interface, even entity statements after the word is.

Names of top-level objects (cells) are not sent to the digest engine so that matching of equivalent cells with different names is possible. Names of variable declarations (including subprogram declarations) within top-level objects are recorded as cell interface text but the names of any declarations inside those variables are not. See the annotated sample file, FIGS. 10A-10B, for an example.

Limitations of the Prototype VHDL Parser

Vertical tab and form feed characters are converted to line feed characters even before they are added to the file-level digests. Carriage return/line feed pairs are converted to a single line feed character before being added to the file-level digests.

The parser does not attempt to combine constants. For example, string literal concatenation is not performed. "abcdef" will not have the same digest as "abc" & "def".

Include file directives (library and use clauses) are not interpreted, since the include path at the time of digest calculation may be different than the include path at compilation time.

Parameter lists in procedure cells and function cells are not sorted; the parser may not know the names of the parameters in the procedure or function because their declarations may be in another file. This applies even if the parameters are in an association list that uses =>.

Numeric literals are sent to the digest engine without interpretation. In particular they are not converted to a canonical form first. For example, a plus sign in an exponent is optional, so 1e10 will be different than 1e+10. The numbers are not reprinted, so 1e10 will also differ from 1.0e10.

The parser does not attempt to determine when a VHDL object can be considered hierarchical.

Annotated Sample VHDL File

FIGS. 10A-10B illustrate an annotated sample VHDL file.

Note that in architecture MC68000, the name of the first-level nested function (bclr_d) is recorded as interface text, though the name of the second-level nested function (nested) is not. This is because bclr_d is considered to be an interface variable, like the variable Delay in the procedure VitalWireDelay. Neither nested procedure is recorded as a separate cell; both are considered to be part of architecture MC68000.

EXAMPLES 5-6

OASIS® and GDSII File Types

In this example, OASIS® and GDSII file types, having identical file elements, will be described together. These file types have content digests for the following file elements:
File
File Header
Layer-by-Layer Geometric Objects
Layer-by-layer Non-geometric Objects
References to Lower-level Cells
Boolean Flags Referring to Other Lower-level Cells The database is scanned to find the cell names inside. For the cells present, the following is computed:
Layer-by-layer digests of all geometric objects (polygons, rectangles, etc.);
Layer-by-layer digests of all non-geometric objects (text points, etc.);
A digest for all other objects such as references to lower-level cells; and
A Boolean flag indicating whether the cell has references to lower-level cells.

As an option, the data in small and medium size cells is sorted prior to digest computation so that data ordering differences do not cause digest differences. The user can set the memory usage limit for this option.

OASIS® repetitions and GDSII array references are expanded prior to digest computation so that differences in repetition analysis do not cause digest differences.

Digests are computed and returned for the header of the file (information before any cell definitions) and for the file as a whole. For GDSII files, the file is assumed to be syntactically correct.

Structure (cell) creation and modification times are stored as comments; if they differ in two cells that are otherwise identical, the cell digests and comment digests will differ but all layer digests will be identical.

None of the data in a GDSII or OASIS® cell is considered to be part of the "header" (the interface to the cell). That is assumed to be generated by external tools and stored elsewhere (e.g. LEF). No "whitespace" digests are computed for GDSII or OASIS® files. Structure references (SREF and AREF) are reported as part of the digest for non-layer data with index −1. GDSII or OASIS® polygon sorting and GDSII or OASIS® polygon merging (overlap removal) can also be performed prior to digest computation.

OASIS® Layout Files

OASIS® files are structured binary files used for specifying layout. The format has many different methods for reducing the space required for the file such as repetitions and compressed data blocks. These can change the order in which data appears in a cell or even the data constructs used to represent the data (RECTANGLE vs. CTRAPEZOID, for example). Internally, to ensure a consistent representation all geometric constructs are converted to POLYGON records and repetitions are expanded.

Where appropriate, OASIS® file data is sorted by default if sufficient memory or disk space is available. Data is grouped by layer and then by position, so that the same digests are generated no matter how the data was ordered originally within the cell. As long as the data is sorted and there are no OASIS® properties in a cell, the user's software should be able to match digests between OASIS® cells and their equivalent GDSII representation.

To avoid floating point roundoff error, digests are computed based on the integer coordinates of layout data within the cell. Because the user's preferred design grid may change over time, canonical cell digests are computed based on a smaller grid that the user specifies using the -grid command-line option. The user should choose this grid carefully to ensure that all future design grids are an integral multiple of it. By default this grid is 1 nanometer (1.0e-9 meter); it may be best to set an even smaller value such as 0.5 nanometer or 0.25 nanometer. If the grid is too small, however, the user may get integer arithmetic overflows on 32-bit machines.

Because all repetitions are expanded to ensure a consistent representation, runtime performance for canonical cell digest calculation may vary considerably even for files of the same size.

Here is a portion of a digest report for an OASIS® file:

| Cell "Structure_1" (not sorted) | |
| --- | --- |
| f64ce851 | Cell with Comments |
| f64ce851 | Cell without Comments |
| (none) | Cell Comments |
| 20b84e54 | Cell Body non-Layer |
| e03bf9d2 | Cell Body Layer 3 |
| fda35715 | Cell Body Layer 42 |
| cb6c08c2 | Cell Body non-Geometric Data Layer 3 |

In this example, sorting was not requested, and this is reported after the cell name. Nothing in an OASIS® cell is recorded as cell comment data, so the digest is reported as "(none)". There are some structure references recorded as non-layer data and some geometry on layers 3 and 42. Finally, there is some non-geometric data (one or more TEXT records) on layer 3.

OASIS® Format Files: Definitions

The Open Artwork System Interchange Standard (OASIS®) format was developed by a committee of Semiconductor Equipment and Materials International (SEMI) as a replacement for GDSII. It removes 16- and 32-bit restrictions on numeric values and improves layout file sizes by up to a factor of 10. The prototype OASIS® parser follows the specification described in SEMI Standard P39-1105 (November 2005). Name tables are supported.

OASIS® is a binary format, so for clarity this description uses the record names listed in the OASIS® specification.

Syntax Interpretation of OASIS® Files

The OASIS® specification provides for arbitrary-precision integers and floating point numbers. Arithmetic packages for arbitrary-precision arithmetic are slow, however, and not in wide use in the design automation community. The prototype parser uses native integers (32 bits when compiled in 32-bit mode, 64 bits when compiled in 64-bit mode) and IEEE double-precision floating point numbers (64 bits). An error will be logged if numbers exceeding these limits are present in a file.

The specification also provides for several different number representations, such as unsigned integer, signed integer, ratio, reciprocal, and floating point. All numbers are converted to canonical form for comparisons—native integers for integral values and double precision floating point numbers for floating point values. This allows matching of numbers written by different tools, e.g. 5/2 and 2.5.

In like manner, all point lists (e.g. 1-delta lists) are fully expanded to X/Y coordinate pair lists before digests are computed.

Design tools have considerable freedom to choose the OASIS® elements used to represent the geometry of a layout cell. Although a layout editor will generally preserve the designer's choice of, for example, a PATH vs. a POLYGON, the final output might have an equivalent POLYGON in order to reduce the ambiguity inherent in the definition of a PATH at a bend. Such a tool might also change the "winding direction" of a POLYGON from counterclockwise to clockwise. To avoid these issues, all geometric elements are converted to a canonical representation for canonical cell digest calculation:

RECTANGLE, PATH, TRAPEZOID, CTRAPEZOID, and CIRCLE elements are converted to equivalent POLYGON records POLYGON point lists are reversed if the resulting polygon has a counterclockwise winding direction the first point in the list is chosen to be the lowest, leftmost point If there is a flip in a PLACEMENT record, it is stored as if it were a GDSII STRANS record (a bit array).

If a PLACEMENT object uses a numeric cell reference, the number is replaced by its corresponding cell name, and only the cell name is sent to the digest.

The OASIS® specification provides for repetitions of all constructs. Different tools might choose different methods of optimizing repetitions. The data is equivalent no matter how it is arrayed, so for canonicity all repetitions are expanded into single-object references (e.g. rectangles or PLACEMENT records). For this reason, runtime performance as a function of file size cannot be guaranteed—a small file with a repetition that expands to a billion polygons will require a great deal of CPU time.

OASIS® files also coexist with older GDSII format files. OASIS® uses a different method of describing repeated object references, so unless repetitions are expanded, it will not be possible to match repeated PLACEMENT objects with GDSII AREFs.

Note that in some embodiments, digests are computed based on the objects in the OASIS® file, not the underlying geometry. No overlap removal is performed before computing the digest.

The OASIS® format was designed to remove the need for "extensions" to the specification. If the OASIS® file does not comply with the specification, the parser will return an error.

OASIS® layers are primarily indexed by number (all geometric constructs use layer numbers, not layer names); the mapping of layer names (if any) to numbers is not currently returned by the parser.

Coordinates in an OASIS® file are specified using a grid, e.g. 1 nanometer (1.0e-9 meter), at the front of the file. Within the cells, all coordinates are defined in terms of this grid so that they can be integral. The file grid can change, however, without affecting the final mask data. For example, imported design template blocks could be specified using a grid of 5 nanometers even though the standard grid is 1 nanometer. The user's software would then convert all imported data to use the smaller grid, scaling the integer coordinates in the cells by a factor of 5.

To ensure canonicity, all geometry in OASIS® files is scaled to use an internal canonical cell digest grid. The user should choose this grid carefully so that the OASIS® file grid used in all future designs will be compatible. For example, if the current design grid is 5 nanometers, it may be best to use a digest grid of 1 nanometer or even 0.5 nanometer.

The canonical cell digest grid value is passed to the OASIS® parser and an error is returned if the OASIS® file grid is not an integral multiple of the canonical cell digest grid value.

Structures with PLACEMENT records are marked as hierarchical for digest reporting.

Sorting of OASIS® Files

As mentioned, OASIS® files use a different method to specify arrayed structure references than GDSII files. Different vendors might also choose different repetition optimization methods. Finally, the geometric objects within a cell can be reordered at any time without changing the meaning of the file. Effective comparison of OASIS® layouts, or GDSII layouts versus OASIS® layouts, thus requires sorting. For this reason, sorting of GDSII and OASIS® layouts is enabled by default.

After a geometric object is converted to canonical form, it can be compared to another object for sorting purposes as follows:
  the layer name is the primary key; lower layer numbers are first
  the element type (using GDSII record types) is the secondary key; lower element types come first
  the XY coordinates of the element, if any, are the tertiary key; coordinates are compared one by one and the element with the lowest, leftmost point for a given entry comes first
  if a placement transform (i.e. flip) is present, the bit vector converted to an integer is compared and the "lowest" one comes first
  next, the DATATYPE values are compared, and the lowest one comes first
  if the records are placements, the cell name values are compared alphabetically and the lowest one comes first
  next, the MAG values, if any, are compared and the lowest one comes first
  next, the ANGLE values, if any, are compared and the lowest one comes first
  finally, the PROPERTY values are compared one by one It is expected that only the first three comparisons (layer name, element type, and XY location) will be used, so that the order of the other comparisons can be more or less arbitrary.

The sorting criteria are actually the same as those used for GDSII; fields that do not apply to OASIS® have been omitted from the above description. Use of GDSII fields that have no analog in OASIS® (e.g. PLEX) or are different in OASIS® (e.g. properties) will prevent matching of cells across formats.

If sorting is requested, the records in a cell are collected until the end of the cell is reached or until so much cell data is stored in memory that the usage limit is exceeded. Should that occur, the stored cell records are sent to the digest module in their original order or may be sorted using a disk sort, at a substantial performance penalty. The memory test is performed on a cell-by-cell basis, so some cells may be sorted and some may be unsorted. Cells are marked as to whether they have been sorted; this information is available in digest reports and through the API.

File header objects are not sorted.

Limitations of the Prototype OASIS® Parser

The OASIS® file is assumed to be compliant with SEMI P39 syntax and semantics. No errors are tolerated. Only one error is reported; the parser does not attempt to continue past the first error.

Currently XELEMENT, XGEOMETRY, and XNAME records are discarded without being recorded (except in file-level digests).

PAD records are discarded without being recorded (except in file-level digests).

The memory used by name tables in the file is not measured; this can cause actual memory usage to exceed the requested limit.

The properties of an element are recorded as the same type (geometric data) as the element itself. The definition of PROPERTY records in OASIS® differs significantly from PROPATTR records in GDSII and it will be impossible to match cells that have elements with properties (other than the compatible S_GDS_PROPERTY) in them.

The LAYERNAME table, if any, is not returned by the OASIS® parser, so only layer number information is available for use with digests.

Zero-area polygons are not reversed if their points are drawn in the "wrong" order. This can make it difficult to compare GDSII and OASIS® files containing zero-area polygons.

Annotated Sample OASIS® File

FIG. 11 is an annotated sample OASIS® file. Because OASIS® is a binary file format, OASIS® record names are used and some portions of individual elements are abbreviated for simplicity. All of the fields within an element have the same recording type, so there is no loss of generality.

For canonicity, RECTANGLE, PATH, TRAPEZOID, CTRAPEZOID, and CIRCLE elements are converted to equivalent POLYGON elements with a clockwise wrap. Thus, none of these element types is shown in the figure. The first point in the point list is chosen to be the lowest, leftmost point. The GDSII BOUNDARY record number is used so that OASIS® cells can be matched against GDSII cells.

TEXT elements are recorded using the GDSII TEXT element number so that OASIS® cells which use only TEXT can be matched against GDSII cells. Note that there is no analog in OASIS® to the GDSII NODE element.

CBLOCK records are expanded before computing digests, so they do not become part of the canonical cell digests. The canonical cell digests will be the same regardless of whether CBLOCK records are present.

The file-level digest is computed without expanding CBLOCK records.

Names and other strings are recorded as if they were present with the record for which they are used, whether or not name tables are present in the file. The name and other string tables themselves are not added to any canonical cell digests. Properties associated with name records (e.g. CELLNAME) are added to the file header non-Layer Geometry digest.

All geometric records are fully expanded before being sent to the digest engine; no implicit use of modal variables is made. This is useful for sorting as well as for matching with GDSII files. For this reason, XYRELATIVE and XYABSOLUTE records are not part of any canonical cell digest; they merely determine how XY coordinates are interpreted (relative to the previous object or absolute coordinates).

Properties are recorded with the object that immediately precedes them. If that object has a layer number, they are recorded on that layer number. Properties at the front of the file (and thus outside of any cell) are not sorted; they are recorded as they occur.

Before being sent to the digest engine, PLACEMENT objects of type 17 (orthogonal rotations) are converted to PLACEMENT objects of type 18 (arbitrary rotations) to match the definition in GDSII.

There is no industry standard for structure interfaces (e.g. bounding boxes, abutment boxes, and router pickup points), so nothing is recorded as cell header data.

EXAMPLE 6 (CONT.)

GDSII Layout Files

GDSII files are structured binary files used for specifying layout. Depending on the tool used to write a GDSII file, the order in which data appears in a cell may change and some constructs (especially PATH) may be converted to a less-ambiguous representation (BOUNDARY). Internally, to ensure a consistent representation all geometric constructs are converted to BOUNDARY (polygon) records and array references (AREFs) are expanded into equivalent sequences of structure references (SREFs).

Where appropriate, GDSII file data is sorted by default if sufficient memory or disk space is available. Data is grouped by layer and then by position, so that the same digests are generated no matter how the data was ordered originally within the cell. As long as the data is sorted and there are no GDSII NODE records or properties in a cell, the user's software should be able to match digests between GDSII cells and their equivalent OASIS® representation.

To avoid floating point roundoff error, digests are computed based on the integer coordinates of layout data within the cell. Because the user's preferred design grid may change over time, canonical cell digests are computed based on a smaller grid that the user specifies using the -grid command-line option. The user should choose this grid carefully to ensure that all future design grids are an integral multiple of it. By default this grid is 1 nanometer (1.0e-9 meter); it may be best to set an even smaller value such as 0.5 nanometer or 0.25 nanometer. If the grid is too small, however, the user may get integer arithmetic overflows on 32-bit machines.

Because all AREFs (arrayed structure references) are expanded to ensure a consistent representation, runtime performance for canonical cell digest calculation may vary considerably even for files of the same size.

Here is a portion of a digest report for a GDSII file:

| Cell "Structure_1" (sorted) | |
|---|---|
| a7100492 | Cell with Comments |
| 3d4d7fbf | Cell without Comments |
| 9a5d7b2d | Cell Comments |
| 7b78aab4 | Cell Body non-Layer |
| 15546763 | Cell Body Layer 3 |
| fda35715 | Cell Body Layer 42 |
| aec2e57d | Cell Body non-Geometric Data Layer 3 |

In this example, the cell was small enough to be sorted, and this is reported after the cell name. The cell modification and access time are recorded as comments, there are some structure references recorded as non-layer data and some geometry on layers 3 and 42. Finally, there is some non-geometric data (one or more NODE or TEXT records) on layer 3.

GDSII Stream Files: Definitions

GDSII is an early layout database format, originally specified in the 1980s by Calma Corporation and now owned by Cadence. The prototype GDSII parser follows the specification described in the Cadence Virtuoso Design Data Translators Reference with Y2K additions.

GDSII is a binary format, so for clarity this description uses the record names listed in the GDSII specification.

Syntax Interpretation of GDSII Files

Lacking an industry standard specification, tool vendors have "extended" the GDSII format over the years. For example, the GDSII documentation notes that the maximum layer number for a node point, text point, or geometric object is 255, but some tools allow up to 32,767 layers (the maximum possible signed 16-bit integer). Similarly, the GDSII documentation limits boundaries (polygons) and paths (wires) to 200 points, but some tools allow up to 4,094 points (the maximum number of points that can fit into a 65,535-byte record). To support these extensions while still providing some level of checking, the parser accepts a "variances" record that specifies limits for the following:

- structure name length (default 32, maximum 32,750)
- additional characters allowed in structure names (beyond "A-Za-z0-9_?$")
- maximum layer number, data type, or text type (default 64, maximum 32,767)
- maximum property attribute number (default 64, maximum 32,767)
- maximum BOUNDARY or PATH point count (default 200, maximum 4,094)
- maximum node point count (default 50, maximum 4,094)
- maximum property value length (default 128, maximum 32,767)
- whether the lattice vectors in an AREF may be rotated or whether they are orthogonal and in the first quadrant
- whether a rotation in an AREF means that the lattice is rotated rigidly or that the instances are rotated in place within the lattice as it is specified Other than modifications to these aspects, if the GDSII file does not comply with the specification the parser will return an error.

Design tools have considerable freedom to choose the GDSII elements used to represent the geometry of a layout cell. Although a layout editor will generally preserve the designer's choice of, for example, a PATH vs. a BOUNDARY, the final stream output might use an equivalent BOUNDARY instead, to reduce the ambiguity inherent in the definition of a PATH at a bend. Such a tool might also change the "winding direction" of a BOUNDARY from counter-clockwise to clockwise. To avoid these issues, all geometric elements are converted to a canonical representation for canonical cell digest calculation:

- PATH elements are converted to equivalent BOUNDARY records
- the last point in a BOUNDARY point list is removed if it coincides with the first point
- BOUNDARY point lists are reversed if the resulting polygon has a counterclockwise winding direction
- the first point in the list is chosen to be the lowest, leftmost point GDSII files also coexist with newer OASIS® format files. OASIS® uses a different method of describing repeated object references. For canonicity, AREF (arrayed structure reference) objects are expanded to the equivalent sequence of individual SREF (structure reference) objects. The same thing is done in the OASIS® parser (repetitions are expanded), so that it is possible to compare digests for layout in GDSII files vs. OASIS® files. For this reason, runtime performance as a function of file size cannot be guaranteed—a small file with an AREF that expands to a billion SREFs will require a great deal of CPU time because SREFs are added to digests one at a time.

The GDSII specification calls for AREF lattices to be orthogonal and in the first quadrant (i.e. the first lattice vector along the positive X axis and the second lattice vector along the positive Y axis), then mirrored or rotated rigidly if mirroring or rotation, respectively, is specified. Few CAD tools actually use this definition; instead the lattice vectors are rotated and/or mirrored and the instances placed within the transformed lattice. By default the prototype GDSII parser uses this definition; there is an option in the API to use the original definition.

Note that digests are computed based on the objects in the GDSII file, not the underlying geometry. No overlap removal is performed before computing digests.

Coordinates in a GDSII file are specified using a grid, e.g. 1 nanometer (1.0e-9 meter), at the front of the file. Within the cells, all coordinates are defined in terms of this grid so that they can be integral. The file grid can change, however, without affecting the final mask data. For example, imported design template blocks could be specified using a grid of 5 nanometers even though the standard grid is 1 nanometer. The user's software would then convert all imported data to use the smaller grid, scaling the integer coordinates in the cells by a factor of 5.

To ensure canonicity, all geometry in GDSII files is scaled to use an internal canonical cell digest grid. The user should choose this grid carefully so that the GDSII file grid used in all future designs will be compatible. For example, if the current design grid is 5 nanometers, it may be best to use a canonical cell digest grid of 1 nanometer or even 0.5 nanometer.

The canonical cell digest grid value is passed to the GDSII parser and an error is returned if the GDSII file grid is not an integral multiple of the canonical cell digest grid value.

Structures with SREF or AREF records are marked as hierarchical for digest reporting.

Sorting of GDSII Files

As mentioned, GDSII files use a different method to specify arrayed structure references than OASIS® files. OASIS® file writers have a great deal of freedom to cluster geometric objects or structure references through the use of repetitions. Different vendors might choose different repetition optimization methods. Finally, the geometric objects within a cell can be reordered at any time without changing the meaning of the file. Effective comparison of GDSII layouts, or GDSII layouts vs. OASIS® layouts, thus requires sorting. For this reason, sorting of GDSII and OASIS® layouts is enabled by default.

After a geometric object is converted to canonical form, it can be compared to another object for sorting purposes as follows:
  the layer name is the primary key; lower layer numbers are first
  the element type (using GDSII record types) is the secondary key; lower element types come first
  the XY coordinates of the element, if any, are the tertiary key; coordinates are compared one by one and the element with the lowest, leftmost point for a given entry comes first
  if a STRCLASS is present, the bit vector converted to an integer is compared and the "lowest" one comes first
  if an ELFLAGS is present, the bit vector converted to an integer is compared and the "lowest" one comes first
  if a PRESENTATION is present, the bit vector converted to an integer is compared and the "lowest" one comes first
  if an STRANS is present, the bit vector converted to an integer is compared and the "lowest" one comes first
  next, the PLEX values (default 0) are compared, and the lowest one comes first
  next, the DATATYPE values are compared, and the lowest one comes first
  next, the PATHTYPE values, if any, are compared and the lowest one comes first
  if the records have STRING values, those values are compared alphabetically and the lowest one comes first
  if the records are STRANS (structure transformation), the SNAME values are compared alphabetically and the lowest one comes first
  next, the MAG values, if any, are compared and the lowest one comes first
  next, the ANGLE values, if any, are compared and the lowest one comes first
  finally, the PROPATTR values are compared one by one It is expected that only the first three comparisons (layer name, element type, and XY location) will be used, so that the order of the other comparisons can be more or less arbitrary.

Some of these sorting criteria are also used for OASIS® files.

Use of fields that have no analog in OASIS® (e.g. PLEX) or are different in OASIS® (e.g. properties) will prevent matching of cells across formats.

If sorting is requested, the records in cells (GDSII structure) are collected until the end of the cell is reached or until so much cell data is stored in memory that the usage limit is exceeded. Should that occur, the stored cell records are sent to the digest module in their original order. The memory test is performed for the cells, so some cells may be sorted and some may be unsorted. Cells are marked as to whether they have been sorted; this information is available in digest reports and through the API.

File header objects have a specified order, so they are not sorted.

Limitations of the Prototype GDSII Parser

The GDSII file is assumed to follow the Cadence specification for GDSII with the exception that some numeric limits may be relaxed, as described above. AREF lattices can also be specified in a rotated orientation. Other than these variances, no exceptions or errors are tolerated. Only one error is reported; the parser does not attempt to continue past the first error.

There is currently no way to change numeric limits and behavioral flags from the command line. The API has the ability to define variances for all of the items described above.

PROPATTR records have a different structure in GDSII than PROPERTY records in OASIS®. Use of PROPATTR records will prevent matching of GDSII cells to OASIS® cells unless the OASIS® PROPERTY records use the S_GDS_PROPERTY format.

Zero-area BOUNDARYs and BOXes are not reversed if their points are drawn in the "wrong" order. This can make it difficult to compare GDSII and OASIS® files containing zero-area polygons.

BOX records are not converted to BOUNDARY records under the assumption that they are not equivalent; they are no more efficient than BOUNDARY records and so it is presumed that they are intentionally drawn differently.

Annotated Sample GDSII File

FIG. 12 is an annotated sample GDSII file. Because GDSII is a binary file format, GDSII record names are used and some portions of individual elements are abbreviated for simplicity. All of the fields within an element have the same recording type, so there is no loss of generality.

The modification and access times of structures are recorded as cell comments. Structure class records are also recorded as cell comments. There is no industry standard for structure interfaces (e.g. bounding boxes, abutment boxes, and router pickup points), so nothing is recorded as cell header data.

Layers in GDSII are numeric; no list of layer names is returned.

PATH elements are converted to BOUNDARY elements using the path type and any BGNEXTN or ENDEXTN records before they are sent to digest generation. Path type 1 (round ends) is converted to path type 2 (square ends half the width beyond the endpoints).

If a PATH element has acute angles, the outer corners of any such bends are truncated at a distance equal to half the wire width away. The outside of the PATH is traced in a clockwise direction; the lowest, leftmost point is chosen as the first. The last point in the list is not coincident with the first; instead there is an implied edge.

Negative PATH widths are silently converted to positive path widths, thereby removing their "absolute path width" property. This conversion is not recorded in the digests.

The point lists of BOUNDARY elements are reversed if they have a counterclockwise wrap; afterwards the lowest, leftmost point is chosen as the first. The final point, which according to the GDSII specification overlaps the first, is removed so that there is an implied edge.

The point lists of BOX elements are reversed if they have a counterclockwise wrap; afterwards the lowest, leftmost point is chosen as the first. The final point, which according to the GDSII specification overlaps the first, is removed so that there is an implied edge. BOX elements are not converted to BOUNDARY elements under the assumption that they are intended for different purposes.

Array references (AREF elements) are expanded to equivalent lists of SREF elements before they are sent to digest generation.

The attributes of an element are recorded as the same type (geometric data) as the element itself. It is also possible to record them as non-geometry data, as the definition of attributes in OASIS® differs significantly and it will otherwise be impossible to match cells that have elements with attributes in them.

Bit arrays in GDSII records (e.g. STRANS) are converted to integers before being sent to digest calculation.

EXAMPLE 7

Unstructured Text File Type

Unstructured text files are text files which do not have a specification known to the canonical cell digest tool. For example, log files or human-readable descriptions of design template blocks would be unstructured text files. Text files are line-oriented, however, so they can still be sorted. If sorting is requested, the file header data digest will change to reflect the sorting. Otherwise it will match the file digest.

In this example, unstructured text files have content digests for the file Byte by Byte. A byte-by-byte digest is computed for unstructured text files. The digest is independent of newline style. As an option, differences in whitespace are ignored.

The command line options -mergewhite, -reportwhite, and -discardwhite control the reporting of file-level whitespace digests for text-based file formats. Whitespace includes spaces, tabs, and newlines. The -mergewhite option is the default; when it is active a single file-level digest is reported, including both whitespace and non-whitespace. When the -reportwhite option is active, digests for whitespace and non-whitespace are reported separately. When the -discardwhite option is active, whitespace is ignored and a single file-level digest excluding whitespace is reported.

For example, if the sample file testfiles/verilog_test.v is treated as an unstructured text file, the following results will be obtained:

```
otismartsig -txt -mergewhite testfiles/verilog_test.v
File "testfiles/verilog_test.v": unstructured text format
    File CRC 5404c699
otismartsig -txt -reportwhite testfiles/verilog_test.v
File "testfiles/verilog_test.v": unstructured text format
    File CRC 5404c699
    File non-whitespace CRC 7c2a352d
    File whitespace CRC 219b1881
otismartsig -txt -discardwhite testfiles/verilog_test.v
File "testfiles/verilog_test.v": unstructured text format
    File CRC 7c2a352d
```

Note that the merged file digest in the first example matches the full-file digest in the second example, and that the non-whitespace digest in the second example matches the file digest in the third example.

Whitespace and non-whitespace digests are not computed for individual cells in cell-based formats such as Liberty or Verilog; they are computed only at the file level.

The three whitespace reporting options may be used for structured text file formats as well. For example:

```
otismartsig -discardwhite -ver testfiles/verilog_test2.v
File "testfiles/verilog_test2.v": Verilog format
    File CRC 07f87fb9
    File header CRC 6ef229e6
    File comment CRC 6ef229e6
Cell "OAI21_X1"
    Interface CRC dae46517
    Contents CRC c73aceaf
Cell "OAI21_X2"
    Interface CRC 01391569
    Contents CRC c73aceaf
```

Syntax Interpretation

File-level (all file data, non-whitespace data, and whitespace data) and file header digests are computed for unstructured text files. File header digests are computed for all of the data in the file, sorting lines alphabetically if requested. If the file has DOS-style (CR-LF) line endings, they are converted to UNIX-style (LF only) line endings before any digests are computed.

Sorting of Unstructured Text Files

If sorting is requested and the memory usage limit is high enough, the lines of the file are sorted before computing the file header digests. All data is recorded as non-layer, non-comment file header data.

Limitations of the Prototype Unstructured Text File Parser

Currently there is no option to convert whitespace to a canonical form (e.g. tabs to spaces or removing repeated spaces).

EXAMPLE 8

Unstructured and Structured Binary Files

The digest for an unstructured binary file (or a structured binary file without a parser) is simply the CRC of all of the bytes in sequence with no interpretation. A digest for the example GDSII file testfiles/sigtest.gds can be computed as follows:

```
otismartsig -bin testfiles/sigtest.gds
File testfiles/sigtest.gds: unstructured binary format
    File CRC d0b40760
```

This is the same digest as the file-level digest computed by the GDSII parser.

Unstructured Binary Files

Unstructured binary files are non-text files which do not have a specification known to the canonical cell digest tool. For example, object code or executable programs would be unstructured text files. Because these files have no known structure, canonical cell digests cannot be computed for them. Only a file digest is computed. There is no syntax interpretation or sorting of unstructured binary files.

EXAMPLE 9

SPICE Format Netlist File Type

Transistor level designs are often analyzed using the Simulation Program with Integrated Circuit Emphasis (better known as SPICE), developed in the 1970s at the University of California Berkeley campus. SPICE and its derivatives are still the gold standard numerical solver for integrated circuits, though capacity and runtime issues limit its use to subcircuits (dozens to hundreds of transistors, plus associated parasitic circuit elements) instead of entire designs. SPICE input files are text and can be created by designers but are generally written by circuit extractors reading layout from GDSII or OASIS®. Typically, the SPICE simulations which read these files are then used to generate timing models for Liberty format files.

In this example, SPICE format netlist files have content digests for the following file elements:

File

File Header

Port Definitions for Subcircuits

Body of the Subcircuit

The file is scanned to find the subcircuit names inside. For subcircuits, separate digests are computed for the port definitions and the body of the subcircuit. These are based on the individual SPICE netlist tokens excluding any whitespace or comments.

Digests are computed and returned for the header of the file (information outside of any subcircuit definitions) and for the file as a whole. These include any whitespace and comments.

Include file directives are not interpreted, since the include file reference at the time of digest calculation may be different than at simulation time (e.g. if the path name is relative).

SPICE Subcircuit Files

Extracted layouts are generally written into subcircuits within SPICE input files, and these are recorded as cells by the canonical cell digest software. The text within a subcircuit is order-independent and can be sorted, but it might not be instantiated using order-independent argument specifications, so digest matches found after sorting might not represent true equivalence. Thus sorting of SPICE subcircuit files should be done with caution. By default SPICE subcircuit files are not sorted unless the user specifies the -sort flag.

There are no layers in a SPICE subcircuit file, so all of the digests for a cell are reported as non-Layer data:

```
File "testfiles/test1.spi": Spice format
Arguments: -mem 64 -nosort
    e4c0e613    File
    7a041fe8    File non-Whitespace
    07415f83    File Whitespace
File Header (not sorted)
    c8954a7d    File Header with Comments
    fa8f8413    File Header without Comments
    321ace6e    File Header Comments
    fa8f8413    File Header non-Layer
Cell "nand2" (not sorted)
    59fa7f10    Cell with Comments
    bdda89ec    Cell without Comments
    e420f6fc    Cell Comments
    5f4226ed    Cell Interface non-Layer
    e298af01    Cell Body non-Layer
```

Syntax Interpretation

There is no standard SPICE format, as variants have their own directives (especially device model parameters), but all of the programs use the same line-oriented netlist structure in which subcircuits (cells) start with .subckt and end with .ends. The prototype canonical cell digest SPICE parser creates a cell for subcircuits and records all other text as part of the file header.

Comments begin with '*' and continue to the end of the current line. The '*' may have whitespace in front of it; this is removed. Any whitespace after the '*' is recorded without further processing. Comment lines inside a subcircuit are added to the cell body digest.

Any line may be continued to the next line if the next line begins with '+' in the first column. The '+' is removed before merging the lines together, so that the following two line sequences are equivalent:

```
.subckt a b c
and
            .subckt
+ a
+ b
+ c
```

No spaces are added when continuation lines are merged, so the following two line sequences are equivalent:

```
.subckt a b c
and
    .sub
+ckt a b c
```

Sequences of multiple whitespace characters in non-comment lines are converted to single space characters before sending the lines to the digest engine.

Dot command names (e.g. .subckt) are assumed to be case-insensitive. Cell names are converted to lower case before being recorded, but otherwise the text is recorded without case conversion.

Nets specified on .global lines are recorded as pins in the cell interface.

.options and .param lines are added to the bodies of the cells under the assumption that they will affect the cells.

Lines after a .end statement are recorded as file header data without any interpretation. The .end command is regarded as optional; no error is printed if it is missing.

Dot commands other than .global, .options, .param, .subckt, .ends, and .end are recorded as file header data without interpretation.

Any subcircuit with an 'X' (subcircuit instantiation) command is marked as hierarchical.

Sorting of SPICE Netlist Files

Because SPICE subcircuit netlists specify only connectivity, they can be in any order. If sorting is requested, the lines in the file header and in the subcircuit are sorted alphabetically. Repeated spaces in lines are removed before sorting is performed.

The pin names for the subcircuit are sorted as well even though connections are positional (order-dependent), so the results from sorting should be used with caution.

Limitations of the Prototype SPICE Netlist Parser

The parser assumes that no SPICE subcircuit will be so large that the memory usage limit will be exceeded. It also assumes sufficient room to store all lines outside of any subcircuit so that they may be sorted and recorded at the end of the file.

.include statements are not processed because the file search path is not known to the parser and might change over time anyway.

Parameters from .param lines are not substituted. Thus the following two blocks of text are not equivalent:

```
.param lp=0.35
mpullup zn i vdd vdd pmos w=10.0 l=lp
and
mpullup zn i vdd vdd pmos w=10.0 l=0.35
```

.param and .options lines are recorded without further interpretation. Thus the following two sequences are not equivalent:

```
.param lp=0.35 ln=0.3 wp=0.7 wn=0.7
and
.param lp=0.35 ln=0.3
.param wp=0.7 wn=0.7
```

Annotated Sample SPICE Netlist File

FIG. 13 is an annotated version of a SPICE file that illustrates the parsing rules above.

EXAMPLES 10-11

LEF/DEF File Types

Library Exchange Format (LEF) files provide a way to describe routing layer design rules and physical layouts from GDSII or OASIS® files for use in Place and Route (P&R) tools. They provide router-oriented wire and via construction rules plus abstractions of the cells to be placed and routed. Coupled with Design Exchange Format (DEF) files, they provide the specification for placement and routing of complete integrated circuits.

In these examples, LEF/DEF files have content digests for the following file elements:
 File
 File Header
 Header Comment Text
 Cell Comment Text
 Layer-by-Layer Geometric Objects
 Layer-by-Layer Non-geometric Objects
 All Other Objects: Cell Size, Site Type etc.
 Boolean Flags Referring to Other Lower-level Cells The database is scanned to find the cell names inside. For cells present, layer-by-layer digests are returned for all:
 1. Geometric objects such as polygons, rectangles, etc.; and
 2. Non-geometric objects such as text points, etc.

A digest is assigned for all other objects such as the cell size, site type, and symmetry information. Digests are computed and returned for the header of the file (information before any cell definitions) and for the file as a whole.

As an option, separate digests are computed for comment text in the header and inside the cells, and differences in whitespace (number of spaces, tabs vs. spaces, blank lines) are ignored.

Library Exchange Format (LEF) Files

LEF files are text-oriented but they are generally written by automated tools, not designers. Descriptions of the processing technology (i.e. design rules) are typically stored in one LEF file, while cell information is specified in macros stored within another file. The technology information is recorded as file header data, while macros are recorded as cells. Nearly all of the information in a macro specifies the interface of the macro to the place and route tools, so it is recorded as cell interface data. Only the properties of a macro, if any, are recorded as cell body data.

Like GDSII and OASIS®, much of the data in a LEF file is order-independent, so it is sorted by default unless the user specifies the -nosort flag. Information in the file header is sorted where appropriate, as is the data within the macro.

Note that LEF files specify layers by name, not by number like GDSII or OASIS® files:

```
File "testfiles/parsetest.lef": LEF format
Arguments: -mem 64 -sort
    c5eb5fff      File
    1c18cc01      File non-Whitespace
    eb7f52d1      File Whitespace
File Header (sorted)
    30dbab35      File Header with Comments
    25a292d4      File Header without Comments
    157939e1      File Header Comments
    b450539c      File Header non-Layer
    316de219      File Header Layer M1
    a8fd3343      File Header Layer V1
    ff7eda09      File Header Layer M2
    1b691e80      File Header Layer V2
    ec75d49b      File Header Layer M3
Cell "AND2__X1" (sorted)
    1ed769e0      Cell with Comments
    1ed769e0      Cell without Comments
    (none)        Cell Comments
    818dbac9      Cell Interface non-Layer
    cbeea19a      Cell Interface Layer M1
    54b472b3      Cell Body non-Layer
```

Library Exchange Format Files: Definitions

The prototype LEF parser uses the definition of the LEF data file format in the Cadence LEF/DEF Language Reference Manual, version 5.6 (September 2004). This document has some ambiguities and typographical errors; these were resolved in the same manner as the reference parser supplied with the manual.

Syntax Interpretation

Cell descriptions in LEF are called macros; all information within a macro such as blockage and pin information is recorded as part of the cell interface. Blockages are regions which the router avoids when routing over the cell. Pins mark the locations to which the router draws wires to connect to the cell.

Design rule information in a technology LEF file is recorded as part of the file header.

Layers in a LEF file are indexed by name, so the parser creates a string layer name table and assigns indexes within that table as layer numbers. The table is available via the API.

Lines are truncated to 2,048 characters per the LEF specification.

SITE statements are recorded in the file header; they do not form cells per se.

Everything in a MACRO block except for properties is recorded as cell interface text, since a LEF file is meant to specify the interfaces of cells to a place and route tool.

LEF keywords are matched in a case-insensitive fashion. The LEF 5.6 specification is silent on this matter except for &ALIAS and &ENDALIAS, which are explicitly case-insensitive. Currently, the canonical cell digests are based on the original case of the keywords. This applies to layer, macro, and pin names even if NAMESCASESENSITIVE is set to OFF. However, this is readily changed.

Sorting of LEF Files

Generally, objects in a LEF file can appear in any order, with two exceptions:
 object references come after their definitions
 the width of a PATH is determined by the most recent WIDTH statement Within individual objects, some information is order-independent and some (e.g. PATH points or ITERATE values) is order-dependent. The parser segregates order-independent fields from order-dependent fields to ensure that sorted data is still valid.

When file sorting is requested, statements in the file header and within the macro are ordered alphabetically based first on the statement name and second on the statement parameters. Order-independent fields within statements are also sorted. To ensure canonicity, the WIDTH that applies to a given PATH is added to that PATH record prior to sorting.

Limitations of the Prototype LEF Parser

Many of the limitations of the LEF parser arise from the fact that it is parsing a single file, while tools that use LEF files can load multiple LEF files in sequence. The values from an earlier LEF file can be used in a later LEF file. Lacking access to those other files, the LEF parser relies on values passed to it.

NAMESCASESENSITIVE, BUSBITCHARS, and DIVIDERCHAR statements are not interpreted. The parser gets the divider character from the top-level driver (which does not yet have the capability of setting it from the command line, so a default value is used). If the parser were to rely on the value that it retrieved from the current file, it could get different results than the place and route tools when multiple LEF files are loaded.

The file is assumed to be syntactically correct even if references to ALIAS names are treated as identifiers. The ALIAS statements themselves could be in another file and could include arbitrary amounts of syntax, making a file impossible to parse independently.

Sorting of LEF files is alphabetic, not numeric, so canonical cell digests currently rely on the LEF generation software continuing to use the same number format as before.

The parser does not check to ensure that the technology LEF file (containing design rules) is separate from the cell library LEF file (containing macro descriptions).

SITE block references to previously defined SITE blocks are not checked to ensure they exist; the older SITE blocks might be in another file and only one file is parsed at a time. It is assumed that changes to SITE objects will not change the MACRO objects that reference them.

It is assumed that the technology information and other file header data will not exceed the memory usage limits and that no single MACRO will exceed the memory usage limits.

Annotated Sample LEF File

FIG. 14 is an annotated sample LEF file that illustrates application of the parsing rules above.

EXAMPLE 11 (CONT.)

Design Exchange Format (DEF) Files

Design Exchange Format (DEF) files provide a way to describe design floor plans and netlists for use in Place and Route (P&R) tools. Coupled with Library Exchange Format (LEF) files, they provide the specification for placement and routing of complete integrated circuits.

DEF files are text-oriented and may be written by automated tools or designers. High-level design information, such as the die area and region specifications, may be created by hand while detailed blockage information and pre-routed nets are generally written by software. Because the DEF file might not include placement regions and they do not correlate with design hierarchy, all data in a DEF file is recorded in the file header digests.

Like GDSII and OASIS®, much of the data in a DEF file is order-independent, so it is sorted by default unless the user specifies the -nosort flag.

Note that DEF files specify layers by name, not by number like GDSII or OASIS® files:

| | |
|---|---|
| File "testfiles/simple.def": DEF format | |
| Arguments: -mem 64 -sort | |
| a832fb91 | File |
| 807bad9c | File non-Whitespace |
| 280fe544 | File Whitespace |
| File Header (sorted) | |
| b8d02902 | File Header with Comments |
| c6810a4d | File Header without Comments |
| 7e51234f | File Header Comments |
| 6d026f6f | File Header non-Layer |
| 1d4870e4 | File Header Layer m1 |
| 74aecb62 | File Header Layer v1 |
| feafad9c | File Header Layer m2 |
| 6a00eeb9 | File Header Layer v2 |
| eeb61028 | File Header Layer m3 |

Design Exchange Format Files: Definitions

The prototype DEF parser uses the definition of the DEF data file format in the Cadence LEF/DEF Language Reference Manual, version 5.6 (September 2004). This document has some ambiguities and typographical errors; these were resolved in the same manner as the reference parser supplied with the manual.

Syntax Interpretation

A DEF file describes a design (or a block of a design) as a flat entity with no real hierarchy. Region grouping, even if used, does not reflect the design hierarchy. As a result, all DEF data is recorded as part of the file header.

Layers in a DEF file are indexed by name, so the parser creates a string layer name table and assigns indexes within that table as layer numbers. The table is available via the API.

Lines are truncated to 2,048 characters per the DEF specification.

DEF keywords are matched in a case-insensitive fashion. The DEF 5.6 specification is silent on this matter except for &ALIAS and &ENDALIAS, which are explicitly case-insensitive. The canonical cell digests are based on the original case of the keywords.

To reduce DEF file size, reused coefficients (e.g. in a POLYGON within a BLOCKAGE statement) may be represented as an asterisk ('*'). The parser does not currently expand asterisks to the numbers they represent, because any such value could in theory be an &ALIAS replacement and thus would not be a numeric token anyway.

Sorting of DEF Files

Most objects in a DEF file can appear in any order, except that object references come after their definitions. Within individual objects, some information is order-independent and some (e.g. POLYGON points) is order-dependent. The parser segregates order-independent fields from order-dependent fields to ensure that sorted data is still valid. For example, in a BLOCKAGE statement, the blockages for a layer are kept together when sorting. The objects within a layer can be sorted, however.

When file sorting is requested, statements in the file are ordered alphabetically based first on the statement name and second on the statement parameters. Order-independent fields within a statement are also sorted.

Limitations of the Prototype DEF Parser

Many of the limitations of the DEF parser arise from the fact that it is parsing a single file, while tools that use DEF files can load multiple DEF files in sequence. The values from an earlier DEF file can be used in a later DEF file. Lacking access to those other files, the DEF parser relies on values passed to it.

The file is assumed to be syntactically correct even if references to &ALIAS names are treated as identifiers. The &ALIAS statements themselves could be in another file and could include arbitrary amounts of syntax, making a file impossible to parse independently.

The counts in BLOCKAGES, COMPONENTS, FILLS, GROUPS, NETS, NONDEFAULTRULES, PINS, PINPROPERTIES, PROPERTYDEFINITIONS, REGIONS, SCANCHAINS, SLOTS, SPECIALNETS, STYLES, and VIAS sections are not verified against the actual number of items within these sections.

NAMESCASESENSITIVE, BUSBITCHARS, and DIVIDERCHAR statements are not interpreted. The parser gets the divider character from the top-level driver (which does not yet have the capability of setting it from the command line, so a default value is used). If the parser were to rely on the value that it retrieved from the current file, it could get different results than the place and route tools when multiple DEF files are loaded.

It is assumed that the UNITS command is either not present or will always be the same; coefficients in the file are currently not scaled by the design unit value.

Asterisks in data point coefficients are currently not expanded to numbers.

The memory used by comments is not always counted when determining whether the memory usage limit has been exceeded.

Annotated Sample DEF File

FIG. 15 is an annotated version of DEF file that illustrates application of these rules.

Not all possible statements are shown since everything except comments is sent to the file header digests anyway.

The following types of DEF object are sortable:
objects within the PROPERTYDEFINITIONS section
ROW definitions
TRACKS definitions
VIAS definitions; RECT and POLYGON objects within layers of a via
STYLES definitions (but not the polygon points within styles)
objects within the NONDEFAULTRULES section (but not the parameters within rules)
objects within the REGIONS section (but not the parameters within regions)
layers within BLOCKAGE definitions; RECT and POLYGON objects within layers
PLACEMENT objects within BLOCKAGE definitions; RECT and POLYGON objects within PLACEMENT objects
layers within the SLOTS section; RECT and POLYGON objects within layers
layers within the FILLS section; RECT and POLYGON objects within layers
objects within the COMPONENTS section (but not the parameters within components)
objects within the PINS section (but not the parameters within pins)
nets in NETS or SPECIALNETS sections (but not the parameters or connections within a net)
nets in the SCANCHAINS section (but not the parameters or connections within a net)
objects within the GROUPS section

EXAMPLE 12

Structured Text File Type

In this example, Structured Text files have content digests for the following file elements:
File
File Header
Comment Text
Non-comment Text A byte-by-byte digest is computed for script files and other structured text files. The digest is independent of newline style. As an option, differences in whitespace are ignored. An optional comment marker may be passed in; if it is present, separate digests are computed for comment and non-comment text. An optional line continuation character may be passed in; if it is present, lines ending with this character are merged before digest computation.

Structured Text (Script) Files

Structured text files are line-oriented human-readable files with identifiable comments and possibly a continuation character which signifies that a succeeding line is logically part of the current line. Shell, Perl, and Python scripts are typical examples of structured text files.

All data in a structured text file is recorded as file header data, either file header comments or file header non-layer data. Leading whitespace is removed and repeated whitespace characters are merged to a single space. Comments begin with a user-specified comment character sequence, e.g. '#', and continue to the end of the line. If a line ends with a user-specified continuation character, e.g. '\', it is merged with the next line; the continuation character and the end of the line character are removed.

Structured text files may have string constants enclosed in single or double quotes. Within a string constant, the quote character may appear if it is escaped with '\'. Whitespace within a quoted string is not merged.

Syntax Interpretation

All data in a structured text file is recorded as file header data, either file header comments or file header non-layer data.

For canonicity, repeated whitespace characters in a line are merged into a single space character. By default, all leading whitespace (indentation) is removed from the lines. Because indentation is significant in some languages (e.g. Python); there is a flag to retain leading whitespace as is. Even if this flag is set, repeated whitespace characters elsewhere in the line are still merged into a single space character.

Empty lines (only a line ending with no other characters) are recorded only in the file-level digests; they are not recorded in the file header digests.

If the file has DOS-style (CR-LF) line endings, they are converted to UNIX-style (LF only) line endings before any digests are computed.

String constants, whether surrounded by single quotes or double quotes, are treated as single words; they are recorded as is with no interpretation or white space merging. The backslash character ('\') can be used to escape quotes inside string constants:

"This is a string constant with \" an embedded quote in it"

The backslash character and enclosing quotes are recorded as part of the string constant.

Lines ending with a user-specified continuation character (e.g. '\') are merged with the following line prior to any other line processing, including identification of string constants. The continuation character is the last character before the end of the line with no white space following. It and the line ending character are removed when the two lines are merged. Any number of lines in a row may be merged this way.

Comments begin with a user-specified character sequence (e.g. "#" or "- -") and continue to the end of the line. The comment character may be anywhere within the line. Comment characters within string constants do not begin a comment. Continuation character processing is performed before comment processing, so if a continuation character appears at the end of a comment line the line afterward will also be recorded as part of the comment. Thus the following two blocks of text are equivalent and are recorded as a single comment line:

```
# this is a multi-\
line comment
and
# this is a multi-line comment
```

The continuation character cannot be quoted; if the last character in a line is a continuation character, the line is merged with the next line even if it is preceded with, for example, '\' or is inside a string constant.

Sorting of Structured Text Files

Structured text files are generally order-dependent, so they cannot be sorted.

Limitations of the Prototype Structured Text File Parser

Currently there is no way to block removal of leading white space using the command line interface. The API has this capability.

Currently there is no way of specifying the comment character sequence using the command line interface. The API has this capability.

Currently there is no way of specifying the continuation character using the command line interface. The API has this capability.

There is no way to specify the quoting character within strings; it is fixed as '\'.

Annotated Sample Structured Text File

FIG. 16 is an annotated version of a structured text file.

In this example, leading white space is not retained. If leading white space were retained, then all of the spaces at the front of the fifth line would have been recorded as file header text.

EXAMPLE 13

File Types Parsed by Outside Tools

For file types parsed by outside tools, content digests are provided for at least the following file elements:
File
File Header Text
Cell Name
Interface Object Name, Flag, etc.
Comment Text
Cell Body Text.

Any outside parser tool that is compatible with the canonical digest generating process can be used. In one embodiment, an outside file parser returns to the digest calculation code a file using line-oriented syntax as follows:

```
HEADERTEXT <header text>
CELL <cell name>
INTERFACE <interface object name> <interface flag>...
COMMENT <comment text>
CELLTEXT <cell body text>
```

There may be more than one HEADERTEXT record per file. There may be more than one CELL per file. There may be more than one INTERFACE record per cell.

The text of the line is added to the appropriate file or cell digest. Comment lines after a CELL record are added to the digest for that cell.

User-Parsed Text Files

There may be proprietary data file formats for which the user wants to record canonical cell digests. If so, the user can write parsers for these formats and translate the data inside into the User-Parsed Text File format shown below:

```
HEADERTEXT header_text
HEADERTEXT(layer) header_text
CELL cell_name
INTERFACE interface_object_name interface_object_text
INTERFACE(layer) interface_object_name interface_object_text
HIERCELL
CELLTEXT cell_body_text
CELLTEXT(layer) cell_body_text
CELLNONGEOM cell_body_text
CELLNONGEOM(layer) cell_body_text
COMMENT comment_text
```

This is a simple line-oriented syntax that provides complete access to all canonical cell digest types. Generally, file header data is indicated by HEADERTEXT lines, the beginning of a cell is indicated by a CELL line, cell interface records are indicated by INTERFACE lines, cell body records are indicated by CELLTEXT or CELLNONGEOM lines, and comments are indicated by COMMENT lines. A HIERCELL line indicates a hierarchical cell, i.e. one that contains references to other, lower-level cells. Data within a cell continues to the next CELL or HEADERTEXT line or the end of the file. All file header, cell interface, and cell body data may have layer names or numbers specified. The data may be sorted (grouped by layer, then alphabetically within the layer) if the -sort option is specified. The text for which digests are to be computed can have any format meaningful to the user.

Because the syntax is text-oriented and line-oriented, it is not possible to compare digests of files with this format to digests from any other file format. Binary file digests are computed using the binary data, and the parsers which compute digests for text files separate the lines into tokens first.

User-Parsed Text Files: Definitions

This format is provided for parsing proprietary format files. The user would write parsers that read file formats and generate files in this simple format, then pass the generated files to the canonical cell digest utility. It in turn would compute the full range of digests.

The description of the user-parsed file format is implemented by an Applications Program Interface (API) to the low-level digest engine. The interpretation of all file formats can be described as a series of calls to this API, so understanding this format will help the reader understand how the other formats are interpreted.

In a second embodiment, which is more sophisticated than the embodiment above, the user-parsed file format is again a line-oriented format. Records appear on a single line that begins with a keyword such as HEADERTEXT, COMMENT, CELL, INTERFACE, HIERCELL, or CELLTEXT. The HEADERTEXT, INTERFACE, and CELLTEXT lines may optionally have a layer name, in parentheses immediately following the keyword. The record on the remainder of the line is then recorded on that layer name. If no layer name is provided, a numeric layer number of −1 for non-layer data is used.

It is expected that these files will be generated only by computer software, so a strict format can be used:

all keywords in upper case the keyword on a line is not be preceded by any characters on the line if no layer name is specified, a single space follows the keyword, even if the text to be recorded is empty If a layer name is specified, it is enclosed in parentheses immediately following the keyword with no spaces in between. The text between the parentheses, including any white space, is stored as the layer name without interpretation. As a result, the layer name may not include a closing parenthesis. There is a space character after the closing parenthesis.

Everything after the first space is recorded as text of the specified type without further interpretation.

Newline sequences (CR-LF on Windows, LF on Unix/Linux) are removed before recording any digests, to avoid system dependence in the generated digests.

There is no limit on the length of any line. Lines begin with a keyword; blank lines are illegal.

Syntax of User-Parsed Text Files

The format of a line is as follows:

---
HEADERTEXT header_text
HEADERTEXT(layer) header_text
---

A HEADERTEXT line specifies data outside of any cell. If a cell is open (see below), that cell is terminated and no further cell text can be provided until a new cell is started. All header data is saved as a single block, whether it is at the start of the file, between cells, or after the last cell. If the header text is to be sorted, all of it is kept in memory until the end of the file (subject to the memory usage limit) and then sorted as a unit.

A space character follows the HEADERTEXT keyword; everything after that space to the end of the line is recorded as file header text. No further white space removal is performed, and no further interpretation or upper case/lower case conversion is performed.

CELL cell_name

A CELL line specifies the beginning of a new cell. If a cell is already open, it is terminated and all digests are computed for it. A space character follows the CELL keyword; everything after that space to the end of the line is used as the cell name, including any white space. No interpretation or upper case/lower case conversion is performed on the cell name. Duplicate cell names are not allowed; if there might be duplicate names in a proprietary format, they are disambiguated in the parser for that format. A fatal error will occur if a duplicate cell name is found.

---
INTERFACE interface_object_name interface_object_text
INTERFACE(layer) interface_object_name interface_object_text
---

An INTERFACE line specifies an interface record for a cell. There is a separate name for interface records, but otherwise the data on the line is not interpreted. There may be multiple interface records using the same interface name. The interface name (e.g. a pin name for a cell) is the first white space-delimited word after the INTERFACE keyword or layer name. Any white space after the interface name is then skipped, and whatever text remains (if any) on the line is recorded as the interface object text. No upper case/lower case conversion is performed on the interface name or interface object text, and no white space removal is performed on the interface object text. Both the interface name and the interface object text are recorded as cell interface data.

A fatal error will occur if an INTERFACE line is found outside of a cell (before the first CELL statement or between a HEADERTEXT statement and the next CELL statement).

HIERCELL

A HIERCELL line marks the cell as being hierarchical, meaning that it contains references to other cells. This information is available for digest reporting. There are no parameters on this line.

---
CELLTEXT cell_body_text
CELLTEXT(layer) cell_body_text
---

A CELLTEXT line specifies cell body text. Everything after the space which follows the CELLTEXT keyword or the closing parenthesis of the layer name is recorded as cell body text without further interpretation or upper case/lower case conversion. No white space removal is performed either.

A fatal error will occur if a CELLTEXT line is found outside of a cell (before the first CELL statement or between a HEADERTEXT statement and the next CELL statement).

> CELLNONGEOM cell_body_text
> CELLNONGEOM(layer) cell_body_text

A CELLNONGEOM line specifies non-geometric cell body text. Everything after the space which follows the CELLNONGEOM keyword or the closing parenthesis of the layer name is recorded as cell non-geometry body text without further interpretation or upper case/lower case conversion. No white space removal is performed either.

A fatal error will occur if a CELLNONGEOM line is found outside of a cell (before the first CELL statement or between a HEADERTEXT statement and the next CELL statement).
COMMENT comment_text The COMMENT line specifies comment text. Everything after the space which follows the COMMENT keyword is recorded as cell or file header comment text (depending on the context) without further interpretation, white space removal, or upper case/lower case conversion.

Sorting of User-Parsed Text Files

If sorting is requested, the text for the header is collected until the end of the file is reached (even if there are cells in the file) or until so much header text is stored in memory that the usage limit is exceeded. If the usage limit is exceeded, the stored header text is sent to the digest module in its original order. Similarly, text for a cell is collected until the end of the cell is reached or until so much header and cell text is stored in memory that a usage limit is exceeded. This should happen infrequently, if ample memory is provided or provisions are made to buffer memory to disk.

Header text is kept in memory in preference to cell text. The assumption is that if there are cells in the file, the cells are the most likely units to overflow the memory limit and so there is little benefit to releasing the header text.

For header text, the primary sort key is the layer number: lower layer numbers (indexes within the layer name table) come first. Within a given layer, the lines are sorted in alphabetic order using the text of the lines, excluding the keyword and layer name.

Within a cell, the primary sort key is the line type: interface text comes before cell body text, and cell non-geometry body text comes last. The layer number is the secondary key: lower layer numbers come first. Within a given layer, the lines are sorted in alphabetic order using the text of the lines, excluding the keyword and layer name.

Annotated Sample User-Parsed File

FIGS. 17A-17B are annotated examples of user parsed files. The layer names in FIG. 17A are lay1, lay2, lay3, and lay4. These will be recorded as layers 0 through 3 respectively and a mapping table will be made available. File header, cell interface, cell body, and cell non-geometry body lines with no layer are recorded on layer −1, for which no layer name will be defined. For this format, the definition of layer −1 is determined by the user's application.

Cell cell2 is hierarchical and has interface objects (e.g. pins) named h3, i1, i2, and i3. Cell cell1 has interface objects named j1 and j2.

If the file is not sorted, digests are recorded in the order of appearance as shown above. If the file is sorted, canonical cell digests will be recorded as shown in FIG. 17B.

Note that the sorting of interface lines is based on the remainder of a line before it is split into the interface name and the interface text. Thus interface h3 of cell cell2 is recorded before interface i1, even though the interface text of i1 precedes that of h3 alphabetically. Similarly, the first line of the header text will be recorded last because it has a layer index of 0 while the other header lines have a layer index of 31 1.

Also note that cell cell2 ends when cell cell1 begins and that cell cell1 ends when the header text begins.

The file-level digests will not change when sorting is enabled. HIERCELL records do not affect the sorting or the canonical cell digests of the cells that contain them; they simply set a flag in the cell data structure.

Limitations of the User-Parsed Text File Format

The User-Parsed file format is ASCII, so it is not possible to write a User-Parsed file that will have the same digests as a file in the binary OASIS® and GDSII formats. There are also differences between the ways that tokens are processed in User-Parsed files versus tokens in other structured text file formats. To match digests from files using a proprietary, internal data format to digests from another format, the user either translates the internal data format files to the supported format first or writes a custom parser for the internal format.

Working Examples of Comparing Canonical Digests

Three modes of comparison are available using the prototype command line tool. File comparison mode compares digest files for two different versions of a design file such as OASIS® or GDSII and reports meaningful differences. Version check mode compares digests for a design file against digests calculated for a set of library files and reports the most recent match, if any. Database check mode matches cells in a design file against libraries containing digests of new/untested cells, production cells, deprecated/obsolete cells, and known bad cells.

File Comparison Mode

In file comparison mode, digests for two design files are compared and any differences are reported. It notes any unmatched cells and prints a report for cells with different digests, along with the layers (when applicable) and cell structures (e.g. interfaces, when applicable) that differ. This mode is useful when one wants to ensure that only authorized changes have been made to a design already in production. For example, a designer might have changed one layer in a single cell; any reports of additional changes would represent errors.

The syntax for running a file comparison using the prototype command line tool is:
sigcompare -compare [-showall] file1 file2

The first parameter, -compare specifies file comparison mode. By default, only differing cells are reported; the optional -showall flag specifies that all cells are reported, including identical cells.

Cells are matched by name, with no attempt to find copies under different names.

File Comparison Example

Consider the following pair of Library Exchange Format (LEF) digest files:

```
File "lib_45nm_v1_0.lef": LEF format
Arguments: -mem 64 -sort
    c5eb5fff      File
    1c18cc01      File non-Whitespace
    eb7f52d1      File Whitespace
File Header (sorted)
    6f3a526d      File Header with Comments
    7a436b8c      File Header without Comments
    157939e1      File Header Comments
    b450539c      File Header non-Layer
    316de219      File Header Layer M1
    ff7eda09      File Header Layer M2
```

```
Cell "AND2_X1" (sorted)
    9a4743f9        Cell with Comments
    9a4743f9        Cell without Comments
    (none)          Cell Comments
    051d90d0        Cell Interface non-Layer
    cbeea19a        Cell Interface Layer M1
    54b472b3        Cell Body non-Layer
Cell "AND2_X2" (sorted)
    6922ffe9        Cell with Comments
    6922ffe9        Cell without Comments
    (none)          Cell Comments
    04592cfd        Cell Interface non-Layer
    39cfa1a7        Cell Interface Layer M1
    54b472b3        Cell Body non-Layer
Cell "AND2_X4" (sorted)
    aa5c90cd        Cell with Comments
    aa5c90cd        Cell without Comments
    (none)          Cell Comments
    d48106d4        Cell Interface non-Layer
    2a69e4aa        Cell Interface Layer M1
    39cfa1a7        Cell Interface Layer M2
    54b472b3        Cell Body non-Layer
Cell "AND3_X1" (sorted)
    ae1d08cc        Cell with Comments
    ae1d08cc        Cell without Comments
    (none)          Cell Comments
    5b3057b1        Cell Interface non-Layer
    a1992dce        Cell Interface Layer M1
    54b472b3        Cell Body non-Layer
Cell "AND3_X2" (sorted)
    e9fc0084        Cell with Comments
    e9fc0084        Cell without Comments
    (none)          Cell Comments
    6bca4478        Cell Interface non-Layer
    d682364f        Cell Interface Layer M1
    54b472b3        Cell Body non-Layer
Cell "AND3_X4" (sorted)
    6a5906e0        Cell with Comments
    6a5906e0        Cell without Comments
    (none)          Cell Comments
    0a3e63ea        Cell Interface non-Layer
    34d317b9        Cell Interface Layer M1
    77375526        Cell Interface Layer M2
    54b472b3        Cell Body non-Layer
and:
File "lib_45nm_v2_0.lef": LEF format
Arguments: -mem 64 -sort
    e03e9e03        File
    80a5de77        File non-Whitespace
    30dbab35        File Whitespace
File Header (sorted)
    7c315cff        File Header with Comments
    6948651e        File Header without Comments
    157939e1        File Header Comments
    b450539c        File Header non-Layer
    316de219        File Header Layer M1
    ec75d49b        File Header Layer M2
Cell "AND2_X1" (sorted)
    1ed769e0        Cell with Comments
    1ed769e0        Cell without Comments
    (none)          Cell Comments
    818dbac9        Cell Interface non-Layer
    cbeea19a        Cell Interface Layer M1
    54b472b3        Cell Body non-Layer
Cell "AND2_X2" (sorted)
    498852e8        Cell with Comments
    498852e8        Cell without Comments
    (none)          Cell Comments
    04592cfd        Cell Interface non-Layer
    19650ca6        Cell Interface Layer M1
    54b472b3        Cell Body non-Layer
Cell "AND2_X4" (sorted)
    aa5c90cd        Cell with Comments
    aa5c90cd        Cell without Comments
    (none)          Cell Comments
    d48106d4        Cell Interface non-Layer
    2a69e4aa        Cell Interface Layer M1
    39cfa1a7        Cell Interface Layer M2
    54b472b3        Cell Body non-Layer
Cell "AND3_X1" (sorted)
    ae1d08cc        Cell with Comments
    ae1d08cc        Cell without Comments
    (none)          Cell Comments
    5b3057b1        Cell Interface non-Layer
    a1992dce        Cell Interface Layer M1
    54b472b3        Cell Body non-Layer
Cell "AND3_X2" (sorted)
    e9fc0084        Cell with Comments
    e9fc0084        Cell without Comments
    (none)          Cell Comments
    6bca4478        Cell Interface non-Layer
    d682364f        Cell Interface Layer M1
    54b472b3        Cell Body non-Layer
Cell "AND3_X4" (sorted)
    6a5906e0        Cell with Comments
    6a5906e0        Cell without Comments
    (none)          Cell Comments
    0a3e63ea        Cell Interface non-Layer
    34d317b9        Cell Interface Layer M1
    77375526        Cell Interface Layer M2
    54b472b3        Cell Body non-Layer
```

These files were generated by reading two versions of a LEF file with geometry sorting enabled (recommended for OASIS®, GDSII, LEF, DEF, and Liberty format files) and 32-bit digests. Because LEF files specify how a place and route tool should connect to standard cells, nearly everything in the cells is in the interface—changes are quite significant, because they mean that the new layout versions could not simply be dropped in to replace the older versions.

Running this command:

sigcompare    -compare    sigcompare_file1.txt sigcompare_file2.txt

Produces the following report:

```
Summary of file-level comparisons:
File "lib_45nm_v1_0.lef" File digest does not match
File "lib_45nm_v2_0.lef" File digest.
File "lib_45nm_v1_0.lef" non-Whitespace digest does not match
File "lib_45nm_v2_0.lef" non-Whitespace digest.
File "lib_45nm_v1_0.lef" Whitespace digest does not match
File "lib_45nm_v2_0.lef" Whitespace digest.
Summary of file header comparisons:
File "lib_45nm_v1_0.lef" header is a partial match with
File "lib_45nm_v2_0.lef" header:
    non-Layer digests match
    File Header Layers matched:
        M1
    File Header Layers mismatched:
        M2
    comments match
Summary of all cell comparisons:
        2   cells are partial matches
        4   cells are perfect matches
File "lib_45nm_v1_0.lef" cell "AND2_X2" is a partial match with
File "lib_45nm_v2_0.lef" cell "AND2_X2":
    Cell Interface matches partially:
        Cell Interface non-Layer digests match
        Cell Interface Layers mismatched:
            M1
    no Cell Body data is present
    no Cell Body non-Geometric Layer data is present
    no comments present
```

```
File "lib_45nm_v1_0.lef" cell "AND2_X1" is a partial match
with
File "lib_45nm_v2_0.lef" cell "AND2_X1":
    Cell Interface matches partially:
        Cell Interface non-Layer digests do not match
        Cell Interface Layers matched:
            M1
    no Cell Body data is present
    no Cell Body non-Geometric Layer data is present
    no comments present
```

There are differences somewhere in the files, so the file digests of all bytes in the file differ. Some of the values are different as well, so the non-whitespace digests differ. Finally, the whitespace digests differ. The file digest comparison is printed for all file types; the other two are printed only for text file types.

The LEF file headers (which include design rules and parasitic information for routing layers) differ on layer M2, and the cells AND2_X2 and AND2_X1 do not match completely. These comparisons do not show the exact nature of the differences between the headers and the cells; they simply tell the user where to look.

Not all design file formats have relevant data in the file header. GDSII files have no meaningful data in the file header, and OASIS® file-level properties do not affect the geometric representation. As a result, a comparison between GDSII or OASIS® files will not include a report on matching of file header data.

Version Reporting Mode

One use of version reporting mode is to determine the source library for cells in a design file when the user has multiple versions of a library file. For cells in the design file, the program locates the most recent match from all of the library files, if any.

The syntax for version reporting mode is:
sigcompare -report [-showall] file -1 file . . . -2 file . . . [-3 file . . .] . . .

The design file is first; the remaining files are libraries. Library files are specified with their version number, with -1 representing the most recent version, -2 representing the next most recent version, etc. There is no limit on the version numbers or the number of files per version number, except that the version numbers are sequential and there is at least one file per version number.

The -report parameter specifies version reporting mode. By default, only unmatched cells (e.g. place and route cells), imperfect matches, or matches to out-of-date cells are reported; the optional -showall flag specifies that all cells are reported, including perfect matches to the most recent library version.

If a file name starts with a "-" then its name is preceded with -file.

Cells are matched by name, with no attempt to find copies under different names.

Version Reporting Example

This example compares the digests from a small design OASIS® file against the GDSII libraries used to build it. The design digest file is named

```
design_from_versions.txt:
    File "design_from_versions.oas": OASIS format
    Arguments: -grid 1e-9 -mem 64 -sort
    f3b2848e    File
    (none)      File non-Whitespace
    (none)      File Whitespace
    File Header (sorted)
    (none)      File Header with Comments
    (none)      File Header without Comments
    (none)      File Header Comments
    Cell "top" (sorted; hierarchical)
    4512f0e0    Cell with Comments
    4512f0e0    Cell without Comments
    (none)      Cell Comments
    4512f0e0    Cell Body non-Layer
    Cell "AND2_X1" (sorted)
    63710c55    Cell with Comments
    63710c55    Cell without Comments
    (none)      Cell Comments
    a57f61d1    Cell Body Layer 8
    d5557088    Cell Body Layer 10
    135b1d0c    Cell Body Layer 12
    Cell "AND2_X2" (sorted)
    4245e32b    Cell with Comments
    4245e32b    Cell without Comments
    (none)      Cell Comments
    33bfda26    Cell Body Layer 8
    47834653    Cell Body Layer 10
    36797f5e    Cell Body Layer 12
    Cell "AND2_X4" (sorted)
    7dbb4961    Cell with Comments
    7dbb4961    Cell without Comments
    (none)      Cell Comments
    b431c2dd    Cell Body Layer 8
    addb2970    Cell Body Layer 10
    6451a2cc    Cell Body Layer 12
```

Digests from the most recent library are included in the file sigcompare_version1_3.txt: note that the GDSII cells have comment digests while the OASIS® cells above do not have any comments.

```
File "lib_v1_3.gds": GDS format
Arguments: -grid 1e-9 -mem 64 -sort
    3b57a2c0    File
    (none)      File non-Whitespace
    (none)      File Whitespace
    File Header (sorted)
    9547893d            File Header with Comments
    01f60a9d File Header without Comments
    94b183a0            File Header Comments
    01f60a9d            File Header non-Layer
    Cell "AND2_X1" (sorted)
    e60bb9da    Cell with Comments
    7ff21caa    Cell without Comments
    99f9a570    Cell Comments
    b9fc712e    Cell Body Layer 8
    d5557088    Cell Body Layer 10
    135b1d0c    Cell Body Layer 12
    Cell "AND2_X2" (sorted)
    ff7d7b80    Cell with Comments
    6684def0    Cell without Comments
    99f9a570    Cell Comments
    cdf468c5    Cell Body Layer 8
    9d09c96b    Cell Body Layer 10
    36797f5e    Cell Body Layer 12
    Cell "AND2_X4" (sorted)
    11174169    Cell with Comments
    88eee419    Cell without Comments
    99f9a570    Cell Comments
    7715e8f3    Cell Body Layer 8
    8158c56e    Cell Body Layer 10
    7ea3c984    Cell Body Layer 12
```

Digests from the previous version are included in the file

```
sigcompare_version1_2.txt:
File "lib_v1_2.gds": GDS format
Arguments: -grid 1e-9 -mem 64 -sort
    f7b57566      File
    (none)        File non-Whitespace
    (none)        File Whitespace
File Header (sorted)
    e4590214      File Header with Comments
    d5839d36      File Header without Comments
    31da9f22      File Header Comments
    d5839d36      File Header non-Layer
Cell "AND2_X1" (sorted)
    6f006266      Cell with Comments
    26f9c716      Cell without Comments
    99f9a570      Cell Comments
    b9fc712e      Cell Body Layer 8
    26cf422a      Cell Body Layer 10
    b9caf41f      Cell Body Layer 12
Cell "AND2_X2" (sorted)
    4b527d9d      Cell with Comments
    4245e32b      Cell without Comments
    09179eb6      Cell Comments
    33bfda26      Cell Body Layer 8
    47834653      Cell Body Layer 10
    36797f5e      Cell Body Layer 12
Cell "AND2_X4" (sorted)
    b35fe404      Cell with Comments
    92f41f5b      Cell without Comments
    21abfb5f      Cell Comments
    418cffaf      Cell Body Layer 8
    addb2970      Cell Body Layer 10
    7ea3c984      Cell Body Layer 12
```

Digests from the oldest active version of the library are stored in sigcompare_version1_1.txt:

```
File "lib_v1_1.gds": GDS format
Arguments: -grid 1e-9 -mem 64 -sort
    ae014c24      File
    (none)        File non-Whitespace
    (none)        File Whitespace
File Header (sorted)
    82295a77      File Header with Comments
    86b9ff40      File Header without Comments
    0490a537      File Header Comments
    86b9ff40      File Header non-Layer
Cell "AND2_X1" (sorted)
    15918b78      Cell with Comments
    8c682e08      Cell without Comments
    99f9a570      Cell Comments
    b9fc712e      Cell Body Layer 8
    26cf422a      Cell Body Layer 10
    135b1d0c      Cell Body Layer 12
Cell "AND2_X2" (sorted)
    5a1e9163      Cell with Comments
    169108cf      Cell without Comments
    4c8f99ac      Cell Comments
    33bfda26      Cell Body Layer 8
    47834653      Cell Body Layer 10
    6fad94ba      Cell Body Layer 12
Cell "AND2_X4" (sorted)
    99bcef32      Cell with Comments
    b817146d      Cell without Comments
    21abfb5f      Cell Comments
    b431c2dd      Cell Body Layer 8
    addb2970      Cell Body Layer 10
    a1fdffc0      Cell Body Layer 12
```

If this command is run:

```
sigcompare -report design_from_versions.txt \
    -1 sigcompare_version1_3.txt \
    -2 sigcompare_version1_2.txt \
    -3 sigcompare_version1_1.txt
```

Then the following report is generated:

```
Summary of all comparisons:
1   cells do not appear in any library
    1   of these cells are hierarchical
2   cells match only partially with library cells
2   cells match old library cells
File "design_from_versions.oas" cell "top" does not match any
library cell.
    cell is hierarchical.
File "design_from_versions.oas" cell "AND2_X4" is a partial
match with
File "lib_v1_1.gds" cell "AND2_X4":
    no Cell Interface data is present
    Cell Body data matches partially:
        Cell Body Layers matched:
            10 8
        Cell Body Layers mismatched:
            12
    no Cell Body non-Geometric Layer data is present
    there are 2 newer versions of this cell
File "design_from_versions.oas" cell "AND2_X1" is a partial
match with
File "lib_v1_3.gds" cell "AND2_X1":
    no Cell Interface data is present
    Cell Body data matches partially:
        Cell Body Layers matched:
            10 12
        Cell Body Layers mismatched:
            8
    no Cell Body non-Geometric Layer data is present
File "design_from_versions.oas" cell "AND2_X2" is a perfect
match with
File "lib_v1_2.gds" cell "AND2_X2":
    no Cell Interface data is present
    Cell Body data matches perfectly:
        Cell Body Layers matched:
            10 12 8
    no Cell Body non-Geometric Layer data is present
    there is 1 newer version of this cell
```

The top-level design cell is not in any library, as expected. The other three cells in the design file have at least one reportable issue:

AND2_X4 does not match any library cell perfectly; the closest match is a version from the oldest library AND2_X1 does not match any library cell perfectly; the closest match is a version from the newest library AND2_X2 is a perfect match to a cell in the second oldest library The list of matched and mismatched data types and layers is printed when a cell matches only in part.

Database Checking Mode

One use of database checking mode is to verify a candidate design file against a set of libraries tagged with maturity levels: new/unproven, production, deprecated/obsolete, or known bad. These represent the lifetime of a particular version of a cell. For example, if a design is in mass production, the user might not want to use an unproven version of a cell; the user might want to use only cells that have been marked production-worthy. Once a new version has been proven, however, older versions are phased out. Deprecated versions might be used only in designs already in mass production, not in new designs. Finally, if a cell version is known to have functional or yield problems, it should not be used in any designs.

Canonical cell digest matching allows the user to classify all of the cells in a candidate file, even if they have been copied under different names. In this way the user can detect all uses of a known bad cell or identify unauthorized cells in time to prevent release of a design to fabrication.

Using a prototype command line processor, the syntax for database checking mode is:
sigcompare -database [-showall] [-new . . . ] [-prod . . . ] [-depr . . . ] [-bad . . . ] -test . . .

The -database parameter specifies database checking mode. By default, perfect matches to production cells are not reported. Use the optional -showall flag to report these cells as well.

The remainder of the command line is the list of digest files with their types. They may be in any order except that there is at least one -test (candidate) file and at least one file of another type.

The -new parameter is used to specify libraries containing cells that are new and have not yet been proven in production. All file names that follow, up to the next library type, are marked as new.

The -prod parameter is used to specify libraries containing cells that have been proven in production. All file names that follow, up to the next library type, are marked as production.

The -depr parameter is used to specify libraries containing cells that are deprecated or obsolete and should not be used in new designs. All file names that follow, up to the next library type, are marked as deprecated.

The -bad parameter is used to specify libraries containing cells that are known to be bad and should be removed from all designs. All file names that follow, up to the next library type, are marked as known bad.

The -test parameter is used to specify candidate design files. Generally the user will compare only one candidate file at a time.

If a file name starts with a "-" then its name is preceded with -file.

Database Checking Example

This example compares the digests from a small design OASIS® file against the GDSII libraries used to build it. The design digest file is named

| design_from_database.txt: |
|---|
| File "design_from_database.oas": OASIS format |
| Arguments: -grid 1e−9 -mem 64 -sort |
|   14430d19    File |
|   (none)    File non-Whitespace |
|   (none)    File Whitespace |
| File Header (sorted) |
|   (none)    File Header with Comments |
|   (none)    File Header without Comments |
|   (none)    File Header Comments |
| Cell "top" (sorted; hierarchical) |
|   fccf8240    Cell with Comments |
|   fccf8240    Cell without Comments |
|   (none)    Cell Comments |
|   fccf8240    Cell Body non-Layer |
| Cell "AND2_X1" (sorted) |
|   7ff21caa    Cell with Comments |
|   7ff21caa    Cell without Comments |
|   (none)    Cell Comments |
|   b9fc712e    Cell Body Layer 8 |
|   d5557088    Cell Body Layer 10 |
|   135b1d0cV    Cell Body Layer 12 |

| -continued |
|---|
| design_from_database.txt: |
| Cell "AND2_X2" (sorted) |
|   aeece77d    Cell with Comments |
|   aeece77d    Cell without Comments |
|   (none)    Cell Comments |
|   df16de70    Cell Body Layer 8 |
|   47834653    Cell Body Layer 10 |
|   36797f5e    Cell Body Layer 12 |
| Cell "AND2_X4" (sorted) |
|   b817146d    Cell with Comments |
|   b817146d    Cell without Comments |
|   (none)    Cell Comments |
|   b431c2dd    Cell Body Layer 8 |
|   addb2970    Cell Body Layer 10 |
|   a1fdffc0    Cell Body Layer 12 |
| Cell "AND2_X4A" (sorted) |
|   b817146d    Cell with Comments |
|   b817146d    Cell without Comments |
|   (none)    Cell Comments |
|   b431c2dd    Cell Body Layer 8 |
|   addb2970    Cell Body Layer 10 |
|   a1fdffc0    Cell Body Layer 12 |
| Cell "AND2_X3" (sorted) |
|   c6f8c857    Cell with Comments |
|   c6f8c857    Cell without Comments |
|   (none)    Cell Comments |
|   b9fc712e    Cell Body Layer 8 |
|   075a8f95    Cell Body Layer 10 |
|   785e36ec    Cell Body Layer 12 |
| Cell "AND2_X5" (sorted) |
|   e60bb9da    Cell with Comments |
|   7ff21caa    Cell without Comments |
|   99f9a570    Cell Comments |
|   b9fc712e    Cell Body Layer 8 |
|   d5557088    Cell Body Layer 10 |
|   135b1d0c    Cell Body Layer 12 |

The files sigcompare_version1_1.txt, sigcompare_version1_2.txt, and sigcompare_version1_3.txt from the version reporting example are used again, along with a new file sigcompare_version1_4.txt:

| |
|---|
| File "lib_v1_4.gds": GDS format |
| Arguments: -grid 1e−9 -mem 64 -sort |
|   c589f1a1    File |
|   (none)    File non-Whitespace |
|   (none)    File Whitespace |
| File Header (sorted) |
|   43922b24    File Header with Comments |
|   c52bd464    File Header without Comments |
|   86b9ff40    File Header Comments |
|   c52bd464    File Header non-Layer |
| Cell "AND2_X1" (sorted) |
|   512424b9    Cell with Comments |
|   4a03a6f8    Cell without Comments |
|   1b278241    Cell Comments |
|   b9fc712e    Cell Body Layer 8 |
|   8ba1e13a    Cell Body Layer 10 |
|   785e36ec    Cell Body Layer 12 |
| Cell "AND2_X2" (sorted) |
|   a994ef98    Cell with Comments |
|   58eb1029    Cell without Comments |
|   f17fffb1    Cell Comments |
|   cdf468c5    Cell Body Layer 8 |
|   47a75210    Cell Body Layer 10 |
|   d2b82afc    Cell Body Layer 12 |
| Cell "AND2_X4" (sorted) |
|   9842af7a    Cell with Comments |
|   5c09dc54    Cell without Comments |
|   c44b732e    Cell Comments |
|   8d50e097    Cell Body Layer 8 |
|   affaf547    Cell Body Layer 10 |
|   7ea3c984    Cell Body Layer 12 |

When this command is run:

```
sigcompare -database -new sigcompare_version1_4.txt \
    -prod sigcompare_version1_3.txt \
    -depr sigcompare_version1_2.txt \
    -bad sigcompare_version1_1.txt \
    -test design_from_database.txt
```

The following report is generated:

```
Summary of all comparisons:
    1   cells have no good matches
        1   of these cells are hierarchical
    2   cells are perfect matches with known bad cells
        1   of these matches are under different names
    1   cells are partial matches with deprecated cells
    1   cells are partial matches with new cells
        1   of these matches are under different names
    2   cells are perfect matches with production cells
        1   of these matches are under different names
File "design_from_database.oas", cell "top": no good matches.
    cell is hierarchical.
File "design_from_database.oas" cell "AND2_X4A" is a perfect
match with
File "lib_v1_1.gds" bad cell "AND2_X4":
    no Cell Interface data is present
    Cell Body data matches perfectly:
        Cell Body Layers matched:
            10 12 8
        no Cell Body non-Geometric Layer data is present
File "design_from_database.oas" cell "AND2_X4" is a perfect
match with
File "lib_v1_1.gds" bad cell "AND2_X4":
    no Cell Interface data is present
    Cell Body data matches perfectly:
        Cell Body Layers matched:
            10 12 8
        no Cell Body non-Geometric Layer data is present
File "design_from_database.oas" cell "AND2_X2" is a partial
match with
File "lib_v1_2.gds" deprecated cell "AND2_X2":
    no Cell Interface data is present
    Cell Body data matches partially:
        Cell Body Layers matched:
            10 12
        Cell Body Layers mismatched:
            8
        no Cell Body non-Geometric Layer data is present
File "design_from_database.oas" cell "AND2_X3" is a partial
match with
File "lib_v1_4.gds" new cell "AND2_X1":
    no Cell Interface data is present
    Cell Body data matches partially:
        Cell Body Layers matched:
            12 8
        Cell Body Layers mismatched:
            10
        no Cell Body non-Geometric Layer data is present
File "design_from_database.oas" cell "AND2_X5" is a perfect
match with
File "lib_v1_3.gds" production cell "AND2_X1":
    no Cell Interface data is present
    Cell Body data matches perfectly:
        Cell Body Layers matched:
            10 12 8
        no Cell Body non-Geometric Layer data is present
```

As before, the top-level cell does not match any of the libraries. Any cell the designer creates as part of the physical design process, e.g. by place and route, will not be in a library. Usually these cells will not be leaf cells, so a report is printed for cells that are hierarchical, meaning they have references to other cells in them.

Matches to known bad cells are listed after unmatched cells. In this program mode, matches are found and reported even if the cell names differ. For example, cell AND2_X4A is a copy of the known bad cell AND2_X4 from the oldest library (version 1.1), suggesting that a designer renamed the cell in a design block rather than replace it with the up-to-date version. The known bad version of AND2_X4 also appears under its original name.

Matches to deprecated cells are listed next. Here the best match to the design cell AND2_X2 is from the deprecated library version 1.2. This suggests that a designer modified the cell locally starting with an out-of-date library. The layer similarities and differences are noted with the cell and file names.

Matches to new cells are listed after matches to deprecated cells. Cell AND2_X3 from the design is a perfect match to the new library cell AND2_X1, meaning that it was copied from the new library under a different name.

Finally, matches to production cells under different names are listed. Here the design cell AND2_X5 is a copy of the production cell AND2_X1 from library version 1.3. This is not an immediate problem, but if version 1.3 of AND2_X1 is modified later, the copy will not be replaced with the improved version.

If the -showall option is selected, matches to production cells of the same name are listed after all other matches. In this tiny example only one additional cell report would be printed; normally thousands of matching cell reports would be printed.

```
File "design_from_database.oas" cell "AND2_X1" is a perfect
match with
File "lib_v1_3.gds" production cell "AND2_X1":
    no Cell Interface data is present
    Cell Body data matches perfectly:
        Cell Body Layers matched:
            10 12 8
        no Cell Body non-Geometric Layer data is present
```

Reports of Matching Liberty (.lib) Files

The Liberty format file testfiles/tstlibpar2.lib contains timing models for a few cells. The cell AND2_X2 has both cell and scaled_cell specifications. In one embodiment these are combined to generate the digest for the cell. The cells AND2_X1, AND2_X1_copy, and AND2_X1copy_b are identical; AND2_X1_copy is an exact copy while some of the statements within AND2_X1_copy_b have been reordered. Without sorting, the digests differ:

```
otismartsig -sort -lib testfiles/tstlibpar2.lib
...
Cell "AND2_X1"
    Interface CRC 0190af2f
    Contents CRC 6a059541
Cell "AND2_X1_copy"
    Interface CRC 0190af2f
    Contents CRC 6a059541
Cell "AND2_X1_copy_b"
    Interface CRC 1ee6bb80
    Contents CRC e4fa24f0
```

The pin group statements of the cells are considered part of the cell interface. Because two pin statements were exchanged in AND2_X1_copy_b, both the interface and the contents digests changed.

With sorting on, all of the digests match:

```
otismartsig -sort -lib testfiles/tstlibpar2.lib
...
Cell "AND2_X1"
    Interface CRC 0190af2f
    Contents CRC dc623050
Cell "AND2_X1_copy"
    Interface CRC 0190af2f
    Contents CRC dc623050
Cell "AND2_X1_copy_b"
    Interface CRC 0190af2f
    Contents CRC dc623050
```

Modifying the header of a Liberty format file (e.g. the units, operating conditions, or table indices) potentially impacts cells in the library, so by default the non-comment tokens of the header are added to the digest of cells in the library. Any change in the header will thus change cell digests.

Reports of Matching Verilog Files

The file testfiles/verilog_test.v contains several small modules that describe the function of some transistor-level cells. Some of these modules are copies. For example, the module DFF_X2 is a direct copy of the module DFF_X1. Accordingly, the digests for the two modules are identical:

```
otismartsig -ver testfiles/verilog_test.v
...
Cell "DFF_X1"
    Interface CRC c102a525
    Contents CRC dbac5dc2
Cell "DFF_X2"
    Interface CRC c102a525
    Contents CRC dbac5dc2
```

A blank line was removed from within the cell, but the language constructs are identical. There are no comments within either module, so no comment digests are reported.

The file testfiles/verilog_test2.v contains the modules OAI21_X1 and OAI21_X2. The latter is identical except that the port ordering has changed. Often Verilog modules are instantiated using positional parameters, so the connections to the modules would be different and the digests will also be different:

```
otismartsig -ver testfiles/verilog_test2.v
File "testfiles/verilog_test2.v": Verilog format
    File CRC 25de7835
    File header CRC 6ef229e6
    File comment CRC 6ef229e6
    File non-whitespace CRC 07f87fb9
    File whitespace CRC ac6fc0b2
Cell "OAI21_X1"
    Interface CRC dae46517
    Contents CRC c73aceaf
Cell "OAI21_X2"
    Interface CRC 01391569
    Contents CRC c73aceaf
```

If -sort is specified, however, the ports are put into alphabetical order for the purpose of computing the digests and the cells will match:

```
otismartsig -sort -ver testfiles/verilog_test2.v
    File CRC 25de7835
    File header CRC 6ef229e6
    File comment CRC 6ef229e6
    File non-whitespace CRC 07f87fb9
    File whitespace CRC ac6fc0b2
Cell "OAI21_X1"
    Interface CRC cf2d7023
    Contents CRC c73aceaf
Cell "OAI21_X2"
    Interface CRC cf2d7023
    Contents CRC c73aceaf
```

Reports of Matching GDSII Files

The file testfiles/sigtest.gds is a synthetic GDSII format file constructed to show some of the features of GDSII canonical cell digest calculation. It contains four cells, Structure_1 through Structure_4. Structure_2 is a leaf cell, referenced by the other three cells. Structure and array references do not have layer numbers, so their digests are stored on layer −1 as non-layer data:

```
otismartsig -gds testfiles/sigtest.gds
File "testfiles/sigtest.gds": GDS format
    File CRC d0b40760
    Cell "Structure_1"
        Comment CRC b0f5064e
        Layer −1 CRC 485b93e7
        Layer 3 CRC 58ffb953
        Layer 42 CRC e6098359
        Cell CRC 4658afa3
    Cell "Structure_2"
        Comment CRC 6acc5ddd
        Layer 1 CRC 0e517512
        Layer 5 CRC 00065ea8
        Layer 19 CRC 931b9a0f
        Cell CRC f780ec68
    Cell "Structure_3"
        Comment CRC b0f5064e
        Layer −1 CRC 485b93e7
        Layer 3 CRC 58ffb953
        Layer 42 CRC e6098359
        Cell CRC 4658afa3
    Cell "Structure_4"
        Comment CRC 9d8b21ad
        Layer −1 CRC 485b93e7
        Layer 3 CRC 47a23fdd
        Layer 42 CRC e6098359
        Cell CRC 747b0ece
```

Structure_3 is a direct copy of Structure_1, so all of its digests are identical to those of Structure_1. The polygons on layer 3 of Structure_4 are in a different order, so the digest for layer 3 differs from that of Structure_1 and Structure_3. Optionally, an otismartsig user may specify sorting of polygons and other steps to further reorganize the design data that is digested.

Applying Canonical Digests to Solve IC Design Problems

Figure 3:
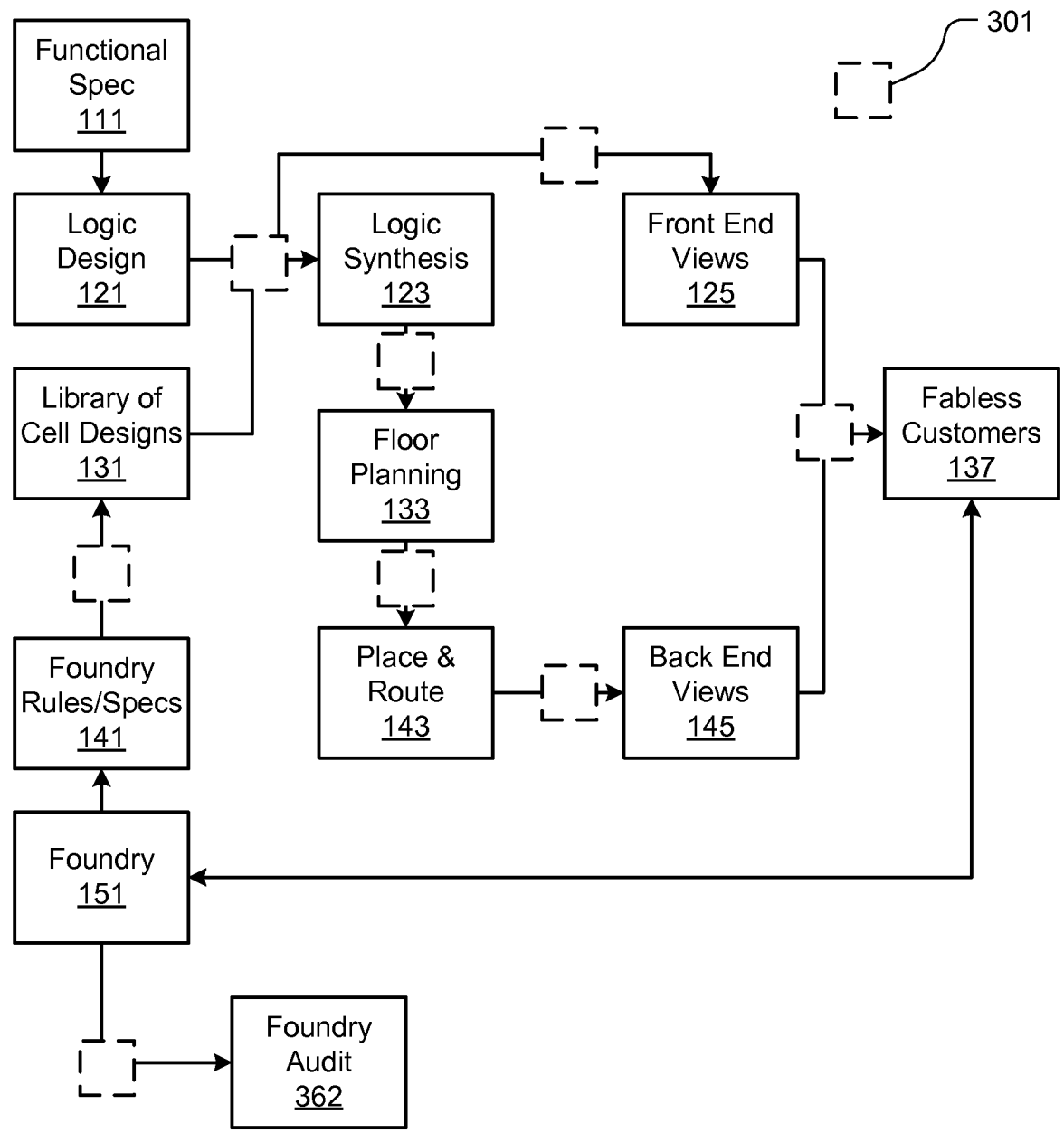
FIG. 3 illustrates junctures in the design process at which the technology disclosed can usefully be applied.

Calculating and comparing canonical digests can have many practical uses in the design of integrated circuits. Different embodiments of the claimed technology address different issues. Some of the use cases for this technology are listed above. FIG. 3 illustrates junctures in the design process at which the technology disclosed can usefully be applied. Most of the blocks in FIG. 3 match blocks in FIG. 1. Added to FIG. 3 is an audit 362, which indicates an independent review of production designs manufactured at the foundry to verify the presence of royalty bearing design templates in the production designs. The block with dashed lines 301 is placed at junctures where calculating and comparing canonical digests may usefully be applied, without intending to be exhaustive. Before logic synthesis 123, the validity of libraries of cell designs being used for synthesis can be tested. As new data is received from the foundry 141 for incorporation in a library of cell designs number 131, the significance of changes can be reviewed and evaluated. Before and after floor planning 133, designs can be scrutinized for use of approved cells, renaming and modification of cells and to avoid use of bad cells. As part of an audit process 362, canonical digests of cells in production designs can be compared to digests of royalty bearing cell designs. Lists of and counts of cells in the production design can be generated for a royalty auditing purposes. These useful applications are further apparent in the sections that follow.

Common Theme

The useful applications described rely on a computer implemented method to evaluate similarities and/or differences between design data for circuits residing in two or more files. A computer is used to identify cells or design units within the design data, as cells and design units are described above. Cells may be grouped in blocks, as explained. Some files may consist of a single header or cell. Within a cell, the syntax of the design data is parsed and normalized into canonical forms. The canonical forms reduce sensitivity of data analysis to non-functional variations in the design data. Digests are calculated and stored for at least part of the design data in the canonical forms. At least one digest is produced per cell or design unit, and typically more than one digest. Digests also may be produced for file headers which are not considered part of any particular cell. Digests of cells in one file are compared to digests of cells in the other file. Depending on whether similarities or differences are more appropriate for any particular analysis, an appropriate summary is generated. The summary may be a report that is human readable or may be stored in a computer file for further processing by other programs.

Understanding an Updated Cell Design Library

One of the problems faced by designers is that new versions of design libraries can be received from foundries, library vendors or internal development groups without a satisfying description of changes from one version to the next. A conventional differencing tool could be used to compare new and old libraries. As described above, differencing tools are designed to flag changes, rather than evaluate the significance of changes. Calculating digests of old and new versions of the library can be used to identify changed cells. Partitioning of cells between functional and nonfunctional data and into layers can produce digests from which a library manager can estimate the significance of changes to a new version of the library and investigate in further detail. Changes in nonfunctional data, such as changes to comments that identify the library version or changes to IP tags that apply Soft IP Tagging, can be segregated from changes in functionally significant data. The segregation can be used to filter or color code summaries and help the library manager decide where to follow up.

Whether to Adopt an Updated Cell Design Library During Development

Integrated circuit design is an iterative process using tens of thousands of cells and tens or even hundreds of complex design templates. Logic design teams use logic synthesis to generate structural netlists, which are sent to the integration team for the place and route process. In the final stages of the design process, as top-level blocks are placed, routed and optimized, it is useful to ensure that the design uses the most recent versions of all library elements.

By the first round of place and route, however, so much has been invested in a design project that project managers will want to know what has changed in a library and why it has changed before they accept a new version of the library that requires rework of the design. If timing models have changed, for example, another round of in-place optimization may be required to match the new timing data. If cell footprints in the library exchange format (LEF) file are changed, a new place and route step may be required, which may result in large changes in timing and further iteration. Reworking either of these steps involves a risk that performance goals will not be met or deadlines will be missed. These risks are weighed against yield or functional problems that a new version of the library addresses.

The technology disclosed can be used to focus analysis of an updated cell design library on cells that are actually used in a design that is under development. A three-way comparison of digests for the design under development, old library cells, and new library cells is useful for a project manager who needs to decide whether to adopt an updated cell library after substantial investment has been made. Multiple views of the design data in multiple design languages can be considered before the manager makes a decision.

Finding Unapproved and/or Bad Cells in Design Data

Cells have many potential sources, within a company and from vendors. It is useful to determine whether cells come from approved or unapproved sources. In addition, cells that initially are approved may turn out to be bad and be placed on a blacklist of sorts, a list of bad cells that should not be used in any designs. One useful application of canonical digests is to determine which cells in the design are not found in any approved cell library. Another useful application is to determine whether any cells in the design have data that match a library of bad cells that should not be used in any design. These uses can, of course, be combined.

Identifying Renamed Cells in Design Data

During design, designers been known to rename cells in order to avoid a cell name collision because cell names are required in some tools to be unique. Ideally, a name collision would be taken as a reason to investigate whether both uses of the cell relied on the same cell version and to select between different versions. The pressures of an ongoing design project sometimes lead to less than ideal practices. And so, designers simply rename a cell that they are using and leave it at that.

Canonical digests can be used to find the origin of a renamed cell. Comparing digests of renamed cells to cell libraries provides a more reliable indication of a cell origin than comments within the cell, especially when work group rules or expectations discourage renaming of cells. Comparing the digests can prove that a renamed cell matches an approved design, which gives a design manager or designer confidence in reverting the cell name to the name used in the approved design. Using names that match approved library elements is desirable when design tools use the cell names as references.

Detecting Cell Modifications that Jeopardize Warranties

A design team that starts with a template provided by a vendor may attempt to improve on the template. For instance, a compiled random access memory might be changed to better suit the perceived needs of a current design. However, the designer may not fully understand the consequences of the change. For example, a change to speed up a memory at nominal process conditions may in fact slow down the memory under other process conditions. In the semiconductor industry, this is known as what happens in other process corners. Changes in design also might hurt the yield of a circuit by causing bridging faults or open contacts. These changes may void an explicit or implied warranty of design templates received from vendors.

A cell that has multiple digests can be analyzed to determine whether it is a modified version of another cell. In some instances, multiple library cells will match across some layers. For instance, the metal layout within a class of cells that all have the same function may match. When a match across some, but not all layers is detected, further analysis can be performed to determine whether an unauthorized modification has taken place. Optionally, the analysis can be weighted to emphasize layer changes that imply modification other than the normal changes between members of a common class of cells.

Royalty Audits

Tape out data is typically available to foundries as part of the manufacturing process. This tape out data may be expressed in OASIS®, GDSII or another language. It includes polygons that define masks that are used as manufacturing tools or that are used for direct writing during manufacturing.

Digested cells from tape out data can be compared to digested cells from royalty bearing libraries, based on polygons in the cells. These polygons may be normalized by sorting. They optionally may be further normalized by merging polygons in a cell and re-fracturing them applying a consistent fracturing algorithm.

Using cell digests to audit designs used at foundries and calculate royalties owed has the advantage that digests can be analyzed by auditors without direct access to the digested design data. If the foundry runs the digesting tool, the auditors need only look at the resulting digests. Close questions can be resolved by having the auditors look further at the design data, instead of being limited to the digests.

Royalty audits also could be conducted against symbolic, text-based design data, instead of polygon data.

Immediate Response to Failure Analysis

On occasion, failure analysis will establish that a design template is bad and should not be used in any production. This poses a significant problem for design managers, due to renaming and modification of design templates. Canonical digests provide a way to quickly scan existing production designs and designs in progress. Digests of one or more variations on a design template that is proven to be bad can be compared to a library of digests for existing products and to project files for designs that are in progress. Designs that have digests which match or partially match the digests of the bad design templates can be flagged for further investigation. This gives design managers a way to find more than just the cells that remained linked to the original design libraries. It allows them to find renamed cells and modified cells that may share the layers which cause failure of the bad design templates.

Run Time Options of the Command Line Processor

The prototype canonical cell digest command-line utility's name is "otismartsig"; it is a 32- or 64-bit Linux executable that will run on 2.4.x and later kernels (e.g. Red Hat Enterprise Linux 4.x and later). If it is run without arguments, it prints help text similar to the following:

---

Oasis Tooling Smart Digest utility 1.0 alpha (r867)
Copyright (c) 2007-2008 by Oasis Tooling Inc. All Rights Reserved.
Usage: otismartsig [flags] -type file... [-type file...]
Available flags:
-file: treat the next argument as a file name, even if it begins with '-'
-mem number: maximum memory usage in megabytes (default 64)
-64: compute 64-bit digests -continued -sort: sort records before computing digests
-nosort: do not sort records before computing digests
-noheader: omit Liberty file header from cell digests
-verbose: print errors as they are found (useful in debugging)
-grid number: record layout file digests using the specified grid (default 1.0e-9 meter)
Available file types:
-oas: OASIS geometry database (default: -sort)
-gds: GDS geometry database (default: -sort)
-lib: Liberty library format (default: -sort)
-ver: Verilog RTL and netlist format (default: -nosort)
-vhd: VHDL RTL and netlist format (default: -nosort)
-spi: SPICE subcircuit netlist format (default: -nosort)
-lef: Library Exchange Format (default: -sort)
-def: Design Exchange Format (default: -sort)
-txt: unstructured text files (default: -nosort)
-stxt: structured (e.g. script) text files (default: -nosort)
-user: user-parsed files (default: -nosort)
-bin: unstructured binary files (default: -nosort)

---

File Types

Files should have a file type specified. Although it would be possible to analyze a file's header to guess its format, the cost of an error would be high—a cell-based text file might be misunderstood as an unstructured file, for example.

Files of more than one type may be analyzed in a single run if desired. If a new file type argument is specified, files after that argument use that format. In the following example, the first two files are interpreted as unstructured text files, while the last file is interpreted as a Verilog file:

otismartsig -txt file1.txt file2.txt -ver file3.txt

If a file name begins with '-', it should be preceded with -file. One -file argument can be used for each file.

Option: -sort

Most file formats provide the option of sorting the data. For several formats, it is the default, because digests generated using sorted data will generate more useful matches than digests using unsorted data. The default behaviors are specified in the help text at the end of the brief description of file formats. They are:

OASIS®: sort by default because OASIS® writers are quite likely to reorder data, especially when writing repetitions GDSII: sort by default because GDSII writers may reorder data and because GDSII cell data may need to be matched against OASIS® data Liberty: sort by default because the data is order-independent Verilog: do not sort by default because only cell interface records are sorted VHDL: do not sort by default because only cell interface records are sorted SPICE: do not sort by default because the sort routine also sorts cell interface records LEF: sort by default because much of the data is order-independent DEF: sort by default because much of the data is order-independent Unstructured text: do not sort by default because the file's purpose is not known Structured text: sorting is not even allowed because script files are order-dependent User-parsed files: do not sort by default because the purpose of the file is not known to the software Unstructured binary: sorting is not even allowed because there is no record structure For Verilog, VHDL, and SPICE files, sorting of the interface records (ports) may modify the meaning of the cell if some instantiations use positional port referencing (connection based on the order of the parameters) rather than association-based port referencing (connection based on the names of the parameters). Thus sorting for these formats should be done with caution.

If the user wants to sort a file of a given format for which the default is not to sort, the -sort option should be specified. If the user wants to prevent sorting of a file, the -nosort option should be specified. These options are "sticky," meaning that they affect all files listed afterward on the command line.

Option: -mem

The -mem option specifies the maximum amount of memory allowed for sorting, in megabytes. In the present implementation sorting is performed exclusively in memory, so if the estimated memory usage for a cell or file header exceeds this limit, the affected data is sent to digest computation in its original order and sorting is disabled for that cell or file header. The cells are tested for sortability, so that all small design template blocks can be sorted even if minimal memory is available, to increase matching and decrease false detection of differences. Generally speaking, only large placed and routed blocks will exceed the memory usage limits.

The default memory usage limit is 64 megabytes; on 32-bit Linux platforms the maximum memory usage limit is 3500 megabytes. If the value supplied with -mem is less than 16 it is silently increased to 16; if the value is more than 3500, it is silently reduced to 3500.

Because of uncertainties in memory allocation methods, the tool's memory usage estimates are not precise. It is best not to use a memory limit close to the amount of physical memory on the machine which is computing the canonical cell digests. Memory estimation for some file formats can be optimistic.

Some cells in a file may be sorted while others in the same file are too large to sort, so the canonical cell digest tool reports whether a cell was sorted because -sort was set (or was the default), not sorted because -nosort was specified (or was the default), or too large to sort even though -sort was set:

Cell "Structure_1" (sorted)
Cell "Structure_1" (not sorted)
Cell "Structure_1" (unable to sort)

The software tracks and stores with the digests an indication, such as a flag, of whether the digests for a given cell represent sorted data or not. If the memory usage limit is increased or the user begins using a new, more-efficient version of the canonical cell digest software, some cells previously not sortable may now be sorted (or vice versa, if the user decreases the limit). Unless the database stores the indication of whether the digests were calculated from sorted data, the user will not be able to determine whether a change in digests represents a real change in the data or is simply because one set of digests is for sorted data while the other set is for unsorted data.

Option: -64

By default, 32-bit digests are generated; if the -64 option is specified, 64-bit digests are generated.

Generation of 64-bit digests requires somewhat more run time than generation of 32-bit digests. Sixty-four bit digests are available in the 32-bit executable as well as the 64-bit executables.

Option: -verbose

By default, the program works silently, generating only a digest report or a generic error message. The parsers are optimized for automated digest generation, not for human use. If a file fails to parse and it is useful to see the actual error, use of the -verbose flag will cause the error to be printed. Many of the parsers quit after the first error is found, so the error report will not be particularly long. No digests will be generated if any errors are found.

Option: -grid

Geometry in OASIS® and GDSII and files is drawn on a grid, meaning that all coordinates in the file are scaled by some number to determine the absolute size of the geometry in microns or nanometers. The grid is stored in the file so that the meaning is unambiguous, but if for some reason the grid value changes, all of the coordinates in the cells will change even though the geometry has not changed. Scaling all of the coordinates by the grid is not an effective solution because the grid is a floating point number, typically a power of 10. Digests for floating point numbers could be machine-dependent or vulnerable to roundoff error.

Thus there is a -grid option for OASIS® and GDSII files. All coordinates are scaled to be multiples of this grid, e.g. one nanometer (1.0e-9 meters, the default). For example, if the file grid is 10 nanometers and the canonical cell digest grid is one nanometer, all coordinates from the file are multiplied by 10 before being sent to digest computation. If the OASIS® or GDSII file grid is not an integral multiple of the -grid value, an error is printed.

Option: -noheader

Liberty format files have numerous definitions and unit definitions in the file header. If any of these file header values change, all of the values (e.g. delays) in all of the cells may change as well. For example, if the time_unit or voltage_unit values in the file header change, all of the timing delay values in the cells will change as well, even if the text in the cells has not changed. Liberty files are often built by a script that concatenates a fixed file header with the data for the individual cells, and it is easy to use the wrong header. Thus by default all of the file header values (except for non-functional values such as the date) are added to the digests for cells in the Liberty file. If the user is confident that this error will not happen, header value merging can be disabled using the -noheader option.

Some Particular Embodiments

The technology disclosed may usefully be applied in a variety of methods and devices. The technology also may be embodied in articles of manufacture such as computer readable storage media storing a computer program that carries out the methods or that can be combined with hardware to produce the devices described.

Methods are described in the first group of embodiments. These are computer implemented methods of evaluating similarities and/or differences between design data residing in at least two files stored in computer memory. FIGS. 6 and 7 provide a high-level flowchart of some aspects of these methods. In the design data environment, data may be symbolic or binary. By symbolic, we mean text that is intended to be human readable. For instance, numbers and letters. A symbolic file also may contain codes that contribute to readability of text or help with internal file management. For instance tab characters, font attributes and bookmarks. A design file may be expressed in any of the design languages or formats described above. It may include polygons, which may be defined by vertices or half planes. It may be hierarchical, including references to other design data, either expanded or in hierarchical format. A wide range of design data is contemplated. As mentioned above, reference to two files is generic. The two files may be parts of the same database. More than two files may be involved.

The method operates on data residing in first and second files 411. In this description, we will refer to the method as operating on cells within a design and generating canonical cell digests. By canonical, we mean in a standardized format. Some design data files are normalized or transformed into a canonical format by passing them through a parser and applying parsing rules. Other files may require semantic analysis of a syntax tree generated by the parsing or other manipulations to normalize the file. Depending on the parsing rules, normalizing may eliminate whitespace, segregate comments from program code, sort tokens or the branches of the syntax tree, classify tokens or branches of the syntax tree as functional or nonfunctional design data, divide data between header and cell data or divide data within a cell between cell header and cell body data, reorder corner points of a polygon, or apply any of the other parsing and normalization strategies described above. One should understand, more generally, that the method applies to design units of data and the words "design units" could be substituted for "cells" in the description that follows and in the originally filed claims. In this disclosure, we illustrate how design data in files can be partitioned into header data and cell data. By partition or partitioned, we mean physically or logically divided into groups. As explained below, parsing rules that produce a syntax tree may naturally produce a physical partitioning of data. Once the syntax tree has been produced, tags or flags may be applied to nodes or branches of the syntax tree. A tag typically is a code that has a particular meaning. A flag also may be a code, but it may be simpler than a tag, as a Boolean value in a field that has a specific meaning. The method description that follows applies equally to design units and cells. The method includes identifying cells within the design data residing in the files 611. It proceeds with parsing syntax of 612 and normalizing 613 the design data within the cells into canonical forms. Parsing syntax can be applied to either symbolic or binary files. Parsing a symbolic file includes identifying tokens and recognizing their role in the file from a series of parsing rules that describe a language. Parsing a binary design data file includes identifying elements and groups of binary data and recognizing their role in the design data from parsing rules that describe the binary format of the design file. Parsing sometimes involves building a syntax tree. Alternatively, parsing can generate a stream of events. Normalizing is described above. The canonical forms may be maintained in one or more syntax trees 532. The canonical forms reduce sensitivity of data analysis to nonfunctional variations in the design data within a particular cell. Nonfunctional changes in design data are changes to design data that do not change a physical circuit that is produced using the design data. For instance, comments typically are nonfunctional design data; whitespace is usually nonfunctional in a symbolic file; in an ordered list of polygon corner coordinates, the selection of the starting coordinate and whether the corners are listed in a clockwise or counterclockwise direction are typically nonfunctional. At a higher level, fracturing a complex polygon into trapezoids or triangles, for instance, should not functionally change the physical circuit produced, although a particular fracturing algorithm may be necessary to the operation of a particular tool that is used in the production process. The method further includes calculating 614 and storing digests 415 of at least selected design data in the canonical forms, producing at least one digest per cell.

The method compares 615 the digests of canonical forms and summarizes 616 at least some results of comparing the digests. It may produce a summary 473 in memory, such as a table of data available to another program, or a report 475 that is viewable by a user.

There are multiple ways in which this comparison can be performed. One or more sets of digests are stored in a searchable data structure. A convenient searchable data structure is a hash table indexed by a modulus of the digests. Another hashing function could be used. The size of a hash table is selected based on the storage required and the desired frequency of collisions between hashes into the table. In case of collisions, lists are created linked to the hash table. Alternatively, an inverted index of digests could be created, at the cost of sorting digests. In many embodiments, there will be a plurality of digests per cell. One approach to comparing and scoring multiple digests is to create a list of all cells that have digests which match any digest for a cell of interest. In some embodiments, this list may be ordered, for instance with cells from a most recent library preceding cells from older libraries. Using the list of candidate cells, comparisons are made between all of the digests for the cell of interest and the digests for the candidate cells. Particularly for an ordered list, comparisons may be terminated when a match is found between all of the digests for the cell of interest and one of the candidate cells. When there is no complete match between the cell of interest and any of the candidate cells, a threshold or ratio may be applied for a number of digest matches that causes a pair of cells to be considered similar. Alternatively, where there is no complete match, the partial matches may be rank ordered and one or more partial matches summarized or reported.

One aspect of the method further includes partitioning functionally significant design data 722 from non-significant data within the canonical forms before calculating and storing the digests. Design data is functionally significant when a change in the design data would result in a change in a circuit generated from the design data. Then, the selected design data in the canonical forms used to calculate the digests includes at least the functionally significant design data.

Additional granularity in the digest comparisons can be supported by partitioning design data within cells by cell header, interface, and/or body 721, by layers 723, and by sortable/order dependent data 724. Partitioning strategies may produce either a physical or logical partitioning of data. Physical partitioning of data includes separating the data into physically separate groups, such as first and second lists. Logically partitioning data may involve tagging or flagging the data so that the computer recognizes items of data as belonging to particular groups. These partitioning strategies may be applied individually or in any combination. Parsing 712 creates one or more syntax trees 532 that can partition the design data as desired. For some partitioning strategies, this involves defining how nodes and branches in the syntax trees are organized. For other partitioning strategies, this may involve setting flags for nodes or branches in the syntax trees. Flags are described above. The calculating and storing digests further includes producing at least one digest per partition. The summarizing distinguishes among the digests produce from different partition types.

The methods above may be applied to comparing files encoded using differing design languages. The two languages that this disclosure describes how to render comparable are the OASIS® design language and the GDSII design language. The first and second files referred to above are OASIS® and GDSII files, when those two languages are being compared. They may be two other languages when equivalences are developed for other pairs. When comparing files that are in different design languages, the canonical forms for the design languages render comparable at least the design data in bodies of cells. Alternatively, for design languages in which the functional differences among cells are expressed in cell headers and not in the bodies of the cells themselves, the canonical forms may render comparable at least the design data in the cell headers.

The methods above can be applied to evaluating a new library of cell designs against an old library of cell designs. Then, the first file is a new library of cell designs and the second file is an old library. The summarizing further includes reporting at least functionally significant changes in the new library that are detected by comparing the digests of the two libraries.

The methods above further could be applied to evaluating the impact of adopting a new library. This application of the methods also applies to determining whether cells in a design file belong to an out-of-date library. This application further includes a third file to which the identifying, parsing and calculating actions are applied. In this variation, the first file is a design file, the second file is at least one current library of cell designs and the third file is at least one out-of-date library of cell designs. The summarizing includes reporting cells in the design file that have digests that do not match digests of cell designs in the current library, but do match digests of cell designs in the out-of-date library. Optionally, cell designs which do not appear in either the current or out-of-date library can also be reported. This reporting criteria naturally eliminates from reporting cell designs that are the same in both the current and out-of-date library. While we have described the present method as comparing the current and out-of-date library, these words are used to refer to two generations of the library and could just as easily be applied to a candidate version (the so-called "current version"), not yet adopted, and a production version (the so-called "out-of-date version").

Another application of the methods above is identifying bad or unapproved cells. Detection of bad or unapproved cells can proceed separately or in combination. The methods above can be applied to evaluating a design file to determine whether cells in the design file belong to a collection of known bad cells. In this application, the first file is a design file, which is compared to a file that contains known bad cells. The summarizing further includes reporting cells in the design file that have digests that match digests of cells in the file of known bad cells. Similarly, the methods above can be applied to evaluating a design file to determine whether cells in the design file belong to at least one approved library. Again, the first file is the design file, which is compared to at least one approved library. The reporting typically will report on an exception basis the cells in the design file that have digests that do not match digests in cells in the approved library. Optionally, partial matches may be reported when there is no perfect match between a cell in the design file and any of the cells in the approved library.

A further use of the methods above is to detect functionally identical cells with different cell names. The first file is a design file and the second file is at least one approved library. The calculating and storing of digests is applied to at least functionally significant data in multiple layers of the design file and the approved library. The summarizing further includes reporting as renamed the cells in the design file that have digests of functionally significant data in the multiple layers that do match digests in the approved library (called "the functionally matching cells"), but which renamed cells have cell names that do not match cell names of the functionally matching cells. Optionally, the method may be extended to reverting the cells in the design file reported as "renamed" to have cell names that match and link to the functionally matching cells in the approved library.

An interesting use of the methods above is to evaluate a design file to determine whether warranted or other cells in the design file have been modified from their warranted design template. The first file is a design file and the second file is at least one approved library. The calculating and storing digests is applied to at least functionally significant data in multiple layers of the cells in the design file and the approved library. The summarizing further includes reporting as potentially modified cells in the design file that have digests of functionally significant data in some but not all of the multiple layers that match digests of cells in the approved library.

A further application of the methods above is to scan production designs to find royalty bearing cell designs used in the production designs. In this application, the first file includes one or more royalty bearing libraries of royalty bearing cell designs and the second file includes one or more production designs that include cell designs. The summarizing further includes reporting as potentially royalty bearing certain cells in the production designs that have digests which match digests of cells in the royalty bearing libraries. Optionally, near matches also can be reported. Near matches is a term that applies to cells or design units that have multiple digests, such as digests for multiple layers of a cell. Two cells may be near matches if most of the layers in the cell have matching digests.

The second group of embodiments are devices. These are computer devices that evaluate similarities and/or differences between design data residing in at least two files stored in computer memory. FIG. 5, previously described, provides a high level block diagram of some aspects of these devices. As with the method embodiments, the design data processed by the devices may be symbolic or binary. It may be expressed in any of the design languages or formats described above. It may include polygons. It may be hierarchical, including references to other design data, either expanded or in its hierarchical format. A wide range of design data is contemplated. As mentioned above, reference to two files is generic. The two files may be parts of the same database. More than two files may be involved.

The device includes at least one processor and memory 530, 535. A parser 531 runs on the processor and parses files 411 containing design data representing aspects of a design for a physical circuit and creates one or more syntax trees 532 in the memory. In this description, we will refer to the device as operating on cells within a design and generating canonical cell digests. One should understand, more generally, that the device can operation on design units of data and that the words "design units" could be substituted for "cells" in the description that follows and in the originally filed claims.

Normalizer logic 533 runs on the processor and cooperates with the parser 432 that organizes the syntax trees 532 to produce canonical forms. In the phrase "normalizer logic," logic means instructions to control the operation of computer components. Running on a processor, logic typically would be object code compiled from program instructions. Within a processor, logic may be micro-instructions. In a programmable logic component, such as a field programmable gate array (FPGA), the logic may be represented by gates and connections among gates. In this application, logic is what tells computer components how to execute a task. The normalizer logic includes a partitioning module that partitions the file into at least one header and, depending on rules of a design language used to encode the file, into multiple cells of design data. The partitioning module organizes the syntax trees to represent the header and cell partitions. As explained above, in various design languages, a file may contain header data, cell data or both. To be clear, the device applies to files that contain only one of header and cell data.

The normalizer logic further includes a canonical forming module that interprets the syntax trees to produce canonical forms of the design data, wherein the canonical forms reduce sensitivity of data analysis to non-functional variations in the design data.

The device further includes a digester 534 running on the processor that calculates and stores digests in memory 415, producing at least one digest per partition.

A comparer module 536 runs on a processor 535 and compares the digests of canonical forms. A module is a segment of logic that carries out a particular task. For instance, normalizer logic includes a plurality of modules. A reporter 537, also running on the processor 535, summarizes at least some results of comparing the digests. The reporter may produce a summary 473 in memory, such as a table of data available to another program, or a report 475 that is viewable by a user.

There are multiple ways in which the comparer can be structured. One or more sets of digests are stored in a searchable data structure. The structure of the comparer depends on the searchable data structure. One convenient data structure is a hash table indexed by a modulus of the digests. Another hashing function could be used. The size of a hash table is selected based on the storage required and the desired frequency of collisions between hashes into the table. In case of collisions, lists are created linked to the hash table. Alternatively, an inverted index of digests could be created, at the cost of sorting digests. In many embodiments, there will be a plurality of digests per cell. One approach to comparing and scoring multiple digests is to create a list of all cells that have digests which match any digest for a cell of interest. In some embodiments, this list may be ordered, for instance with cells from a most recent library preceding cells from older libraries. Using the list of candidate cells, comparisons are made between all of the digests for the cell of interest and the digests for the candidate cells. Particularly for an ordered list, comparisons may be terminated when a match is found between all of the digests for the cell of interest and one of the candidate cells. When there is no complete match between the cell of interest and any of the candidate cells, a threshold or ratio may be applied for a number of digest matches that causes a pair of cells to be considered similar. Alternatively, where there is no complete match, the partial matches may be rank ordered and one or more partial matches summarized or reported.

The partition module may further partition functionally significant design data from non-significant data within the canonical forms before the digester calculates and stores the digests. Design data is functionally significant when a change in the design data would result in a change in a circuit generated from the design data. Then, the selected design data in the canonical forms processed by the digester 534 to calculate the digests includes at least the functionally significant design data.

Additional granularity in the digest comparisons can be supported by the partitioning module distinguishing design data within cells by cell header, interface, and/or body, by layers, and by sortable/order dependent data. These partitioning strategies may be applied individually or in any combination. For partitioning options, the parser 531 creates one or more syntax trees 532 that partition the design data as desired. For some partitioning strategies, this involves how nodes and branches in the syntax trees are organized. For other partitioning strategies, this may involve setting flags for nodes or branches in the syntax trees. The digester that calculates and stores digests produces at least one digest per partition. The reporter 537 distinguishes among the digests produced from different partition types.

The device may compare files encoded using differing design languages. The two languages that this disclosure describes how to render comparable are the OASIS® design language and the GDSII design language. The first and second files referred to above are OASIS® and GDSII files, when those two languages are being compared. They may be two other languages when equivalences are developed for other pairs. When comparing files that are in different design languages, the canonical forming module produces canonical forms for the design languages that render comparable at least the design data in bodies of cells. Alternatively, for design languages in which the functional differences among cells are expressed in cell headers and not in the bodies of the cells themselves, the canonical forms may render comparable at least the design data in the cell headers.

The device above can be applied to evaluating a new library of cell designs against an old library of cell designs. Then, the first file is a new library of cell designs and the second file is an old library. The reporter further reports at least functionally significant changes in the new library that are detected by comparing the digests of the two libraries.

The device above further could be applied to evaluating the impact of adopting a new library. This use of the device also applies to determining whether cells in a design file belong to an out-of-date library. Three files are involved. The first file is a design file, the second file is at least one current library of cell designs and the third file is at least one out-of-date library of cell designs. The reporter module uses results from the comparer and reports cells in the design file that have digests that do not match digests of cell designs in the current library, but do match digests of cell designs in the out-of-date library. Optionally, cell designs which do not appear in either the current or out-of-date library can also be reported. This reporting criteria naturally eliminates from reporting cell designs that are the same in both the current and out-of-date library. While we have described the present method as comparing the current and out-of-date library, these words are used to refer to two generations of the library and congested as equally be applied to a candidate version (the so-called "current version"), not yet adopted, and a production version (the so-called "out-of-date version").

Another application of the device above is identifying bad or unapproved cells. Detection of bad or unapproved cells can proceed separately or in combination. The device can be applied to evaluating a design file to determine whether cells in the design file belong to a collection of known bad cells. In this application, the first file is a design file, which is compared to a file that contains known bad cells. The reporter module summarizes cells in the design file that have digests that match digests of cells in the file of known bad cells. Similarly, the device above can be applied to evaluating a design file to determine whether cells in the design file belong to at least one approved library. Again, the first file is the design file, which is compared to at least one approved library. The reporter module typically will report on an exception basis the cells in the design file that have digests that do not match digests in cells in the approved library. Optionally, partial matches may be reported when there is no perfect match between a cell in the design file and any of the cells in the approved library.

A further use of the device above is to detect functionally identical cells with different cell names. The partitioning module for this use further partitions the file by layers within cells and organizes the syntax trees to reflect the layers. The first file is a design file and the second file is at least one approved library. The digester calculates and stores digests that reflect at least functionally significant data in multiple layers of the design file and the approved library. The reporter module further summarizes as "renamed" those cells in the design file that have digests of functionally significant data in the multiple layers that do match digests in the approved library (called "the functionally matching cells"), but which renamed cells have cell names that do not match cell names of the functionally matching cells. Optionally, the method may be extended to reverting the cells in the design file reported as "renamed" to have cell names that match and link to the functionally matching cells in the approved library.

An interesting use of the device above is to evaluate a design file to determine whether warranted or other cells in the design file have been modified from their warranted design template. The first file is a design file and the second file is at least one approved library. The digester calculates and stores digests of at least the functionally significant data in multiple layers of the cells in the design file and the approved library. The reporter further summarizes as potentially modified cells in the design file that have digests of functionally significant data in some but not all of the multiple layers that match digests of cells in the approved library.

A further application of the device above is to scan production designs to find royalty bearing cell designs used in the production designs. In this application, the first file includes one or more royalty bearing libraries of royalty bearing cell designs and the second file includes one or more production designs that include cell designs. The reporter further summarizes as potentially royalty bearing those cells in the production designs that have digests which match digests of cells in the royalty bearing libraries. Optionally, near matches also can be reported.

A third group of embodiments are articles of manufacture, consistent with but not limited by the case In re Beauregard. In one embodiment, these articles of manufacture include a computer readable storage medium that stores program code for carrying out any of the method embodiments described above. The program code, when running on a processor, enables the processor to carry out the actions described above. In a second embodiment, these articles of manufacture include a computer readable storage medium that stores program code that, when combined with a processor and memory, creates any of the devices described above. The program code, when combined with the processor and memory, includes the modules set forth above.

We claim as follows:

1. A computer-implemented method of evaluating similarities and/or differences between design data for circuits, the design data residing in at least two files stored in computer memory, the method including:
   using a computer, identifying cells within design data residing in first and second files, wherein the cells have logical names as parts of the design data and the cells correspond to portions of design for a physical circuit;
   parsing syntax of and normalizing the design data within the cells into canonical forms, wherein the canonical forms reduce sensitivity of data analysis to non-functional variations in the design data within a particular cell;
   calculating and storing digests of at least selected design data in the canonical forms, producing at least one digest per cell that uniquely digests functional data design within the cell;
   comparing the digests of the cells in the first file to the digests of the cells in the second file; and
   summarizing at least some results of the comparing of the digests.

2. The method of claim 1, further including:
   partitioning functionally significant design data from non-significant data within the canonical forms before the calculating and storing, wherein the design data is functionally significant when a change in the design data would result in a change in a circuit generated from the design data; and
   wherein the selected design data in the canonical forms used to calculate the digests includes at least the functionally significant design data.

3. The method of claim 2, applied to detecting functionally identical cells with different cell names, wherein:
   the first file is a design file and the second file is at least one approved library;
   the calculating and storing digests is applied to at least functionally significant data in multiple layers of the cells in design file and the approved library; and
   the summarizing further includes reporting as renamed the cells in the design file that have digests of functionally significant data in the multiple layers that do match digests of cells in the approved library (called "the functionally matching cells"), but which renamed cells have cell names that do not match cell names of the functionally matching cells.

4. The method of claim 1, applied to comparing files of differing design data syntaxes, one in OASIS and the other in GDSII, wherein:
   the first file contains design data expressed in an OASIS® design language and the second file contains design data expressed in a GDSII design language; and
   the canonical forms for the OASIS® and the GDSII design languages render comparable design data in bodies of the cells.

5. The method of claim 2, applied to evaluating a new library of cell designs against an old library of cell designs, wherein:
   the first file is a new library of cell designs and the second file is an old library of cell designs; and
   the summarizing further includes reporting at least the functionally significant changes in the new library that are detected by comparing the digests.

6. The method of claim 1, applied to evaluating a design file to determine whether cells in the design file belong to at least one approved library and are not out of date, the method further including:
   a third file to which the identifying, parsing and calculating steps are applied;
   wherein the first file is a design file, the second file is at least one current library of cell designs, and the third file is at least one out of date library of cell designs; and
   wherein the summarizing further includes reporting cells in the design file that have digests that do not match digests of cell designs in the current library and that do match digests of cell designs in the out of date library.

7. The method of claim 1, applied to evaluating a design file to determine whether cells in the design file belong to a collection of known bad cell designs, wherein:
   the first file is a design file and the second file contains known bad cell designs; and
   the summarizing further includes reporting cells in the design file that have digests that match digests of cells in the file of known bad cell designs.

8. The method of claim 7, further applied to evaluating whether the cells in the design file belong to at least one approved library, including:
   a third file to which the identifying, parsing and calculating steps are applied;
   wherein the third file is at least one approved library of cells; and wherein the summarizing further includes reporting cells in the design file that have digests that do not match digests of cells in the approved library of cells.

9. The method of claim 1, applied to evaluating a design file to determine whether cells in the design file belong to at least one approved library, wherein:
the first file is a design file and the second file is at least one approved library; and
the summarizing further includes reporting cells in the design file that have digests that do not match digests of cells in the approved library.

10. The method of claim 1, applied to evaluating a design file to determine whether warranted or other cells in the design file have been modified, wherein:
the first file is a design file and the second file is at least one approved library;
the calculating and storing digests is applied to at least functionally significant data in multiple layers of the cells in the design file and the approved library; and
the summarizing further includes reporting as potentially modified cells in the design file that have digests of functionally significant data in some but not all of the multiple layers that match digests of cells in the approved library.

11. The method of claim 1, applied to scanning production designs to find royalty bearing cell designs, wherein:
the first file includes one or more royalty-bearing libraries of royalty-bearing cell designs and the second file includes one or more production designs that include cell designs; and
the summarizing further includes reporting as potentially royalty-bearing cells in the production designs that have digests which match digests of cells in the royalty-bearing libraries.

12. The method of claim 1, wherein the parsing syntax of the design data further includes:
creating one or more syntax trees that partition the design data within a cell at least:
between header and body data, according to a format in which the design data is cast; and
between functionally significant and non-significant data, wherein parts of the design data are functionally significant when a change in the design data would result in a change in a circuit generated from the design data; and
wherein the calculating and storing digests further include producing at least one digest per partition per cell; and
the summarizing distinguishes among the digests produced from different partition types.

13. The method of claim 12, wherein the syntax trees further partition the design data within a cell into design layers.

14. The method of claim 12, further including:
recognizing branches of the syntax trees that include nodes which represent design data that is order independent, wherein order independent means that the nodes can be processed in varying orders without changing a circuit generated from the design data represented by the nodes; and
sorting nodes in the identified branches;
wherein the calculating and storing digests are applied to the sorted nodes.

15. A computer-implemented method of evaluating similarities and/or differences between design data for circuits, the design data residing in at least two files stored in computer memory, the method including:
using a computer, parsing syntax of design data residing in first and second files, including header data and/or cell data (that are collectively referred to as "design units") wherein the design unit have logical names as part of the design data and correspond to parts of a design of a physical circuit;
normalizing the design data within the design units into canonical forms, wherein the canonical forms reduce sensitivity of data analysis to non-functional variations in the design data;
calculating and storing digests of at least selected design data in the canonical forms, producing at least one digest per design unit that uniquely digests functional data design within the design unit;
comparing the digests of the design units in the first file to the digests of the design units in the second file; and
summarizing at least some results of the comparing of the digests.

16. An article of manufacture including:
a non-transitory computer readable storage medium that stores program code configured to be run on a computer and to evaluate similarities and/or differences between design data for circuits, the design data residing in at least two files stored in computer memory, the program code including:
a parser that parses a file containing design data representing aspects of a design for a physical circuit and creates one or more syntax trees in the memory;
normalizer logic cooperating with the parser that organizes the syntax trees to produce canonical forms, wherein the normalizer logic includes:
a partitioning module that partitions the file into at least one header and, depending on rules of a design language used to encode the file, into multiple cells of design data and organizes the syntax trees to represent the header and cell partitions;
a canonical forming module that interprets the syntax trees to produce canonical forms of the design data, wherein the canonical forms reduce sensitivity of data analysis to non-functional variations in the design data;
a digester that receives the canonical forms for at least selected partitions and calculates and stores in the memory at least one digest per selected partition;
a comparer module that receives and compares the digests of at least a first file and a second file, which contain design data; and
a reporter module coupled to the digester that summarizes at least some of the matches and/or differences detected by the comparisons of digests.

17. The article of manufacture of claim 16, wherein the canonical forming module interprets the sortability of branches of the syntax trees and organizes the syntax trees to reflect sortability.

18. The article of manufacture of claim 16, wherein the partitioning module further partitions the file by layers within cells and organizes the syntax trees to reflect the layers.

19. The article of manufacture of claim 16, wherein the partitioning module further partitions the file between design-data that is functionally significant and design data that is not significant, wherein the design data is functionally significant when a change in the design data would result in a change in a circuit generated from the design data; and the partitioning module organizes the syntax trees to reflect functional significance.

20. The article of manufacture of claim 19, adapted to evaluating a new library of cell designs against an old library of cell designs, wherein:

the first file is a new library of cell designs and the second file is an old library of cell designs; and the reporter module summarizes the functionally significant changes in the new library that are detected by comparing the digests.

\* \* \* \* \*